(12) United States Patent
Adachi et al.

(10) Patent No.: US 11,493,784 B2
(45) Date of Patent: Nov. 8, 2022

(54) SPECTACLE LENS AND SPECTACLES

(71) Applicant: HOYA LENS THAILAND LTD., Pathumthani (TH)

(72) Inventors: Makoto Adachi, Tokyo (JP); Hitoshi Kamura, Tokyo (JP); Takumi Nomura, Tokyo (JP); Osamu Akabayashi, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 347 days.

(21) Appl. No.: 16/364,532

(22) Filed: Mar. 26, 2019

(65) Prior Publication Data

US 2019/0219841 A1 Jul. 18, 2019

Related U.S. Application Data

(63) Continuation of application No. PCT/JP2018/043217, filed on Nov. 22, 2018.

(30) Foreign Application Priority Data

Nov. 24, 2017 (JP) .............................. JP2017-225708

(51) Int. Cl.
*G02C 7/08* (2006.01)
*G02B 5/28* (2006.01)
*G02B 1/115* (2015.01)

(52) U.S. Cl.
CPC .............. *G02C 7/088* (2013.01); *G02B 1/115* (2013.01); *G02B 5/285* (2013.01)

(58) Field of Classification Search
CPC .......... G02C 11/10; G02C 7/04; G02C 7/083; G02C 7/101; G02C 11/04; G02C 7/081;
(Continued)

(56) References Cited

U.S. PATENT DOCUMENTS

2013/0222913 A1 8/2013 Tomoda et al.
2014/0347625 A1 11/2014 Tomoda et al.
(Continued)

FOREIGN PATENT DOCUMENTS

CN 107003545 A 8/2017
CN 108463746 A 8/2018
(Continued)

OTHER PUBLICATIONS

Feb. 19, 2019 Search Report issued in International Patent Application No. PCT/JP2018/043217.
(Continued)

*Primary Examiner* — William R Alexander
*Assistant Examiner* — Sharrief I Broome
(74) *Attorney, Agent, or Firm* — Oliff PLC

(57) ABSTRACT

The spectacle lens includes a lens substrate; a multilayer film disposed on one surface of the lens substrate; and a multilayer film disposed on the other surface of the lens substrate, wherein an average reflectance within the wavelength range from 380 to 500 nm measured at least on one surface of the spectacle lens is 10.00% or more, and a reflectance measured at least on one surface of the spectacle lens is 5.00% or less in the entire range within the wavelength range from 400 to 780 nm.

5 Claims, 31 Drawing Sheets

(58) Field of Classification Search
CPC ............... G02C 11/06; G02C 2200/02; G02C 2200/08; G02C 2202/16; G02C 7/02; G02C 7/12; G02C 5/001; G02C 5/14; G02C 5/143; G02C 5/22; G02C 7/00; G02C 7/021; G02C 7/022; G02C 7/049; G02B 2027/0178; G02B 27/0172; G02B 27/017; G02B 2027/0138; G02B 2027/014; G02B 27/0093; G02B 27/0176; G02B 2027/0127; G02B 2027/0187; G02B 2027/0156; G02B 2027/011; G02B 2027/0132; G02B 27/0101; G02B 27/0179; G02B 5/30; G02B 2027/0118; G02B 2027/0141; G02B 2027/0112; G02B 2027/0158; G02B 2027/0159; H01L 2924/00; H01L 2224/48145; H01L 2224/45139; H01L 2924/00011; H01L 2924/00014; H01L 2924/00012; H01L 2224/32145; H01L 2224/45147; H01L 2224/48091; H01L 2224/73265; H01L 2924/01015; H01L 2924/01047; H01L 2924/10253; H01L 2924/13091; H01L 2224/45099; H01L 2924/01033; H01L 2225/06506; H01L 2225/06513; H01L 2225/06541; H01L 2225/06562; H01L 1/00; H01L 1/0016; H01L 1/0026; H01L 1/0077; H01L 1/1621; H01L 5/001; H01L 5/0035; H01L 5/0044; H01L 5/0069; H01L 5/0073; H01L 5/14; H01L 5/1469; H01L 63/0861; G06F 3/013; G06F 3/011; G06F 1/163; G06F 21/35; G06F 3/002; G06F 3/015; G06F 3/017; G06F 3/033; G06F 1/1635; G06F 1/1684; G06F 1/1686; G06F 1/1694; G06F 2203/0339; G06F 3/016; G06F 3/0304; G06F 3/0317; G06F 3/0346; G06F 3/03547; G06F 3/0421; G06F 3/04815; A61B 5/6821; A61B 5/6803; A61B 3/113; A61B 5/0002; A61B 5/1103; A61B 5/14532; A61B 5/6814; A61B 2560/0214; A61B 3/10; A61B 5/0205; A61B 5/02438; A61B 5/369; A61B 2560/0475; A61B 2562/0219; A61B 2562/0223; A61B 2562/0257; A61B 2576/00; A61B 3/101; A61B 3/112; A61B 5/0022; A61F 2/16; A61F 2250/0001; A61F 2250/0002; A61F 2/14; A61F 2/1613; A61F 2/1624; A61F 2002/7695; A61F 2/76; A61F 9/029; A61F 9/045; A61F 2250/0085; A61F 9/061; A61F 9/08; H04N 13/332; H04N 9/3173; H04N 13/144; H04N 13/261; H04N 13/324; H04N 13/327; H04N 13/334; H04W 28/0278; H04W 52/0206; H04W 72/04; H04W 72/0406; H04W 72/0413; H04W 72/12; H04W 72/1268; H04W 72/1273; H04W 72/14; H04W 84/045; H04W 84/12; H04W 88/08; H04W 4/50; H04W 4/80

See application file for complete search history.

(56) References Cited

U.S. PATENT DOCUMENTS

| | | | |
|---|---|---|---|
| 2015/0198821 A1 | 7/2015 | Miyamoto et al. | |
| 2017/0097521 A1 | 4/2017 | Yoshida et al. | |
| 2017/0192255 A1* | 7/2017 | Santan | G02B 5/283 |
| 2017/0299896 A1* | 10/2017 | Ogo | G02C 7/10 |
| 2017/0351119 A1* | 12/2017 | Passard | G02B 5/26 |
| 2018/0067339 A1* | 3/2018 | Miyamoto | G02B 5/28 |
| 2019/0121163 A1* | 4/2019 | Li | G02C 7/088 |
| 2019/0155058 A1* | 5/2019 | Takahashi | G02B 5/08 |

FOREIGN PATENT DOCUMENTS

| | | |
|---|---|---|
| CN | 109891304 A | 6/2019 |
| EP | 2624044 A1 | 8/2013 |
| EP | 3505999 A1 | 7/2019 |
| JP | 2015-203856 A | 11/2015 |
| WO | 2012/043218 A1 | 4/2012 |
| WO | 2014/069250 A1 | 5/2014 |
| WO | 2017/117454 A1 | 7/2017 |
| WO | 2017/171075 A1 | 10/2017 |

OTHER PUBLICATIONS

Feb. 9, 2021 Office Action issued in Japanese Patent Application No. 2019-514323.

Feb. 18, 2020 Office Action issued in Korean Patent Application No. 10-2019-7008267.

Mar. 12, 2020 Office Action issued in Chinese Patent Application No. 201880003670.5.

Apr. 14, 2020 Office Action issued in Japanese Patent Application No. 2019-514323.

Aug. 12, 2020 Office Action issued in Chinese Patent Application No. 201880003670.5.

"Ophthalmic Optics—Spectacle Lenses Vocabulary", International Standard—ISO, Zuerich, CH, vol. 13666, Aug. 1, 1998 (Aug. 1, 1998), page Complete, XP001247658, * Definition 15.7; p. 45*.

May 4, 2020 Extended Search Report issued in European Patent Application No. 18857401.6.

May 26, 2020 International Preliminary Report on Patentability issued in International Patent Application No. PCT/JP2018/043217.

Nov. 2, 2021 Decision of Rejection issued in Japanese Patent Application No. 2019-514323.

May 6, 2022 Communication issued in European Patent Application No. 18857401.6.

Sep. 13, 2022 Office Action issued in European Patent Application No. 18857401.6.

* cited by examiner

FIG. 5-1

| WAVELENGTH (nm) | COMPARATIVE EXAMPLE 1, OBJECT SIDE | COMPARATIVE EXAMPLE 1, EYEBALL SIDE | EXAMPLE 1, OBJECT SIDE | EXAMPLE 1, EYEBALL SIDE | EXAMPLE 2, OBJECT SIDE | EXAMPLE 2, EYEBALL SIDE | COMPARATIVE EXAMPLE 2, OBJECT SIDE | COMPARATIVE EXAMPLE 2, EYEBALL SIDE |
|---|---|---|---|---|---|---|---|---|
| 380 | 1.6960 | 2.03277 | 32.5027 | 7.0238 | 32.5027 | 0.4102 | 32.5027 | 1.9943 |
| 381 | 1.6304 | 1.96037 | 32.7217 | 6.7717 | 32.7217 | 0.5422 | 32.7217 | 1.6376 |
| 382 | 1.5924 | 1.89132 | 32.9350 | 6.5475 | 32.9350 | 0.5246 | 32.9350 | 1.4034 |
| 383 | 1.5821 | 1.82778 | 33.1534 | 6.3506 | 33.1534 | 0.3837 | 33.1534 | 1.2514 |
| 384 | 1.5982 | 1.77101 | 33.3819 | 6.1739 | 33.3819 | 0.2114 | 33.3819 | 1.1311 |
| 385 | 1.6373 | 1.72125 | 33.6180 | 6.0069 | 33.6180 | 0.0996 | 33.6180 | 1.0002 |
| 386 | 1.6957 | 1.67779 | 33.8532 | 5.8384 | 33.8532 | 0.0841 | 33.8532 | 0.8374 |
| 387 | 1.7687 | 1.63913 | 34.0749 | 5.6599 | 34.0749 | 0.1341 | 34.0749 | 0.6452 |
| 388 | 1.8523 | 1.60333 | 34.2699 | 5.4679 | 34.2699 | 0.1836 | 34.2699 | 0.4447 |
| 389 | 1.9433 | 1.56830 | 34.4270 | 5.2638 | 34.4270 | 0.1856 | 34.4270 | 0.2636 |
| 390 | 2.0396 | 1.53216 | 34.5394 | 5.0535 | 34.5394 | 0.1422 | 34.5394 | 0.1255 |
| 391 | 2.1406 | 1.49347 | 34.6056 | 4.8448 | 34.6056 | 0.0991 | 34.6056 | 0.0406 |
| 392 | 2.2475 | 1.45141 | 34.6297 | 4.6458 | 34.6297 | 0.1092 | 34.6297 | 0.0045 |
| 393 | 2.3611 | 1.40584 | 34.6192 | 4.4620 | 34.6192 | 0.1933 | 34.6192 | 0.0017 |
| 394 | 2.4831 | 1.35727 | 34.5841 | 4.2954 | 34.5841 | 0.3219 | 34.5841 | 0.0138 |
| 395 | 2.6153 | 1.30668 | 34.5338 | 4.1444 | 34.5338 | 0.4315 | 34.5338 | 0.0273 |
| 396 | 2.7586 | 1.25543 | 34.4755 | 4.0045 | 34.4755 | 0.4617 | 34.4755 | 0.0390 |
| 397 | 2.9140 | 1.20492 | 34.4128 | 3.8694 | 34.4128 | 0.3905 | 34.4128 | 0.0568 |
| 398 | 3.0808 | 1.15647 | 34.3451 | 3.7334 | 34.3451 | 0.2472 | 34.3451 | 0.0959 |
| 399 | 3.2576 | 1.11114 | 34.2681 | 3.5923 | 34.2681 | 0.0979 | 34.2681 | 0.1717 |
| 400 | 3.4421 | 1.06957 | 34.1754 | 3.4445 | 34.1754 | 0.0112 | 34.1754 | 0.2936 |
| 401 | 3.6302 | 1.03181 | 34.0617 | 3.2930 | 34.0617 | 0.0237 | 34.0617 | 0.4591 |
| 402 | 3.8205 | 0.99767 | 33.9193 | 3.1387 | 33.9193 | 0.1232 | 33.9193 | 0.6540 |
| 403 | 4.0107 | 0.96672 | 33.7433 | 2.9853 | 33.7433 | 0.2580 | 33.7433 | 0.8554 |
| 404 | 4.1984 | 0.93825 | 33.5315 | 2.8370 | 33.5315 | 0.3648 | 33.5315 | 1.0389 |
| 405 | 4.3820 | 0.91157 | 33.2843 | 2.6970 | 33.2843 | 0.3996 | 33.2843 | 1.1851 |
| 406 | 4.5604 | 0.88592 | 33.0049 | 2.5672 | 33.0049 | 0.3546 | 33.0049 | 1.2867 |
| 407 | 4.7336 | 0.86025 | 32.6985 | 2.4478 | 32.6985 | 0.2573 | 32.6985 | 1.3502 |
| 408 | 4.9020 | 0.83395 | 32.3713 | 2.3374 | 32.3713 | 0.1526 | 32.3713 | 1.3957 |
| 409 | 5.0666 | 0.80663 | 32.0294 | 2.2335 | 32.0294 | 0.0798 | 32.0294 | 1.4512 |
| 410 | 5.2286 | 0.77816 | 31.6780 | 2.1331 | 31.6780 | 0.0554 | 31.6780 | 1.5452 |
| 411 | 5.3896 | 0.74867 | 31.3203 | 2.0335 | 31.3203 | 0.0691 | 31.3203 | 1.6992 |
| 412 | 5.5504 | 0.71848 | 30.9575 | 1.9329 | 30.9575 | 0.0944 | 30.9575 | 1.9207 |
| 413 | 5.7121 | 0.68807 | 30.5887 | 1.8305 | 30.5887 | 0.1055 | 30.5887 | 2.2011 |
| 414 | 5.8755 | 0.65802 | 30.2112 | 1.7268 | 30.2112 | 0.0911 | 30.2112 | 2.5168 |
| 415 | 6.0403 | 0.62889 | 29.8213 | 1.6232 | 29.8213 | 0.0594 | 29.8213 | 2.8352 |
| 416 | 6.2061 | 0.60120 | 29.4151 | 1.5216 | 29.4151 | 0.0320 | 29.4151 | 3.1219 |
| 417 | 6.3717 | 0.57535 | 28.9892 | 1.4242 | 28.9892 | 0.0311 | 28.9892 | 3.3490 |
| 418 | 6.5359 | 0.55158 | 28.5414 | 1.3327 | 28.5414 | 0.0669 | 28.5414 | 3.5014 |
| 419 | 6.6969 | 0.52998 | 28.0714 | 1.2482 | 28.0714 | 0.1315 | 28.0714 | 3.5795 |
| 420 | 6.8533 | 0.51047 | 27.5802 | 1.1709 | 27.5802 | 0.2018 | 27.5802 | 3.5998 |

FIG. 5-2

| WAVELENGTH (nm) | COMPARATIVE EXAMPLE 1, OBJECT SIDE | COMPARATIVE EXAMPLE 1, EYEBALL SIDE | EXAMPLE 1, OBJECT SIDE | EXAMPLE 1, EYEBALL SIDE | EXAMPLE 2, OBJECT SIDE | EXAMPLE 2, EYEBALL SIDE | COMPARATIVE EXAMPLE 2, OBJECT SIDE | COMPARATIVE EXAMPLE 2, EYEBALL SIDE |
|---|---|---|---|---|---|---|---|---|
| 421 | 7.0026 | 0.49256 | 27.0743 | 1.1005 | 27.0743 | 0.2501 | 27.0743 | 3.5910 |
| 422 | 7.1447 | 0.47620 | 26.5537 | 1.0357 | 26.5537 | 0.2567 | 26.5537 | 3.5882 |
| 423 | 7.2790 | 0.46107 | 26.0225 | 0.9752 | 26.0225 | 0.2179 | 26.0225 | 3.6246 |
| 424 | 7.4049 | 0.44677 | 25.4851 | 0.9177 | 25.4851 | 0.1481 | 25.4851 | 3.7251 |
| 425 | 7.5225 | 0.43296 | 24.9454 | 0.8619 | 24.9454 | 0.0734 | 24.9454 | 3.8998 |
| 426 | 7.6319 | 0.41932 | 24.4066 | 0.8072 | 24.4066 | 0.0207 | 24.4066 | 4.1422 |
| 427 | 7.7339 | 0.40563 | 23.8705 | 0.7532 | 23.8705 | 0.0074 | 23.8705 | 4.4310 |
| 428 | 7.8293 | 0.39173 | 23.3380 | 0.7003 | 23.3380 | 0.0347 | 23.3380 | 4.7343 |
| 429 | 7.9191 | 0.37759 | 22.8085 | 0.6491 | 22.8085 | 0.0836 | 22.8085 | 5.0167 |
| 430 | 8.0044 | 0.36327 | 22.2807 | 0.6005 | 22.2807 | 0.1459 | 22.2807 | 5.2466 |
| 431 | 8.0860 | 0.34890 | 21.7528 | 0.5553 | 21.7528 | 0.1844 | 21.7528 | 5.4014 |
| 432 | 8.1649 | 0.33469 | 21.2230 | 0.5144 | 21.2230 | 0.1908 | 21.2230 | 5.4723 |
| 433 | 8.2417 | 0.32086 | 20.6895 | 0.4783 | 20.6895 | 0.1647 | 20.6895 | 5.4647 |
| 434 | 8.3167 | 0.30766 | 20.1516 | 0.4469 | 20.1516 | 0.1174 | 20.1516 | 5.3977 |
| 435 | 8.3899 | 0.29532 | 19.6092 | 0.4201 | 19.6092 | 0.0665 | 19.6092 | 5.3000 |
| 436 | 8.4611 | 0.28406 | 19.0632 | 0.3973 | 19.0632 | 0.0281 | 19.0632 | 5.2046 |
| 437 | 8.5300 | 0.27413 | 18.5155 | 0.3778 | 18.5155 | 0.0112 | 18.5155 | 5.1431 |
| 438 | 8.5957 | 0.26545 | 17.9687 | 0.3608 | 17.9687 | 0.0151 | 17.9687 | 5.1395 |
| 439 | 8.6574 | 0.25802 | 17.4256 | 0.3456 | 17.4256 | 0.0309 | 17.4256 | 5.2057 |
| 440 | 8.7142 | 0.25177 | 16.8894 | 0.3317 | 16.8894 | 0.0466 | 16.8894 | 5.3399 |
| 441 | 8.7650 | 0.24638 | 16.3647 | 0.3189 | 16.3647 | 0.0529 | 16.3647 | 5.5270 |
| 442 | 8.8097 | 0.24189 | 15.8517 | 0.3071 | 15.8517 | 0.0471 | 15.8517 | 5.7421 |
| 443 | 8.8478 | 0.23816 | 15.3519 | 0.2965 | 15.3519 | 0.0346 | 15.3519 | 5.9550 |
| 444 | 8.8790 | 0.23500 | 14.8664 | 0.2876 | 14.8664 | 0.0261 | 14.8664 | 6.1359 |
| 445 | 8.9031 | 0.23223 | 14.3955 | 0.2805 | 14.3955 | 0.0331 | 14.3955 | 6.2604 |
| 446 | 8.9203 | 0.22969 | 13.9386 | 0.2759 | 13.9386 | 0.0626 | 13.9386 | 6.3129 |
| 447 | 8.9307 | 0.22725 | 13.4949 | 0.2740 | 13.4949 | 0.1131 | 13.4949 | 6.2892 |
| 448 | 8.9348 | 0.22484 | 13.0630 | 0.2749 | 13.0630 | 0.1748 | 13.0630 | 6.1963 |
| 449 | 8.9333 | 0.22240 | 12.6417 | 0.2786 | 12.6417 | 0.2317 | 12.6417 | 6.0511 |
| 450 | 8.9269 | 0.21995 | 12.2298 | 0.2848 | 12.2298 | 0.2671 | 12.2298 | 5.8777 |
| 451 | 8.9162 | 0.21753 | 11.8264 | 0.2932 | 11.8264 | 0.2693 | 11.8264 | 5.7037 |
| 452 | 8.9020 | 0.21522 | 11.4311 | 0.3032 | 11.4311 | 0.2358 | 11.4311 | 5.5551 |
| 453 | 8.8850 | 0.21313 | 11.0439 | 0.3144 | 11.0439 | 0.1747 | 11.0439 | 5.4531 |
| 454 | 8.8660 | 0.21137 | 10.6656 | 0.3262 | 10.6656 | 0.1031 | 10.6656 | 5.4101 |
| 455 | 8.8451 | 0.21009 | 10.2970 | 0.3382 | 10.2970 | 0.0419 | 10.2970 | 5.4286 |
| 456 | 8.8227 | 0.20941 | 9.9394 | 0.3501 | 9.9394 | 0.0108 | 9.9394 | 5.5005 |
| 457 | 8.7991 | 0.20944 | 9.5941 | 0.3620 | 9.5941 | 0.0213 | 9.5941 | 5.6094 |
| 458 | 8.7740 | 0.21024 | 9.2625 | 0.3738 | 9.2625 | 0.0745 | 9.2625 | 5.7332 |
| 459 | 8.7474 | 0.21187 | 8.9458 | 0.3857 | 8.9458 | 0.1596 | 8.9458 | 5.8480 |
| 460 | 8.7190 | 0.21434 | 8.6445 | 0.3980 | 8.6445 | 0.2579 | 8.6445 | 5.9315 |

FIG. 5-3

| WAVELENGTH (nm) | COMPARATIVE EXAMPLE 1, OBJECT SIDE | COMPARATIVE EXAMPLE 1, EYEBALL SIDE | EXAMPLE 1, OBJECT SIDE | EXAMPLE 1, EYEBALL SIDE | EXAMPLE 2, OBJECT SIDE | EXAMPLE 2, EYEBALL SIDE | COMPARATIVE EXAMPLE 2, OBJECT SIDE | COMPARATIVE EXAMPLE 2, EYEBALL SIDE |
|---|---|---|---|---|---|---|---|---|
| 461 | 8.6882 | 0.21751 | 8.3598 | 0.4110 | 8.3598 | 0.3476 | 8.3598 | 5.9665 |
| 462 | 8.6549 | 0.22145 | 8.0908 | 0.4250 | 8.0908 | 0.4094 | 8.0908 | 5.9424 |
| 463 | 8.6186 | 0.22607 | 7.8370 | 0.4402 | 7.8370 | 0.4318 | 7.8370 | 5.8570 |
| 464 | 8.5789 | 0.23129 | 7.5976 | 0.4568 | 7.5976 | 0.4135 | 7.5976 | 5.7161 |
| 465 | 8.5355 | 0.23698 | 7.3713 | 0.4746 | 7.3713 | 0.3630 | 7.3713 | 5.5325 |
| 466 | 8.4884 | 0.24298 | 7.1570 | 0.4935 | 7.1570 | 0.2960 | 7.1570 | 5.3239 |
| 467 | 8.4370 | 0.24921 | 6.9532 | 0.5133 | 6.9532 | 0.2309 | 6.9532 | 5.1108 |
| 468 | 8.3813 | 0.25558 | 6.7586 | 0.5335 | 6.7586 | 0.1836 | 6.7586 | 4.9134 |
| 469 | 8.3215 | 0.26203 | 6.5722 | 0.5538 | 6.5722 | 0.1638 | 6.5722 | 4.7487 |
| 470 | 8.2575 | 0.26845 | 6.3930 | 0.5738 | 6.3930 | 0.1727 | 6.3930 | 4.6287 |
| 471 | 8.1894 | 0.27479 | 6.2204 | 0.5929 | 6.2204 | 0.2035 | 6.2204 | 4.5587 |
| 472 | 8.1178 | 0.28103 | 6.0542 | 0.6111 | 6.0542 | 0.2438 | 6.0542 | 4.5366 |
| 473 | 8.0429 | 0.28721 | 5.8943 | 0.6279 | 5.8943 | 0.2802 | 5.8943 | 4.5541 |
| 474 | 7.9653 | 0.29335 | 5.7408 | 0.6435 | 5.7408 | 0.3018 | 5.7408 | 4.5976 |
| 475 | 7.8855 | 0.29953 | 5.5942 | 0.6578 | 5.5942 | 0.3038 | 5.5942 | 4.6507 |
| 476 | 7.8039 | 0.30583 | 5.4549 | 0.6710 | 5.4549 | 0.2884 | 5.4549 | 4.6963 |
| 477 | 7.7211 | 0.31234 | 5.3232 | 0.6833 | 5.3232 | 0.2647 | 5.3232 | 4.7189 |
| 478 | 7.6374 | 0.31916 | 5.1995 | 0.6951 | 5.1995 | 0.2457 | 5.1995 | 4.7064 |
| 479 | 7.5533 | 0.32640 | 5.0840 | 0.7067 | 5.0840 | 0.2447 | 5.0840 | 4.6513 |
| 480 | 7.4690 | 0.33415 | 4.9766 | 0.7183 | 4.9766 | 0.2714 | 4.9766 | 4.5517 |
| 481 | 7.3849 | 0.34245 | 4.8772 | 0.7303 | 4.8772 | 0.3290 | 4.8772 | 4.4107 |
| 482 | 7.3009 | 0.35138 | 4.7852 | 0.7425 | 4.7852 | 0.4127 | 4.7852 | 4.2362 |
| 483 | 7.2172 | 0.36099 | 4.6999 | 0.7552 | 4.6999 | 0.5103 | 4.6999 | 4.0398 |
| 484 | 7.1336 | 0.37128 | 4.6204 | 0.7683 | 4.6204 | 0.6049 | 4.6204 | 3.8350 |
| 485 | 7.0501 | 0.38224 | 4.5457 | 0.7814 | 4.5457 | 0.6787 | 4.5457 | 3.6360 |
| 486 | 6.9665 | 0.39383 | 4.4750 | 0.7945 | 4.4750 | 0.7166 | 4.4750 | 3.4556 |
| 487 | 6.8827 | 0.40601 | 4.4072 | 0.8071 | 4.4072 | 0.7100 | 4.4072 | 3.3041 |
| 488 | 6.7983 | 0.41869 | 4.3414 | 0.8190 | 4.3414 | 0.6585 | 4.3414 | 3.1878 |
| 489 | 6.7130 | 0.43178 | 4.2769 | 0.8298 | 4.2769 | 0.5706 | 4.2769 | 3.1089 |
| 490 | 6.6266 | 0.44516 | 4.2131 | 0.8392 | 4.2131 | 0.4620 | 4.2131 | 3.0652 |
| 491 | 6.5388 | 0.45874 | 4.1495 | 0.8471 | 4.1495 | 0.3526 | 4.1495 | 3.0504 |
| 492 | 6.4495 | 0.47242 | 4.0858 | 0.8532 | 4.0858 | 0.2630 | 4.0858 | 3.0555 |
| 493 | 6.3585 | 0.48609 | 4.0221 | 0.8575 | 4.0221 | 0.2104 | 4.0221 | 3.0698 |
| 494 | 6.2674 | 0.49933 | 3.9584 | 0.8601 | 3.9584 | 0.2051 | 3.9584 | 3.0820 |
| 495 | 6.1747 | 0.51238 | 3.8950 | 0.8612 | 3.8950 | 0.2487 | 3.8950 | 3.0614 |
| 496 | 6.0802 | 0.52521 | 3.8321 | 0.8610 | 3.8321 | 0.3342 | 3.8321 | 3.0144 |
| 497 | 5.9840 | 0.53780 | 3.7702 | 0.8597 | 3.7702 | 0.4472 | 3.7702 | 3.0144 |
| 498 | 5.8864 | 0.55015 | 3.7094 | 0.8576 | 3.7094 | 0.5693 | 3.7094 | 2.9387 |
| 499 | 5.7875 | 0.56229 | 3.6503 | 0.8551 | 3.6503 | 0.6813 | 3.6503 | 2.8348 |
| 500 | 5.6877 | 0.57424 | 3.5929 | 0.8524 | 3.5929 | 0.7671 | 3.5929 | 2.7064 |

FIG. 5-4

| WAVELENGTH (nm) | COMPARATIVE EXAMPLE 1, OBJECT SIDE | COMPARATIVE EXAMPLE 1, EYEBALL SIDE | EXAMPLE 1, OBJECT SIDE | EXAMPLE 1, EYEBALL SIDE | EXAMPLE 2, OBJECT SIDE | EXAMPLE 2, EYEBALL SIDE | COMPARATIVE EXAMPLE 2, OBJECT SIDE | COMPARATIVE EXAMPLE 2, EYEBALL SIDE |
|---|---|---|---|---|---|---|---|---|
| 501 | 5.5872 | 0.58620 | 3.5377 | 0.8498 | 3.5377 | 0.8157 | 3.5377 | 2.5596 |
| 502 | 5.4852 | 0.59836 | 3.4843 | 0.8474 | 3.4843 | 0.8236 | 3.4843 | 2.4021 |
| 503 | 5.3832 | 0.61057 | 3.4326 | 0.8452 | 3.4326 | 0.7941 | 3.4326 | 2.2427 |
| 504 | 5.2814 | 0.62294 | 3.3824 | 0.8432 | 3.3824 | 0.7364 | 3.3824 | 2.0898 |
| 505 | 5.1802 | 0.63554 | 3.3333 | 0.8413 | 3.3333 | 0.6640 | 3.3333 | 1.9510 |
| 506 | 5.0798 | 0.64849 | 3.2850 | 0.8394 | 3.2850 | 0.5912 | 3.2850 | 1.8323 |
| 507 | 4.9805 | 0.66187 | 3.2368 | 0.8373 | 3.2368 | 0.5310 | 3.2368 | 1.7374 |
| 508 | 4.8825 | 0.67575 | 3.1885 | 0.8347 | 3.1885 | 0.4923 | 3.1885 | 1.6675 |
| 509 | 4.7858 | 0.69021 | 3.1394 | 0.8313 | 3.1394 | 0.4789 | 3.1394 | 1.6216 |
| 510 | 4.6907 | 0.70527 | 3.0892 | 0.8271 | 3.0892 | 0.4891 | 3.0892 | 1.5964 |
| 511 | 4.5971 | 0.72098 | 3.0376 | 0.8216 | 3.0376 | 0.5165 | 3.0376 | 1.5869 |
| 512 | 4.5050 | 0.73733 | 2.9842 | 0.8149 | 2.9842 | 0.5515 | 2.9842 | 1.5869 |
| 513 | 4.4144 | 0.75430 | 2.9290 | 0.8068 | 2.9290 | 0.5840 | 2.9290 | 1.5900 |
| 514 | 4.3251 | 0.77184 | 2.8719 | 0.7973 | 2.8719 | 0.6051 | 2.8719 | 1.5898 |
| 515 | 4.2371 | 0.78990 | 2.8130 | 0.7864 | 2.8130 | 0.6091 | 2.8130 | 1.5809 |
| 516 | 4.1501 | 0.80843 | 2.7524 | 0.7743 | 2.7524 | 0.5947 | 2.7524 | 1.5591 |
| 517 | 4.0640 | 0.82732 | 2.6903 | 0.7611 | 2.6903 | 0.5651 | 2.6903 | 1.5218 |
| 518 | 3.9786 | 0.84649 | 2.6272 | 0.7471 | 2.6272 | 0.5273 | 2.6272 | 1.4681 |
| 519 | 3.8936 | 0.86582 | 2.5633 | 0.7324 | 2.5633 | 0.4910 | 2.5633 | 1.3986 |
| 520 | 3.8091 | 0.88522 | 2.4991 | 0.7174 | 2.4991 | 0.4662 | 2.4991 | 1.3157 |
| 521 | 3.7249 | 0.90467 | 2.4351 | 0.7024 | 2.4351 | 0.4618 | 2.4351 | 1.2229 |
| 522 | 3.6408 | 0.92400 | 2.3715 | 0.6875 | 2.3715 | 0.4835 | 2.3715 | 1.1243 |
| 523 | 3.5569 | 0.94308 | 2.3084 | 0.6729 | 2.3084 | 0.5324 | 2.3084 | 1.0248 |
| 524 | 3.4729 | 0.96188 | 2.2463 | 0.6586 | 2.2463 | 0.6052 | 2.2463 | 0.9289 |
| 525 | 3.3889 | 0.98035 | 2.1851 | 0.6449 | 2.1851 | 0.6940 | 2.1851 | 0.8408 |
| 526 | 3.3048 | 0.99844 | 2.1251 | 0.6316 | 2.1251 | 0.7877 | 2.1251 | 0.7638 |
| 527 | 3.2208 | 1.01615 | 2.0661 | 0.6188 | 2.0661 | 0.8738 | 2.0661 | 0.7002 |
| 528 | 3.1368 | 1.03347 | 2.0083 | 0.6063 | 2.0083 | 0.9404 | 2.0083 | 0.6512 |
| 529 | 3.0531 | 1.05029 | 1.9515 | 0.5941 | 1.9515 | 0.9776 | 1.9515 | 0.6165 |
| 530 | 2.9697 | 1.06708 | 1.8955 | 0.5821 | 1.8955 | 0.9795 | 1.8955 | 0.5951 |
| 531 | 2.8868 | 1.08346 | 1.8401 | 0.5699 | 1.8401 | 0.9446 | 1.8401 | 0.5846 |
| 532 | 2.8046 | 1.09965 | 1.7852 | 0.5576 | 1.7852 | 0.8765 | 1.7852 | 0.5823 |
| 533 | 2.7232 | 1.11575 | 1.7306 | 0.5449 | 1.7306 | 0.7831 | 1.7306 | 0.5849 |
| 534 | 2.6429 | 1.13184 | 1.6761 | 0.5317 | 1.6761 | 0.6758 | 1.6761 | 0.5891 |
| 535 | 2.5637 | 1.14802 | 1.6215 | 0.5180 | 1.6215 | 0.5678 | 1.6215 | 0.5917 |
| 536 | 2.4860 | 1.16438 | 1.5667 | 0.5035 | 1.5667 | 0.4723 | 1.5667 | 0.5901 |
| 537 | 2.4099 | 1.18096 | 1.5116 | 0.4884 | 1.5116 | 0.4010 | 1.5116 | 0.5822 |
| 538 | 2.3354 | 1.19794 | 1.4563 | 0.4727 | 1.4563 | 0.3622 | 1.4563 | 0.5668 |
| 539 | 2.2626 | 1.21539 | 1.4007 | 0.4564 | 1.4007 | 0.3599 | 1.4007 | 0.5433 |
| 540 | 2.1916 | 1.23339 | 1.3449 | 0.4396 | 1.3449 | 0.3936 | 1.3449 | 0.5121 |
| 541 | 2.1226 | 1.25209 | 1.2894 | 0.4225 | 1.2894 | 0.4580 | 1.2894 | 0.4742 |
| 542 | 2.0554 | 1.27143 | 1.2339 | 0.4053 | 1.2339 | 0.5445 | 1.2339 | 0.4312 |
| 543 | 1.9900 | 1.29142 | 1.1788 | 0.3880 | 1.1788 | 0.6423 | 1.1788 | 0.3850 |
| 544 | 1.9264 | 1.31208 | 1.1242 | 0.3709 | 1.1242 | 0.7395 | 1.1242 | 0.3378 |
| 545 | 1.8646 | 1.33339 | 1.0703 | 0.3540 | 1.0703 | 0.8253 | 1.0703 | 0.2919 |
| 546 | 1.8044 | 1.35530 | 1.0174 | 0.3376 | 1.0174 | 0.8911 | 1.0174 | 0.2491 |
| 547 | 1.7459 | 1.37773 | 0.9657 | 0.3217 | 0.9657 | 0.9311 | 0.9657 | 0.2113 |
| 548 | 1.6888 | 1.40065 | 0.9154 | 0.3065 | 0.9154 | 0.9431 | 0.9154 | 0.1797 |
| 549 | 1.6332 | 1.42398 | 0.8666 | 0.2919 | 0.8666 | 0.9288 | 0.8666 | 0.1550 |
| 550 | 1.5788 | 1.44762 | 0.8195 | 0.2781 | 0.8195 | 0.8926 | 0.8195 | 0.1375 |

FIG. 5-5

| WAVELENGTH (nm) | COMPARATIVE EXAMPLE 1, OBJECT SIDE | COMPARATIVE EXAMPLE 1, EYEBALL SIDE | EXAMPLE 1, OBJECT SIDE | EXAMPLE 1, EYEBALL SIDE | EXAMPLE 2, OBJECT SIDE | EXAMPLE 2, EYEBALL SIDE | COMPARATIVE EXAMPLE 2, OBJECT SIDE | COMPARATIVE EXAMPLE 2, EYEBALL SIDE |
|---|---|---|---|---|---|---|---|---|
| 551 | 1.5256 | 1.47148 | 0.7742 | 0.2649 | 0.7742 | 0.8414 | 0.7742 | 0.1269 |
| 552 | 1.4734 | 1.49546 | 0.7307 | 0.2524 | 0.7307 | 0.7835 | 0.7307 | 0.1224 |
| 553 | 1.4221 | 1.51944 | 0.6890 | 0.2405 | 0.6890 | 0.7271 | 0.6890 | 0.1229 |
| 554 | 1.3717 | 1.54333 | 0.6492 | 0.2291 | 0.6492 | 0.6795 | 0.6492 | 0.1270 |
| 555 | 1.3221 | 1.56702 | 0.6112 | 0.2181 | 0.6112 | 0.6461 | 0.6112 | 0.1331 |
| 556 | 1.2732 | 1.59043 | 0.5749 | 0.2074 | 0.5749 | 0.6298 | 0.5749 | 0.1399 |
| 557 | 1.2249 | 1.61347 | 0.5404 | 0.1970 | 0.5404 | 0.6307 | 0.5404 | 0.1458 |
| 558 | 1.1773 | 1.63608 | 0.5073 | 0.1868 | 0.5073 | 0.6464 | 0.5073 | 0.1496 |
| 559 | 1.1303 | 1.65820 | 0.4758 | 0.1766 | 0.4758 | 0.6725 | 0.4758 | 0.1510 |
| 560 | 1.0839 | 1.67981 | 0.4456 | 0.1664 | 0.4456 | 0.7033 | 0.4456 | 0.1488 |
| 561 | 1.0383 | 1.70099 | 0.4168 | 0.1563 | 0.4168 | 0.7328 | 0.4168 | 0.1430 |
| 562 | 0.9933 | 1.72164 | 0.3892 | 0.1461 | 0.3892 | 0.7556 | 0.3892 | 0.1337 |
| 563 | 0.9491 | 1.74177 | 0.3626 | 0.1360 | 0.3626 | 0.7676 | 0.3626 | 0.1215 |
| 564 | 0.9056 | 1.76142 | 0.3372 | 0.1259 | 0.3372 | 0.7666 | 0.3372 | 0.1071 |
| 565 | 0.8630 | 1.78063 | 0.3127 | 0.1158 | 0.3127 | 0.7530 | 0.3127 | 0.0913 |
| 566 | 0.8212 | 1.79948 | 0.2892 | 0.1059 | 0.2892 | 0.7289 | 0.2892 | 0.0751 |
| 567 | 0.7804 | 1.81802 | 0.2666 | 0.0962 | 0.2666 | 0.6988 | 0.2666 | 0.0595 |
| 568 | 0.7407 | 1.83636 | 0.2451 | 0.0868 | 0.2451 | 0.6682 | 0.2451 | 0.0453 |
| 569 | 0.7020 | 1.85458 | 0.2245 | 0.0777 | 0.2245 | 0.6434 | 0.2245 | 0.0335 |
| 570 | 0.6645 | 1.87279 | 0.2049 | 0.0691 | 0.2049 | 0.6304 | 0.2049 | 0.0246 |
| 571 | 0.6282 | 1.89108 | 0.1863 | 0.0610 | 0.1863 | 0.6342 | 0.1863 | 0.0189 |
| 572 | 0.5931 | 1.90956 | 0.1689 | 0.0534 | 0.1689 | 0.6579 | 0.1689 | 0.0165 |
| 573 | 0.5594 | 1.92832 | 0.1525 | 0.0464 | 0.1525 | 0.7026 | 0.1525 | 0.0174 |
| 574 | 0.5269 | 1.94745 | 0.1372 | 0.0400 | 0.1372 | 0.7669 | 0.1372 | 0.0212 |
| 575 | 0.4958 | 1.96705 | 0.1231 | 0.0342 | 0.1231 | 0.8469 | 0.1231 | 0.0274 |
| 576 | 0.4661 | 1.98717 | 0.1102 | 0.0290 | 0.1102 | 0.9369 | 0.1102 | 0.0352 |
| 577 | 0.4377 | 2.00789 | 0.0984 | 0.0244 | 0.0984 | 1.0297 | 0.0984 | 0.0440 |
| 578 | 0.4105 | 2.02923 | 0.0878 | 0.0204 | 0.0878 | 1.1177 | 0.0878 | 0.0529 |
| 579 | 0.3847 | 2.05120 | 0.0783 | 0.0170 | 0.0783 | 1.1931 | 0.0783 | 0.0612 |
| 580 | 0.3602 | 2.07380 | 0.0700 | 0.0138 | 0.0700 | 1.2496 | 0.0700 | 0.0683 |
| 581 | 0.3369 | 2.09718 | 0.0627 | 0.0112 | 0.0627 | 1.2820 | 0.0627 | 0.0737 |
| 582 | 0.3148 | 2.12122 | 0.0566 | 0.0090 | 0.0566 | 1.2877 | 0.0566 | 0.0768 |
| 583 | 0.2938 | 2.14590 | 0.0514 | 0.0071 | 0.0514 | 1.2664 | 0.0514 | 0.0777 |
| 584 | 0.2738 | 2.17116 | 0.0472 | 0.0055 | 0.0472 | 1.2202 | 0.0472 | 0.0762 |
| 585 | 0.2548 | 2.19694 | 0.0440 | 0.0041 | 0.0440 | 1.1538 | 0.0440 | 0.0726 |
| 586 | 0.2367 | 2.22317 | 0.0415 | 0.0031 | 0.0415 | 1.0735 | 0.0415 | 0.0672 |
| 587 | 0.2195 | 2.24978 | 0.0399 | 0.0023 | 0.0399 | 0.9872 | 0.0399 | 0.0604 |
| 588 | 0.2031 | 2.27666 | 0.0391 | 0.0017 | 0.0391 | 0.9035 | 0.0391 | 0.0529 |
| 589 | 0.1875 | 2.30372 | 0.0390 | 0.0014 | 0.0390 | 0.8306 | 0.0390 | 0.0452 |
| 590 | 0.1726 | 2.33084 | 0.0395 | 0.0015 | 0.0395 | 0.7760 | 0.0395 | 0.0381 |
| 591 | 0.1584 | 2.35790 | 0.0408 | 0.0018 | 0.0408 | 0.7456 | 0.0408 | 0.0320 |
| 592 | 0.1448 | 2.38482 | 0.0426 | 0.0025 | 0.0426 | 0.7432 | 0.0426 | 0.0275 |
| 593 | 0.1319 | 2.41151 | 0.0451 | 0.0036 | 0.0451 | 0.7702 | 0.0451 | 0.0250 |
| 594 | 0.1195 | 2.43789 | 0.0481 | 0.0051 | 0.0481 | 0.8254 | 0.0481 | 0.0249 |
| 595 | 0.1078 | 2.46388 | 0.0517 | 0.0070 | 0.0517 | 0.9055 | 0.0517 | 0.0270 |
| 596 | 0.0966 | 2.48940 | 0.0558 | 0.0095 | 0.0558 | 1.0050 | 0.0558 | 0.0316 |
| 597 | 0.0859 | 2.51438 | 0.0605 | 0.0124 | 0.0605 | 1.1171 | 0.0605 | 0.0384 |
| 598 | 0.0759 | 2.53877 | 0.0656 | 0.0159 | 0.0656 | 1.2343 | 0.0656 | 0.0471 |
| 599 | 0.0664 | 2.56254 | 0.0713 | 0.0199 | 0.0713 | 1.3491 | 0.0713 | 0.0572 |
| 600 | 0.0575 | 2.58566 | 0.0774 | 0.0244 | 0.0774 | 1.4544 | 0.0774 | 0.0683 |

FIG. 5-6

| WAVELENGTH (nm) | COMPARATIVE EXAMPLE 1, OBJECT SIDE | COMPARATIVE EXAMPLE 1, EYEBALL SIDE | EXAMPLE 1, OBJECT SIDE | EXAMPLE 1, EYEBALL SIDE | EXAMPLE 2, OBJECT SIDE | EXAMPLE 2, EYEBALL SIDE | COMPARATIVE EXAMPLE 2, OBJECT SIDE | COMPARATIVE EXAMPLE 2, EYEBALL SIDE |
|---|---|---|---|---|---|---|---|---|
| 601 | 0.0492 | 2.60821 | 0.0839 | 0.0293 | 0.0839 | 1.5445 | 0.0839 | 0.0798 |
| 602 | 0.0415 | 2.63011 | 0.0909 | 0.0347 | 0.0909 | 1.6152 | 0.0909 | 0.0910 |
| 603 | 0.0345 | 2.65137 | 0.0982 | 0.0405 | 0.0982 | 1.6641 | 0.0982 | 0.1014 |
| 604 | 0.0281 | 2.67204 | 0.1058 | 0.0466 | 0.1058 | 1.6907 | 0.1058 | 0.1105 |
| 605 | 0.0223 | 2.69216 | 0.1136 | 0.0531 | 0.1136 | 1.6966 | 0.1136 | 0.1178 |
| 606 | 0.0172 | 2.71178 | 0.1217 | 0.0597 | 0.1217 | 1.6850 | 0.1217 | 0.1230 |
| 607 | 0.0127 | 2.73097 | 0.1299 | 0.0666 | 0.1299 | 1.6603 | 0.1299 | 0.1258 |
| 608 | 0.0089 | 2.74981 | 0.1382 | 0.0737 | 0.1382 | 1.6278 | 0.1382 | 0.1263 |
| 609 | 0.0058 | 2.76838 | 0.1465 | 0.0808 | 0.1465 | 1.5933 | 0.1465 | 0.1243 |
| 610 | 0.0034 | 2.78677 | 0.1548 | 0.0880 | 0.1548 | 1.5623 | 0.1548 | 0.1202 |
| 611 | 0.0017 | 2.80508 | 0.1630 | 0.0951 | 0.1630 | 1.5397 | 0.1630 | 0.1142 |
| 612 | 0.0005 | 2.82341 | 0.1709 | 0.1023 | 0.1709 | 1.5293 | 0.1709 | 0.1066 |
| 613 | 0.0001 | 2.84184 | 0.1787 | 0.1095 | 0.1787 | 1.5336 | 0.1787 | 0.0981 |
| 614 | 0.0002 | 2.86047 | 0.1861 | 0.1167 | 0.1861 | 1.5536 | 0.1861 | 0.0890 |
| 615 | 0.0010 | 2.87939 | 0.1932 | 0.1240 | 0.1932 | 1.5886 | 0.1932 | 0.0799 |
| 616 | 0.0023 | 2.89869 | 0.2000 | 0.1312 | 0.2000 | 1.6367 | 0.2000 | 0.0714 |
| 617 | 0.0042 | 2.91843 | 0.2063 | 0.1385 | 0.2063 | 1.6946 | 0.2063 | 0.0640 |
| 618 | 0.0066 | 2.93870 | 0.2122 | 0.1460 | 0.2122 | 1.7583 | 0.2122 | 0.0580 |
| 619 | 0.0095 | 2.95954 | 0.2177 | 0.1537 | 0.2177 | 1.8235 | 0.2177 | 0.0539 |
| 620 | 0.0128 | 2.98100 | 0.2228 | 0.1616 | 0.2228 | 1.8858 | 0.2228 | 0.0518 |
| 621 | 0.0166 | 3.00318 | 0.2275 | 0.1698 | 0.2275 | 1.9413 | 0.2275 | 0.0520 |
| 622 | 0.0207 | 3.02604 | 0.2318 | 0.1784 | 0.2318 | 1.9870 | 0.2318 | 0.0544 |
| 623 | 0.0252 | 3.04959 | 0.2357 | 0.1873 | 0.2357 | 2.0209 | 0.2357 | 0.0590 |
| 624 | 0.0300 | 3.07381 | 0.2393 | 0.1968 | 0.2393 | 2.0423 | 0.2393 | 0.0655 |
| 625 | 0.0351 | 3.09869 | 0.2425 | 0.2068 | 0.2425 | 2.0519 | 0.2425 | 0.0736 |
| 626 | 0.0405 | 3.12418 | 0.2456 | 0.2173 | 0.2456 | 2.0517 | 0.2456 | 0.0829 |
| 627 | 0.0462 | 3.15027 | 0.2483 | 0.2284 | 0.2483 | 2.0448 | 0.2463 | 0.0931 |
| 628 | 0.0520 | 3.17690 | 0.2509 | 0.2400 | 0.2509 | 2.0354 | 0.2509 | 0.1036 |
| 629 | 0.0582 | 3.20401 | 0.2534 | 0.2522 | 0.2534 | 2.0279 | 0.2534 | 0.1139 |
| 630 | 0.0645 | 3.23154 | 0.2558 | 0.2649 | 0.2558 | 2.0273 | 0.2558 | 0.1236 |
| 631 | 0.0710 | 3.25940 | 0.2581 | 0.2781 | 0.2581 | 2.0360 | 0.2581 | 0.1322 |
| 632 | 0.0777 | 3.28752 | 0.2603 | 0.2918 | 0.2603 | 2.0642 | 0.2603 | 0.1394 |
| 633 | 0.0847 | 3.31581 | 0.2625 | 0.3058 | 0.2625 | 2.1089 | 0.2625 | 0.1447 |
| 634 | 0.0919 | 3.34417 | 0.2647 | 0.3202 | 0.2647 | 2.1739 | 0.2647 | 0.1480 |
| 635 | 0.0992 | 3.37252 | 0.2669 | 0.3347 | 0.2669 | 2.2595 | 0.2669 | 0.1492 |
| 636 | 0.1069 | 3.40076 | 0.2690 | 0.3494 | 0.2690 | 2.3646 | 0.2690 | 0.1481 |
| 637 | 0.1147 | 3.42881 | 0.2711 | 0.3642 | 0.2711 | 2.4868 | 0.2711 | 0.1450 |
| 638 | 0.1229 | 3.45657 | 0.2732 | 0.3789 | 0.2732 | 2.6221 | 0.2732 | 0.1399 |
| 639 | 0.1313 | 3.48396 | 0.2752 | 0.3935 | 0.2752 | 2.7656 | 0.2752 | 0.1332 |
| 640 | 0.1400 | 3.51092 | 0.2770 | 0.4080 | 0.2770 | 2.9117 | 0.2770 | 0.1250 |
| 641 | 0.1490 | 3.53741 | 0.2787 | 0.4221 | 0.2787 | 3.0546 | 0.2787 | 0.1159 |
| 642 | 0.1584 | 3.56333 | 0.2802 | 0.4360 | 0.2802 | 3.1883 | 0.2802 | 0.1063 |
| 643 | 0.1680 | 3.58864 | 0.2815 | 0.4495 | 0.2815 | 3.3073 | 0.2815 | 0.0966 |
| 644 | 0.1781 | 3.61327 | 0.2824 | 0.4625 | 0.2824 | 3.4069 | 0.2824 | 0.0872 |
| 645 | 0.1885 | 3.63718 | 0.2830 | 0.4753 | 0.2830 | 3.4836 | 0.2830 | 0.0787 |
| 646 | 0.1994 | 3.66037 | 0.2832 | 0.4876 | 0.2832 | 3.5350 | 0.2832 | 0.0713 |
| 647 | 0.2106 | 3.68284 | 0.2830 | 0.4995 | 0.2830 | 3.5602 | 0.2830 | 0.0655 |
| 648 | 0.2222 | 3.70459 | 0.2823 | 0.5112 | 0.2823 | 3.5598 | 0.2823 | 0.0615 |
| 649 | 0.2342 | 3.72562 | 0.2811 | 0.5225 | 0.2811 | 3.5358 | 0.2811 | 0.0595 |
| 650 | 0.2465 | 3.74597 | 0.2793 | 0.5335 | 0.2793 | 3.4917 | 0.2793 | 0.0596 |

FIG. 5-7

| WAVELENGTH (nm) | COMPARATIVE EXAMPLE 1, OBJECT SIDE | COMPARATIVE EXAMPLE 1, EYEBALL SIDE | EXAMPLE 1, OBJECT SIDE | EXAMPLE 1, EYEBALL SIDE | EXAMPLE 2, OBJECT SIDE | EXAMPLE 2, EYEBALL SIDE | COMPARATIVE EXAMPLE 2, OBJECT SIDE | COMPARATIVE EXAMPLE 2, EYEBALL SIDE |
|---|---|---|---|---|---|---|---|---|
| 651 | 0.2593 | 3.76566 | 0.2770 | 0.5444 | 0.2770 | 3.4320 | 0.2770 | 0.0618 |
| 652 | 0.2724 | 3.78473 | 0.2741 | 0.5553 | 0.2741 | 3.3623 | 0.2741 | 0.0661 |
| 653 | 0.2859 | 3.80324 | 0.2707 | 0.5661 | 0.2707 | 3.2887 | 0.2707 | 0.0723 |
| 654 | 0.2997 | 3.82124 | 0.2667 | 0.5770 | 0.2667 | 3.2177 | 0.2667 | 0.0802 |
| 655 | 0.3139 | 3.83880 | 0.2621 | 0.5881 | 0.2621 | 3.1557 | 0.2621 | 0.0895 |
| 656 | 0.3283 | 3.85599 | 0.2570 | 0.5995 | 0.2570 | 3.1085 | 0.2570 | 0.0997 |
| 657 | 0.3429 | 3.87288 | 0.2515 | 0.6113 | 0.2515 | 3.0812 | 0.2515 | 0.1107 |
| 658 | 0.3578 | 3.88954 | 0.2455 | 0.6234 | 0.2455 | 3.0779 | 0.2455 | 0.1218 |
| 659 | 0.3729 | 3.90608 | 0.2390 | 0.6361 | 0.2390 | 3.1014 | 0.2390 | 0.1328 |
| 660 | 0.3881 | 3.92256 | 0.2323 | 0.6494 | 0.2323 | 3.1529 | 0.2323 | 0.1432 |
| 661 | 0.4034 | 3.93914 | 0.2252 | 0.6633 | 0.2252 | 3.2322 | 0.2252 | 0.1527 |
| 662 | 0.4188 | 3.95583 | 0.2179 | 0.6778 | 0.2179 | 3.3377 | 0.2179 | 0.1608 |
| 663 | 0.4342 | 3.97272 | 0.2104 | 0.6929 | 0.2104 | 3.4663 | 0.2104 | 0.1675 |
| 664 | 0.4497 | 3.98986 | 0.2028 | 0.7087 | 0.2028 | 3.6140 | 0.2028 | 0.1724 |
| 665 | 0.4651 | 4.00738 | 0.1951 | 0.7251 | 0.1951 | 3.7759 | 0.1951 | 0.1755 |
| 666 | 0.4804 | 4.02529 | 0.1874 | 0.7421 | 0.1874 | 3.9464 | 0.1874 | 0.1767 |
| 667 | 0.4956 | 4.04366 | 0.1798 | 0.7596 | 0.1798 | 4.1199 | 0.1798 | 0.1760 |
| 668 | 0.5107 | 4.06255 | 0.1722 | 0.7776 | 0.1722 | 4.2908 | 0.1722 | 0.1736 |
| 669 | 0.5256 | 4.08199 | 0.1648 | 0.7960 | 0.1648 | 4.4539 | 0.1648 | 0.1696 |
| 670 | 0.5403 | 4.10203 | 0.1575 | 0.8146 | 0.1575 | 4.6047 | 0.1575 | 0.1643 |
| 671 | 0.5548 | 4.12270 | 0.1505 | 0.8335 | 0.1505 | 4.7394 | 0.1505 | 0.1580 |
| 672 | 0.5691 | 4.14400 | 0.1437 | 0.8524 | 0.1437 | 4.8554 | 0.1437 | 0.1511 |
| 673 | 0.5832 | 4.16596 | 0.1372 | 0.8713 | 0.1372 | 4.9511 | 0.1372 | 0.1440 |
| 674 | 0.5970 | 4.18856 | 0.1309 | 0.8902 | 0.1309 | 5.0260 | 0.1309 | 0.1370 |
| 675 | 0.6106 | 4.21181 | 0.1249 | 0.9088 | 0.1249 | 5.0807 | 0.1249 | 0.1307 |
| 676 | 0.6239 | 4.23570 | 0.1192 | 0.9271 | 0.1192 | 5.1167 | 0.1192 | 0.1253 |
| 677 | 0.6370 | 4.26018 | 0.1138 | 0.9451 | 0.1138 | 5.1367 | 0.1138 | 0.1213 |
| 678 | 0.6499 | 4.28522 | 0.1086 | 0.9626 | 0.1086 | 5.1439 | 0.1086 | 0.1189 |
| 679 | 0.6625 | 4.31077 | 0.1036 | 0.9796 | 0.1036 | 5.1419 | 0.1036 | 0.1186 |
| 680 | 0.6749 | 4.33679 | 0.0989 | 0.9960 | 0.0989 | 5.1348 | 0.0989 | 0.1204 |
| 681 | 0.6872 | 4.36323 | 0.0944 | 1.0118 | 0.0944 | 5.1268 | 0.0944 | 0.1246 |
| 682 | 0.6993 | 4.39002 | 0.0901 | 1.0270 | 0.0901 | 5.1218 | 0.0901 | 0.1313 |
| 683 | 0.7113 | 4.41708 | 0.0859 | 1.0416 | 0.0859 | 5.1235 | 0.0859 | 0.1403 |
| 684 | 0.7232 | 4.44434 | 0.0819 | 1.0555 | 0.0819 | 5.1348 | 0.0819 | 0.1517 |
| 685 | 0.7351 | 4.47174 | 0.0780 | 1.0690 | 0.0780 | 5.1581 | 0.0780 | 0.1654 |
| 686 | 0.7469 | 4.49920 | 0.0741 | 1.0818 | 0.0741 | 5.1949 | 0.0741 | 0.1810 |
| 687 | 0.7587 | 4.52664 | 0.0704 | 1.0943 | 0.0704 | 5.2460 | 0.0704 | 0.1983 |
| 688 | 0.7705 | 4.55398 | 0.0668 | 1.1063 | 0.0668 | 5.3109 | 0.0668 | 0.2170 |
| 689 | 0.7824 | 4.58116 | 0.0632 | 1.1181 | 0.0632 | 5.3886 | 0.0632 | 0.2367 |
| 690 | 0.7945 | 4.60809 | 0.0597 | 1.1296 | 0.0597 | 5.4774 | 0.0597 | 0.2571 |
| 691 | 0.8066 | 4.63471 | 0.0562 | 1.1410 | 0.0562 | 5.5746 | 0.0562 | 0.2777 |
| 692 | 0.8190 | 4.66095 | 0.0528 | 1.1525 | 0.0528 | 5.6775 | 0.0528 | 0.2981 |
| 693 | 0.8315 | 4.68675 | 0.0495 | 1.1640 | 0.0495 | 5.7829 | 0.0495 | 0.3179 |
| 694 | 0.8443 | 4.71204 | 0.0464 | 1.1758 | 0.0464 | 5.8876 | 0.0464 | 0.3367 |
| 695 | 0.8572 | 4.73678 | 0.0433 | 1.1879 | 0.0433 | 5.9882 | 0.0433 | 0.3542 |
| 696 | 0.8705 | 4.76092 | 0.0404 | 1.2004 | 0.0404 | 6.0822 | 0.0404 | 0.3702 |
| 697 | 0.8841 | 4.78442 | 0.0377 | 1.2134 | 0.0377 | 6.1669 | 0.0377 | 0.3843 |
| 698 | 0.8979 | 4.80725 | 0.0353 | 1.2270 | 0.0353 | 6.2406 | 0.0353 | 0.3965 |
| 699 | 0.9120 | 4.82937 | 0.0331 | 1.2413 | 0.0331 | 6.3021 | 0.0331 | 0.4066 |
| 700 | 0.9265 | 4.85078 | 0.0312 | 1.2563 | 0.0312 | 6.3510 | 0.0312 | 0.4146 |

FIG. 5-8

| WAVELENGTH (nm) | COMPARATIVE EXAMPLE 1, OBJECT SIDE | COMPARATIVE EXAMPLE 1, EYEBALL SIDE | EXAMPLE 1, OBJECT SIDE | EXAMPLE 1, EYEBALL SIDE | EXAMPLE 2, OBJECT SIDE | EXAMPLE 2, EYEBALL SIDE | COMPARATIVE EXAMPLE 2, OBJECT SIDE | COMPARATIVE EXAMPLE 2, EYEBALL SIDE |
|---|---|---|---|---|---|---|---|---|
| 701 | 0.9413 | 4.87146 | 0.0297 | 1.2721 | 0.0297 | 6.3874 | 0.0297 | 0.4205 |
| 702 | 0.9563 | 4.89141 | 0.0286 | 1.2886 | 0.0286 | 6.4125 | 0.0286 | 0.4244 |
| 703 | 0.9717 | 4.91063 | 0.0279 | 1.3060 | 0.0279 | 6.4280 | 0.0279 | 0.4267 |
| 704 | 0.9874 | 4.92913 | 0.0277 | 1.3241 | 0.0277 | 6.4361 | 0.0277 | 0.4274 |
| 705 | 1.0033 | 4.94696 | 0.0280 | 1.3430 | 0.0280 | 6.4398 | 0.0280 | 0.4269 |
| 706 | 1.0194 | 4.96413 | 0.0289 | 1.3627 | 0.0289 | 6.4422 | 0.0289 | 0.4256 |
| 707 | 1.0358 | 4.98063 | 0.0303 | 1.3830 | 0.0303 | 6.4467 | 0.0303 | 0.4239 |
| 708 | 1.0524 | 4.99652 | 0.0324 | 1.4040 | 0.0324 | 6.4567 | 0.0324 | 0.4221 |
| 709 | 1.0692 | 5.01184 | 0.0352 | 1.4255 | 0.0352 | 6.4757 | 0.0352 | 0.4207 |
| 710 | 1.0861 | 5.02667 | 0.0386 | 1.4475 | 0.0386 | 6.5066 | 0.0386 | 0.4202 |
| 711 | 1.1031 | 5.04103 | 0.0427 | 1.4698 | 0.0427 | 6.5522 | 0.0427 | 0.4209 |
| 712 | 1.1202 | 5.05501 | 0.0474 | 1.4924 | 0.0474 | 6.6143 | 0.0474 | 0.4233 |
| 713 | 1.1373 | 5.06864 | 0.0529 | 1.5152 | 0.0529 | 6.6943 | 0.0529 | 0.4277 |
| 714 | 1.1544 | 5.08201 | 0.0591 | 1.5381 | 0.0591 | 6.7929 | 0.0591 | 0.4345 |
| 715 | 1.1715 | 5.09516 | 0.0660 | 1.5609 | 0.0660 | 6.9098 | 0.0660 | 0.4440 |
| 716 | 1.1884 | 5.10855 | 0.0735 | 1.5836 | 0.0735 | 7.0440 | 0.0735 | 0.4563 |
| 717 | 1.2052 | 5.12187 | 0.0817 | 1.6060 | 0.0817 | 7.1938 | 0.0817 | 0.4716 |
| 718 | 1.2218 | 5.13520 | 0.0906 | 1.6281 | 0.0906 | 7.3566 | 0.0906 | 0.4900 |
| 719 | 1.2383 | 5.14860 | 0.1000 | 1.6498 | 0.1000 | 7.5296 | 0.1000 | 0.5116 |
| 720 | 1.2545 | 5.16213 | 0.1100 | 1.6710 | 0.1100 | 7.7092 | 0.1100 | 0.5362 |
| 721 | 1.2704 | 5.17588 | 0.1206 | 1.6916 | 0.1206 | 7.8915 | 0.1206 | 0.5637 |
| 722 | 1.2860 | 5.18989 | 0.1317 | 1.7116 | 0.1317 | 8.0728 | 0.1317 | 0.5939 |
| 723 | 1.3014 | 5.20420 | 0.1433 | 1.7310 | 0.1433 | 8.2489 | 0.1433 | 0.6265 |
| 724 | 1.3163 | 5.21887 | 0.1553 | 1.7498 | 0.1553 | 8.4161 | 0.1553 | 0.6614 |
| 725 | 1.3309 | 5.23396 | 0.1677 | 1.7679 | 0.1677 | 8.5710 | 0.1677 | 0.6979 |
| 726 | 1.3452 | 5.24949 | 0.1806 | 1.7854 | 0.1806 | 8.7103 | 0.1806 | 0.7359 |
| 727 | 1.3590 | 5.26552 | 0.1938 | 1.8022 | 0.1938 | 8.8315 | 0.1938 | 0.7748 |
| 728 | 1.3724 | 5.28207 | 0.2073 | 1.8185 | 0.2073 | 8.9326 | 0.2073 | 0.8141 |
| 729 | 1.3854 | 5.29917 | 0.2211 | 1.8342 | 0.2211 | 9.0122 | 0.2211 | 0.8536 |
| 730 | 1.3980 | 5.31684 | 0.2352 | 1.8495 | 0.2352 | 9.0698 | 0.2352 | 0.8926 |
| 731 | 1.4101 | 5.33510 | 0.2496 | 1.8644 | 0.2496 | 9.1054 | 0.2496 | 0.9308 |
| 732 | 1.4218 | 5.35395 | 0.2642 | 1.8790 | 0.2642 | 9.1198 | 0.2642 | 0.9678 |
| 733 | 1.4331 | 5.37340 | 0.2791 | 1.8934 | 0.2791 | 9.1145 | 0.2791 | 1.0032 |
| 734 | 1.4440 | 5.39344 | 0.2943 | 1.9076 | 0.2943 | 9.0915 | 0.2943 | 1.0367 |
| 735 | 1.4545 | 5.41407 | 0.3097 | 1.9219 | 0.3097 | 9.0536 | 0.3097 | 1.0680 |
| 736 | 1.4646 | 5.43527 | 0.3253 | 1.9363 | 0.3253 | 9.0039 | 0.3253 | 1.0968 |
| 737 | 1.4744 | 5.45702 | 0.3413 | 1.9509 | 0.3413 | 8.9459 | 0.3413 | 1.1232 |
| 738 | 1.4839 | 5.47929 | 0.3576 | 1.9658 | 0.3576 | 8.8833 | 0.3576 | 1.1469 |
| 739 | 1.4930 | 5.50206 | 0.3742 | 1.9811 | 0.3742 | 8.8202 | 0.3742 | 1.1679 |
| 740 | 1.5019 | 5.52528 | 0.3911 | 1.9970 | 0.3911 | 8.7603 | 0.3911 | 1.1864 |
| 741 | 1.5106 | 5.54891 | 0.4085 | 2.0135 | 0.4085 | 8.7076 | 0.4085 | 1.2023 |
| 742 | 1.5190 | 5.57292 | 0.4262 | 2.0306 | 0.4262 | 8.6655 | 0.4262 | 1.2160 |
| 743 | 1.5273 | 5.59725 | 0.4445 | 2.0486 | 0.4445 | 8.6373 | 0.4445 | 1.2276 |
| 744 | 1.5355 | 5.62185 | 0.4632 | 2.0674 | 0.4632 | 8.6255 | 0.4632 | 1.2375 |
| 745 | 1.5435 | 5.64668 | 0.4825 | 2.0871 | 0.4825 | 8.6323 | 0.4825 | 1.2459 |
| 746 | 1.5515 | 5.67167 | 0.5024 | 2.1077 | 0.5024 | 8.6593 | 0.5024 | 1.2533 |
| 747 | 1.5594 | 5.69678 | 0.5229 | 2.1293 | 0.5229 | 8.7071 | 0.5229 | 1.2602 |
| 748 | 1.5674 | 5.72194 | 0.5441 | 2.1518 | 0.5441 | 8.7760 | 0.5441 | 1.2668 |
| 749 | 1.5754 | 5.74709 | 0.5660 | 2.1753 | 0.5660 | 8.8654 | 0.5660 | 1.2737 |
| 750 | 1.5835 | 5.77218 | 0.5886 | 2.1998 | 0.5886 | 8.9741 | 0.5886 | 1.2814 |

FIG. 5-9

| WAVELENGTH (nm) | COMPARATIVE EXAMPLE 1, OBJECT SIDE | COMPARATIVE EXAMPLE 1, EYEBALL SIDE | EXAMPLE 1, OBJECT SIDE | EXAMPLE 1, EYEBALL SIDE | EXAMPLE 2, OBJECT SIDE | EXAMPLE 2, EYEBALL SIDE | COMPARATIVE EXAMPLE 2, OBJECT SIDE | COMPARATIVE EXAMPLE 2, EYEBALL SIDE |
|---|---|---|---|---|---|---|---|---|
| 751 | 1.5917 | 5.79715 | 0.6120 | 2.2251 | 0.6120 | 9.1002 | 0.6120 | 1.2903 |
| 752 | 1.6000 | 5.82195 | 0.6362 | 2.2514 | 0.6362 | 9.2416 | 0.6362 | 1.3008 |
| 753 | 1.6085 | 5.84652 | 0.6613 | 2.2785 | 0.6613 | 9.3956 | 0.6613 | 1.3134 |
| 754 | 1.6172 | 5.87060 | 0.6872 | 2.3064 | 0.6872 | 9.5591 | 0.6872 | 1.3284 |
| 755 | 1.6261 | 5.89474 | 0.7139 | 2.3349 | 0.7139 | 9.7290 | 0.7139 | 1.3462 |
| 756 | 1.6353 | 5.91830 | 0.7416 | 2.3641 | 0.7416 | 9.9021 | 0.7416 | 1.3670 |
| 757 | 1.6448 | 5.94143 | 0.7701 | 2.3938 | 0.7701 | 10.0751 | 0.7701 | 1.3911 |
| 758 | 1.6545 | 5.96409 | 0.7994 | 2.4239 | 0.7994 | 10.2449 | 0.7994 | 1.4187 |
| 759 | 1.6645 | 5.98624 | 0.8297 | 2.4544 | 0.8297 | 10.4087 | 0.8297 | 1.4499 |
| 760 | 1.6749 | 6.00784 | 0.8607 | 2.4851 | 0.8607 | 10.5640 | 0.8607 | 1.4848 |
| 761 | 1.6856 | 6.02885 | 0.8926 | 2.5159 | 0.8926 | 10.7085 | 0.8926 | 1.5232 |
| 762 | 1.6966 | 6.04925 | 0.9253 | 2.5467 | 0.9253 | 10.8405 | 0.9253 | 1.5652 |
| 763 | 1.7079 | 6.06904 | 0.9587 | 2.5774 | 0.9587 | 10.9586 | 0.9587 | 1.6106 |
| 764 | 1.7195 | 6.08818 | 0.9928 | 2.6079 | 0.9928 | 11.0620 | 0.9928 | 1.6592 |
| 765 | 1.7315 | 6.10667 | 1.0275 | 2.6382 | 1.0275 | 11.1504 | 1.0275 | 1.7107 |
| 766 | 1.7438 | 6.12450 | 1.0629 | 2.6682 | 1.0629 | 11.2237 | 1.0629 | 1.7649 |
| 767 | 1.7564 | 6.14167 | 1.0989 | 2.6977 | 1.0989 | 11.2825 | 1.0989 | 1.8213 |
| 768 | 1.7692 | 6.15817 | 1.1353 | 2.7267 | 1.1353 | 11.3279 | 1.1353 | 1.8796 |
| 769 | 1.7823 | 6.17402 | 1.1722 | 2.7553 | 1.1722 | 11.3610 | 1.1722 | 1.9393 |
| 770 | 1.7957 | 6.18923 | 1.2094 | 2.7832 | 1.2094 | 11.3835 | 1.2094 | 2.0000 |
| 771 | 1.8093 | 6.20380 | 1.2470 | 2.8105 | 1.2470 | 11.3972 | 1.2470 | 2.0613 |
| 772 | 1.8231 | 6.21776 | 1.2848 | 2.8372 | 1.2848 | 11.4043 | 1.2848 | 2.1227 |
| 773 | 1.8370 | 6.23113 | 1.3228 | 2.8632 | 1.3228 | 11.4070 | 1.3228 | 2.1837 |
| 774 | 1.8511 | 6.24394 | 1.3610 | 2.8886 | 1.3610 | 11.4073 | 1.3610 | 2.2440 |
| 775 | 1.8654 | 6.25622 | 1.3992 | 2.9133 | 1.3992 | 11.4076 | 1.3992 | 2.3030 |
| 776 | 1.8797 | 6.26800 | 1.4374 | 2.9375 | 1.4374 | 11.4100 | 1.4374 | 2.3604 |
| 777 | 1.8940 | 6.27933 | 1.4755 | 2.9611 | 1.4755 | 11.4164 | 1.4755 | 2.4158 |
| 778 | 1.9084 | 6.29023 | 1.5136 | 2.9842 | 1.5136 | 11.4285 | 1.5136 | 2.4689 |
| 779 | 1.9228 | 6.30075 | 1.5515 | 3.0068 | 1.5515 | 11.4477 | 1.5515 | 2.5194 |
| 780 | 1.9371 | 6.31094 | 1.5892 | 3.0291 | 1.5892 | 11.4752 | 1.5892 | 2.5672 |

FIG. 6-1

| WAVELENGTH (nm) | EXAMPLE 3 OBJECT SIDE | EXAMPLE 4 OBJECT SIDE | EXAMPLE 5 OBJECT SIDE | EXAMPLE 6 OBJECT SIDE | EXAMPLE 7 OBJECT SIDE | EXAMPLE 8 OBJECT SIDE |
|---|---|---|---|---|---|---|
| 380 | 35.85 | 47.13 | 31.83 | 37.42 | 34.76 | 31.23 |
| 381 | 34.81 | 46.40 | 31.15 | 36.31 | 34.01 | 30.71 |
| 382 | 33.72 | 45.59 | 30.52 | 35.18 | 33.20 | 30.26 |
| 383 | 32.57 | 44.72 | 29.92 | 34.05 | 32.35 | 29.88 |
| 384 | 31.36 | 43.76 | 29.39 | 32.93 | 31.48 | 29.53 |
| 385 | 30.10 | 42.74 | 28.94 | 31.84 | 30.61 | 29.21 |
| 386 | 28.79 | 41.66 | 28.60 | 30.76 | 29.76 | 28.88 |
| 387 | 27.47 | 40.54 | 28.39 | 29.68 | 28.94 | 28.54 |
| 388 | 26.14 | 39.40 | 28.30 | 28.60 | 28.16 | 28.19 |
| 389 | 24.84 | 38.27 | 28.33 | 27.50 | 27.41 | 27.83 |
| 390 | 23.59 | 37.16 | 28.48 | 26.37 | 26.68 | 27.47 |
| 391 | 22.39 | 36.07 | 28.71 | 25.20 | 25.97 | 27.14 |
| 392 | 21.27 | 35.02 | 28.99 | 23.99 | 25.26 | 26.84 |
| 393 | 20.22 | 34.01 | 29.31 | 22.74 | 24.54 | 26.60 |
| 394 | 19.24 | 33.02 | 29.62 | 21.47 | 23.79 | 26.42 |
| 395 | 18.31 | 32.05 | 29.92 | 20.20 | 23.02 | 26.32 |
| 396 | 17.42 | 31.08 | 30.18 | 18.95 | 22.22 | 26.28 |
| 397 | 16.57 | 30.10 | 30.40 | 17.73 | 21.40 | 26.30 |
| 398 | 15.73 | 29.10 | 30.59 | 16.58 | 20.58 | 26.37 |
| 399 | 14.90 | 28.08 | 30.76 | 15.51 | 19.77 | 26.46 |
| 400 | 14.09 | 27.03 | 30.91 | 14.52 | 18.98 | 26.55 |
| 401 | 13.30 | 25.99 | 31.06 | 13.64 | 18.25 | 26.63 |
| 402 | 12.54 | 24.94 | 31.22 | 12.84 | 17.57 | 26.68 |
| 403 | 11.82 | 23.90 | 31.40 | 12.11 | 16.97 | 26.70 |
| 404 | 11.16 | 22.90 | 31.60 | 11.45 | 16.44 | 26.68 |
| 405 | 10.56 | 21.94 | 31.81 | 10.84 | 15.98 | 26.63 |
| 406 | 10.03 | 21.06 | 32.04 | 10.27 | 15.59 | 26.55 |
| 407 | 9.59 | 20.24 | 32.26 | 9.73 | 15.26 | 26.45 |
| 408 | 9.24 | 19.52 | 32.46 | 9.22 | 14.97 | 26.34 |
| 409 | 8.96 | 18.87 | 32.63 | 8.73 | 14.71 | 26.25 |
| 410 | 8.76 | 18.30 | 32.75 | 8.29 | 14.47 | 26.17 |
| 411 | 8.62 | 17.80 | 32.82 | 7.88 | 14.25 | 26.11 |
| 412 | 8.52 | 17.35 | 32.83 | 7.52 | 14.02 | 26.08 |
| 413 | 8.45 | 16.94 | 32.76 | 7.23 | 13.81 | 26.08 |
| 414 | 8.40 | 16.56 | 32.63 | 7.00 | 13.59 | 26.10 |
| 415 | 8.36 | 16.19 | 32.44 | 6.85 | 13.39 | 26.12 |
| 416 | 8.32 | 15.84 | 32.19 | 6.77 | 13.21 | 26.15 |
| 417 | 8.29 | 15.50 | 31.89 | 6.76 | 13.06 | 26.16 |
| 418 | 8.26 | 15.17 | 31.56 | 6.81 | 12.95 | 26.14 |
| 419 | 8.23 | 14.86 | 31.21 | 6.91 | 12.88 | 26.09 |
| 420 | 8.22 | 14.57 | 30.84 | 7.05 | 12.86 | 26.00 |

FIG. 6-2

| WAVELENGTH (nm) | EXAMPLE 3 OBJECT SIDE | EXAMPLE 4 OBJECT SIDE | EXAMPLE 5 OBJECT SIDE | EXAMPLE 6 OBJECT SIDE | EXAMPLE 7 OBJECT SIDE | EXAMPLE 8 OBJECT SIDE |
|---|---|---|---|---|---|---|
| 421 | 8.23 | 14.32 | 30.48 | 7.21 | 12.89 | 25.86 |
| 422 | 8.26 | 14.12 | 30.11 | 7.38 | 12.97 | 25.68 |
| 423 | 8.33 | 13.96 | 29.75 | 7.55 | 13.09 | 25.46 |
| 424 | 8.42 | 13.86 | 29.39 | 7.71 | 13.25 | 25.20 |
| 425 | 8.55 | 13.82 | 29.02 | 7.87 | 13.42 | 24.91 |
| 426 | 8.70 | 13.82 | 28.64 | 8.01 | 13.61 | 24.61 |
| 427 | 8.88 | 13.88 | 28.24 | 8.14 | 13.80 | 24.30 |
| 428 | 9.07 | 13.97 | 27.81 | 8.27 | 13.98 | 23.99 |
| 429 | 9.27 | 14.09 | 27.35 | 8.40 | 14.15 | 23.69 |
| 430 | 9.47 | 14.23 | 26.85 | 8.53 | 14.29 | 23.41 |
| 431 | 9.65 | 14.37 | 26.31 | 8.68 | 14.41 | 23.14 |
| 432 | 9.82 | 14.51 | 25.72 | 8.84 | 14.51 | 22.88 |
| 433 | 9.97 | 14.63 | 25.09 | 9.02 | 14.58 | 22.64 |
| 434 | 10.09 | 14.74 | 24.42 | 9.22 | 14.64 | 22.41 |
| 435 | 10.18 | 14.83 | 23.71 | 9.43 | 14.69 | 22.17 |
| 436 | 10.24 | 14.89 | 22.97 | 9.65 | 14.73 | 21.93 |
| 437 | 10.28 | 14.94 | 22.21 | 9.87 | 14.77 | 21.68 |
| 438 | 10.29 | 14.97 | 21.44 | 10.10 | 14.81 | 21.40 |
| 439 | 10.30 | 14.99 | 20.66 | 10.31 | 14.87 | 21.09 |
| 440 | 10.29 | 15.00 | 19.90 | 10.50 | 14.94 | 20.76 |
| 441 | 10.28 | 15.02 | 19.15 | 10.67 | 15.02 | 20.40 |
| 442 | 10.26 | 15.05 | 18.42 | 10.81 | 15.11 | 20.01 |
| 443 | 10.26 | 15.09 | 17.71 | 10.91 | 15.21 | 19.59 |
| 444 | 10.26 | 15.14 | 17.03 | 10.99 | 15.31 | 19.15 |
| 445 | 10.26 | 15.20 | 16.36 | 11.03 | 15.41 | 18.70 |
| 446 | 10.28 | 15.28 | 15.71 | 11.05 | 15.50 | 18.24 |
| 447 | 10.30 | 15.37 | 15.07 | 11.04 | 15.57 | 17.77 |
| 448 | 10.31 | 15.46 | 14.45 | 11.01 | 15.62 | 17.31 |
| 449 | 10.33 | 15.55 | 13.83 | 10.97 | 15.65 | 16.87 |
| 450 | 10.34 | 15.63 | 13.22 | 10.92 | 15.65 | 16.44 |
| 451 | 10.33 | 15.70 | 12.60 | 10.87 | 15.61 | 16.02 |
| 452 | 10.31 | 15.75 | 11.99 | 10.82 | 15.55 | 15.63 |
| 453 | 10.27 | 15.78 | 11.37 | 10.77 | 15.45 | 15.26 |
| 454 | 10.20 | 15.78 | 10.75 | 10.73 | 15.33 | 14.91 |
| 455 | 10.11 | 15.75 | 10.13 | 10.69 | 15.18 | 14.57 |
| 456 | 10.00 | 15.69 | 9.52 | 10.67 | 15.01 | 14.24 |
| 457 | 9.86 | 15.60 | 8.91 | 10.64 | 14.83 | 13.92 |
| 458 | 9.70 | 15.49 | 8.32 | 10.61 | 14.63 | 13.59 |
| 459 | 9.52 | 15.35 | 7.74 | 10.58 | 14.43 | 13.27 |
| 460 | 9.33 | 15.19 | 7.18 | 10.54 | 14.23 | 12.93 |

FIG. 6-3

| WAVELENGTH (nm) | EXAMPLE 3 OBJECT SIDE | EXAMPLE 4 OBJECT SIDE | EXAMPLE 5 OBJECT SIDE | EXAMPLE 6 OBJECT SIDE | EXAMPLE 7 OBJECT SIDE | EXAMPLE 8 OBJECT SIDE |
|---|---|---|---|---|---|---|
| 461 | 9.13 | 15.02 | 6.65 | 10.49 | 14.03 | 12.59 |
| 462 | 8.92 | 14.84 | 6.14 | 10.42 | 13.83 | 12.24 |
| 463 | 8.71 | 14.65 | 5.67 | 10.33 | 13.64 | 11.87 |
| 464 | 8.50 | 14.46 | 5.22 | 10.23 | 13.46 | 11.50 |
| 465 | 8.29 | 14.27 | 4.81 | 10.10 | 13.28 | 11.11 |
| 466 | 8.09 | 14.09 | 4.43 | 9.95 | 13.10 | 10.72 |
| 467 | 7.90 | 13.91 | 4.07 | 9.78 | 12.93 | 10.32 |
| 468 | 7.72 | 13.74 | 3.75 | 9.59 | 12.75 | 9.93 |
| 469 | 7.55 | 13.58 | 3.45 | 9.38 | 12.57 | 9.55 |
| 470 | 7.38 | 13.42 | 3.18 | 9.17 | 12.38 | 9.17 |
| 471 | 7.22 | 13.26 | 2.93 | 8.95 | 12.18 | 8.81 |
| 472 | 7.07 | 13.10 | 2.70 | 8.72 | 11.97 | 8.47 |
| 473 | 6.91 | 12.95 | 2.48 | 8.50 | 11.74 | 8.14 |
| 474 | 6.75 | 12.78 | 2.28 | 8.28 | 11.50 | 7.84 |
| 475 | 6.59 | 12.61 | 2.10 | 8.07 | 11.24 | 7.55 |
| 476 | 6.43 | 12.42 | 1.92 | 7.87 | 10.96 | 7.28 |
| 477 | 6.26 | 12.22 | 1.76 | 7.67 | 10.67 | 7.04 |
| 478 | 6.07 | 12.00 | 1.61 | 7.49 | 10.37 | 6.80 |
| 479 | 5.88 | 11.77 | 1.46 | 7.32 | 10.05 | 6.58 |
| 480 | 5.69 | 11.52 | 1.33 | 7.15 | 9.72 | 6.37 |
| 481 | 5.48 | 11.26 | 1.21 | 7.00 | 9.39 | 6.16 |
| 482 | 5.27 | 10.98 | 1.10 | 6.85 | 9.06 | 5.96 |
| 483 | 5.05 | 10.69 | 0.99 | 6.70 | 8.73 | 5.76 |
| 484 | 4.83 | 10.40 | 0.90 | 6.55 | 8.40 | 5.55 |
| 485 | 4.61 | 10.09 | 0.81 | 6.40 | 8.08 | 5.35 |
| 486 | 4.39 | 9.78 | 0.74 | 6.25 | 7.76 | 5.14 |
| 487 | 4.18 | 9.48 | 0.67 | 6.09 | 7.46 | 4.93 |
| 488 | 3.96 | 9.17 | 0.61 | 5.92 | 7.17 | 4.72 |
| 489 | 3.76 | 8.87 | 0.56 | 5.75 | 6.89 | 4.50 |
| 490 | 3.56 | 8.57 | 0.51 | 5.56 | 6.62 | 4.29 |
| 491 | 3.38 | 8.29 | 0.47 | 5.37 | 6.36 | 4.07 |
| 492 | 3.20 | 8.01 | 0.44 | 5.18 | 6.11 | 3.86 |
| 493 | 3.04 | 7.75 | 0.41 | 4.98 | 5.87 | 3.66 |
| 494 | 2.88 | 7.49 | 0.39 | 4.77 | 5.65 | 3.46 |
| 495 | 2.74 | 7.25 | 0.37 | 4.57 | 5.42 | 3.27 |
| 496 | 2.60 | 7.02 | 0.36 | 4.37 | 5.20 | 3.09 |
| 497 | 2.47 | 6.80 | 0.35 | 4.17 | 4.99 | 2.92 |
| 498 | 2.35 | 6.58 | 0.34 | 3.98 | 4.77 | 2.77 |
| 499 | 2.24 | 6.38 | 0.34 | 3.79 | 4.56 | 2.62 |
| 500 | 2.13 | 6.17 | 0.34 | 3.61 | 4.35 | 2.49 |

FIG. 6-4

| WAVELENGTH (nm) | EXAMPLE 3 OBJECT SIDE | EXAMPLE 4 OBJECT SIDE | EXAMPLE 5 OBJECT SIDE | EXAMPLE 6 OBJECT SIDE | EXAMPLE 7 OBJECT SIDE | EXAMPLE 8 OBJECT SIDE |
|---|---|---|---|---|---|---|
| 501 | 2.03 | 5.97 | 0.34 | 3.45 | 4.14 | 2.37 |
| 502 | 1.93 | 5.78 | 0.34 | 3.29 | 3.93 | 2.25 |
| 503 | 1.83 | 5.58 | 0.34 | 3.14 | 3.71 | 2.15 |
| 504 | 1.73 | 5.38 | 0.35 | 3.01 | 3.50 | 2.05 |
| 505 | 1.63 | 5.19 | 0.35 | 2.88 | 3.29 | 1.96 |
| 506 | 1.53 | 4.99 | 0.36 | 2.76 | 3.09 | 1.87 |
| 507 | 1.43 | 4.79 | 0.36 | 2.65 | 2.88 | 1.79 |
| 508 | 1.34 | 4.58 | 0.37 | 2.54 | 2.68 | 1.71 |
| 509 | 1.24 | 4.38 | 0.37 | 2.44 | 2.49 | 1.63 |
| 510 | 1.15 | 4.18 | 0.37 | 2.35 | 2.30 | 1.55 |
| 511 | 1.06 | 3.98 | 0.37 | 2.25 | 2.12 | 1.47 |
| 512 | 0.97 | 3.78 | 0.37 | 2.16 | 1.95 | 1.38 |
| 513 | 0.88 | 3.58 | 0.37 | 2.07 | 1.79 | 1.30 |
| 514 | 0.80 | 3.39 | 0.36 | 1.98 | 1.64 | 1.22 |
| 515 | 0.72 | 3.20 | 0.36 | 1.88 | 1.50 | 1.13 |
| 516 | 0.65 | 3.02 | 0.35 | 1.79 | 1.36 | 1.05 |
| 517 | 0.58 | 2.84 | 0.34 | 1.69 | 1.24 | 0.97 |
| 518 | 0.51 | 2.68 | 0.32 | 1.60 | 1.13 | 0.89 |
| 519 | 0.46 | 2.52 | 0.31 | 1.50 | 1.03 | 0.81 |
| 520 | 0.41 | 2.37 | 0.29 | 1.41 | 0.94 | 0.74 |
| 521 | 0.36 | 2.23 | 0.27 | 1.32 | 0.85 | 0.67 |
| 522 | 0.32 | 2.10 | 0.26 | 1.22 | 0.77 | 0.61 |
| 523 | 0.28 | 1.98 | 0.24 | 1.13 | 0.70 | 0.54 |
| 524 | 0.25 | 1.87 | 0.22 | 1.05 | 0.64 | 0.49 |
| 525 | 0.22 | 1.77 | 0.20 | 0.97 | 0.57 | 0.44 |
| 526 | 0.20 | 1.67 | 0.18 | 0.89 | 0.52 | 0.39 |
| 527 | 0.18 | 1.59 | 0.17 | 0.81 | 0.47 | 0.35 |
| 528 | 0.16 | 1.50 | 0.15 | 0.74 | 0.42 | 0.31 |
| 529 | 0.14 | 1.43 | 0.14 | 0.68 | 0.37 | 0.28 |
| 530 | 0.13 | 1.36 | 0.12 | 0.62 | 0.33 | 0.25 |
| 531 | 0.11 | 1.29 | 0.11 | 0.57 | 0.29 | 0.22 |
| 532 | 0.10 | 1.23 | 0.10 | 0.52 | 0.25 | 0.20 |
| 533 | 0.09 | 1.17 | 0.09 | 0.48 | 0.22 | 0.18 |
| 534 | 0.08 | 1.11 | 0.08 | 0.44 | 0.19 | 0.16 |
| 535 | 0.07 | 1.06 | 0.07 | 0.40 | 0.16 | 0.14 |
| 536 | 0.06 | 1.01 | 0.06 | 0.37 | 0.13 | 0.13 |
| 537 | 0.05 | 0.96 | 0.05 | 0.34 | 0.10 | 0.11 |
| 538 | 0.04 | 0.91 | 0.05 | 0.31 | 0.08 | 0.10 |
| 539 | 0.04 | 0.86 | 0.04 | 0.29 | 0.06 | 0.08 |
| 540 | 0.03 | 0.82 | 0.04 | 0.26 | 0.05 | 0.07 |
| 541 | 0.02 | 0.77 | 0.03 | 0.24 | 0.03 | 0.06 |
| 542 | 0.02 | 0.73 | 0.03 | 0.22 | 0.02 | 0.04 |
| 543 | 0.01 | 0.69 | 0.02 | 0.20 | 0.01 | 0.03 |
| 544 | 0.01 | 0.65 | 0.02 | 0.19 | 0.01 | 0.02 |
| 545 | 0.01 | 0.61 | 0.02 | 0.17 | 0.01 | 0.02 |
| 546 | 0.01 | 0.57 | 0.02 | 0.15 | 0.00 | 0.01 |
| 547 | 0.01 | 0.54 | 0.02 | 0.13 | 0.00 | 0.01 |
| 548 | 0.02 | 0.51 | 0.02 | 0.12 | 0.01 | 0.00 |
| 549 | 0.02 | 0.47 | 0.02 | 0.10 | 0.01 | 0.00 |
| 550 | 0.03 | 0.44 | 0.02 | 0.09 | 0.02 | 0.00 |

FIG. 6-5

| WAVELENGTH (nm) | EXAMPLE 3 OBJECT SIDE | EXAMPLE 4 OBJECT SIDE | EXAMPLE 5 OBJECT SIDE | EXAMPLE 6 OBJECT SIDE | EXAMPLE 7 OBJECT SIDE | EXAMPLE 8 OBJECT SIDE |
|---|---|---|---|---|---|---|
| 551 | 0.04 | 0.42 | 0.03 | 0.08 | 0.02 | 0.00 |
| 552 | 0.05 | 0.39 | 0.03 | 0.06 | 0.03 | 0.01 |
| 553 | 0.06 | 0.37 | 0.04 | 0.05 | 0.04 | 0.02 |
| 554 | 0.07 | 0.35 | 0.05 | 0.04 | 0.04 | 0.02 |
| 555 | 0.08 | 0.32 | 0.06 | 0.04 | 0.05 | 0.03 |
| 556 | 0.09 | 0.31 | 0.07 | 0.03 | 0.06 | 0.04 |
| 557 | 0.10 | 0.29 | 0.09 | 0.02 | 0.07 | 0.05 |
| 558 | 0.12 | 0.28 | 0.10 | 0.02 | 0.07 | 0.06 |
| 559 | 0.13 | 0.26 | 0.12 | 0.02 | 0.08 | 0.08 |
| 560 | 0.14 | 0.25 | 0.14 | 0.01 | 0.09 | 0.09 |
| 561 | 0.15 | 0.24 | 0.15 | 0.01 | 0.09 | 0.10 |
| 562 | 0.16 | 0.23 | 0.17 | 0.01 | 0.10 | 0.11 |
| 563 | 0.18 | 0.22 | 0.19 | 0.01 | 0.10 | 0.13 |
| 564 | 0.19 | 0.22 | 0.21 | 0.02 | 0.11 | 0.14 |
| 565 | 0.20 | 0.21 | 0.23 | 0.02 | 0.12 | 0.15 |
| 566 | 0.21 | 0.21 | 0.25 | 0.02 | 0.12 | 0.16 |
| 567 | 0.22 | 0.21 | 0.27 | 0.02 | 0.13 | 0.17 |
| 568 | 0.23 | 0.20 | 0.28 | 0.02 | 0.13 | 0.18 |
| 569 | 0.23 | 0.20 | 0.30 | 0.03 | 0.14 | 0.19 |
| 570 | 0.24 | 0.20 | 0.32 | 0.03 | 0.14 | 0.20 |
| 571 | 0.25 | 0.20 | 0.34 | 0.03 | 0.15 | 0.21 |
| 572 | 0.26 | 0.20 | 0.36 | 0.03 | 0.16 | 0.22 |
| 573 | 0.27 | 0.20 | 0.37 | 0.04 | 0.17 | 0.23 |
| 574 | 0.28 | 0.20 | 0.39 | 0.04 | 0.17 | 0.24 |
| 575 | 0.29 | 0.20 | 0.41 | 0.04 | 0.18 | 0.26 |
| 576 | 0.30 | 0.19 | 0.42 | 0.05 | 0.19 | 0.27 |
| 577 | 0.31 | 0.19 | 0.44 | 0.05 | 0.20 | 0.28 |
| 578 | 0.32 | 0.19 | 0.46 | 0.05 | 0.21 | 0.30 |
| 579 | 0.33 | 0.19 | 0.48 | 0.06 | 0.22 | 0.32 |
| 580 | 0.35 | 0.18 | 0.50 | 0.06 | 0.23 | 0.33 |
| 581 | 0.36 | 0.18 | 0.52 | 0.06 | 0.24 | 0.35 |
| 582 | 0.38 | 0.17 | 0.54 | 0.07 | 0.25 | 0.37 |
| 583 | 0.40 | 0.17 | 0.57 | 0.07 | 0.26 | 0.39 |
| 584 | 0.42 | 0.16 | 0.59 | 0.08 | 0.27 | 0.41 |
| 585 | 0.44 | 0.15 | 0.61 | 0.09 | 0.28 | 0.43 |
| 586 | 0.47 | 0.15 | 0.64 | 0.09 | 0.29 | 0.45 |
| 587 | 0.49 | 0.14 | 0.67 | 0.10 | 0.30 | 0.47 |
| 588 | 0.52 | 0.13 | 0.70 | 0.11 | 0.32 | 0.49 |
| 589 | 0.54 | 0.12 | 0.72 | 0.11 | 0.33 | 0.51 |
| 590 | 0.57 | 0.11 | 0.75 | 0.12 | 0.34 | 0.53 |
| 591 | 0.60 | 0.11 | 0.78 | 0.13 | 0.35 | 0.55 |
| 592 | 0.63 | 0.10 | 0.81 | 0.14 | 0.36 | 0.57 |
| 593 | 0.66 | 0.09 | 0.84 | 0.14 | 0.37 | 0.58 |
| 594 | 0.70 | 0.08 | 0.87 | 0.15 | 0.38 | 0.60 |
| 595 | 0.73 | 0.07 | 0.90 | 0.15 | 0.39 | 0.61 |
| 596 | 0.76 | 0.07 | 0.92 | 0.16 | 0.40 | 0.62 |
| 597 | 0.80 | 0.06 | 0.95 | 0.16 | 0.41 | 0.63 |
| 598 | 0.83 | 0.05 | 0.97 | 0.17 | 0.42 | 0.64 |
| 599 | 0.86 | 0.05 | 0.99 | 0.17 | 0.43 | 0.64 |
| 600 | 0.90 | 0.04 | 1.01 | 0.17 | 0.44 | 0.64 |

FIG. 6-6

| WAVELENGTH (nm) | EXAMPLE 3 OBJECT SIDE | EXAMPLE 4 OBJECT SIDE | EXAMPLE 5 OBJECT SIDE | EXAMPLE 6 OBJECT SIDE | EXAMPLE 7 OBJECT SIDE | EXAMPLE 8 OBJECT SIDE |
|---|---|---|---|---|---|---|
| 601 | 0.93 | 0.04 | 1.03 | 0.17 | 0.45 | 0.65 |
| 602 | 0.96 | 0.04 | 1.05 | 0.17 | 0.46 | 0.65 |
| 603 | 0.99 | 0.04 | 1.06 | 0.17 | 0.47 | 0.64 |
| 604 | 1.03 | 0.03 | 1.07 | 0.17 | 0.48 | 0.64 |
| 605 | 1.06 | 0.03 | 1.08 | 0.16 | 0.49 | 0.64 |
| 606 | 1.09 | 0.03 | 1.09 | 0.16 | 0.50 | 0.63 |
| 607 | 1.12 | 0.04 | 1.09 | 0.16 | 0.51 | 0.63 |
| 608 | 1.15 | 0.04 | 1.10 | 0.15 | 0.53 | 0.62 |
| 609 | 1.18 | 0.04 | 1.10 | 0.15 | 0.54 | 0.61 |
| 610 | 1.21 | 0.04 | 1.10 | 0.14 | 0.56 | 0.61 |
| 611 | 1.23 | 0.05 | 1.09 | 0.13 | 0.57 | 0.60 |
| 612 | 1.26 | 0.05 | 1.09 | 0.13 | 0.59 | 0.59 |
| 613 | 1.29 | 0.05 | 1.08 | 0.12 | 0.61 | 0.59 |
| 614 | 1.32 | 0.06 | 1.07 | 0.11 | 0.63 | 0.58 |
| 615 | 1.35 | 0.06 | 1.06 | 0.11 | 0.65 | 0.58 |
| 616 | 1.38 | 0.06 | 1.06 | 0.10 | 0.67 | 0.57 |
| 617 | 1.41 | 0.07 | 1.05 | 0.10 | 0.69 | 0.57 |
| 618 | 1.44 | 0.07 | 1.04 | 0.09 | 0.72 | 0.56 |
| 619 | 1.48 | 0.08 | 1.03 | 0.09 | 0.75 | 0.56 |
| 620 | 1.51 | 0.08 | 1.02 | 0.08 | 0.78 | 0.56 |
| 621 | 1.54 | 0.08 | 1.01 | 0.08 | 0.81 | 0.55 |
| 622 | 1.58 | 0.09 | 1.00 | 0.07 | 0.84 | 0.55 |
| 623 | 1.62 | 0.09 | 0.99 | 0.07 | 0.88 | 0.55 |
| 624 | 1.66 | 0.10 | 0.98 | 0.06 | 0.92 | 0.55 |
| 625 | 1.71 | 0.11 | 0.97 | 0.06 | 0.96 | 0.55 |
| 626 | 1.75 | 0.11 | 0.96 | 0.06 | 1.00 | 0.55 |
| 627 | 1.80 | 0.12 | 0.95 | 0.05 | 1.05 | 0.54 |
| 628 | 1.85 | 0.13 | 0.95 | 0.05 | 1.10 | 0.54 |
| 629 | 1.90 | 0.14 | 0.94 | 0.05 | 1.15 | 0.54 |
| 630 | 1.95 | 0.15 | 0.94 | 0.05 | 1.20 | 0.53 |
| 631 | 2.01 | 0.16 | 0.93 | 0.04 | 1.25 | 0.53 |
| 632 | 2.07 | 0.17 | 0.92 | 0.04 | 1.31 | 0.52 |
| 633 | 2.13 | 0.19 | 0.92 | 0.04 | 1.37 | 0.52 |
| 634 | 2.19 | 0.20 | 0.91 | 0.03 | 1.43 | 0.51 |
| 635 | 2.25 | 0.22 | 0.91 | 0.03 | 1.49 | 0.50 |
| 636 | 2.32 | 0.24 | 0.90 | 0.03 | 1.56 | 0.49 |
| 637 | 2.38 | 0.26 | 0.89 | 0.03 | 1.62 | 0.48 |
| 638 | 2.45 | 0.29 | 0.89 | 0.02 | 1.69 | 0.47 |
| 639 | 2.51 | 0.31 | 0.88 | 0.02 | 1.75 | 0.46 |
| 640 | 2.58 | 0.34 | 0.87 | 0.02 | 1.82 | 0.44 |
| 641 | 2.65 | 0.37 | 0.87 | 0.01 | 1.89 | 0.43 |
| 642 | 2.72 | 0.39 | 0.86 | 0.01 | 1.96 | 0.41 |
| 643 | 2.78 | 0.43 | 0.85 | 0.01 | 2.03 | 0.40 |
| 644 | 2.85 | 0.46 | 0.84 | 0.01 | 2.10 | 0.38 |
| 645 | 2.91 | 0.49 | 0.83 | 0.01 | 2.17 | 0.37 |
| 646 | 2.98 | 0.53 | 0.81 | 0.00 | 2.24 | 0.35 |
| 647 | 3.04 | 0.56 | 0.80 | 0.00 | 2.31 | 0.33 |
| 648 | 3.11 | 0.60 | 0.79 | 0.00 | 2.38 | 0.31 |
| 649 | 3.17 | 0.64 | 0.77 | 0.00 | 2.45 | 0.30 |
| 650 | 3.23 | 0.68 | 0.76 | 0.00 | 2.52 | 0.28 |

FIG. 6-7

| WAVELENGTH (nm) | EXAMPLE 3 OBJECT SIDE | EXAMPLE 4 OBJECT SIDE | EXAMPLE 5 OBJECT SIDE | EXAMPLE 6 OBJECT SIDE | EXAMPLE 7 OBJECT SIDE | EXAMPLE 8 OBJECT SIDE |
|---|---|---|---|---|---|---|
| 651 | 3.28 | 0.71 | 0.74 | 0.01 | 2.58 | 0.26 |
| 652 | 3.34 | 0.75 | 0.73 | 0.01 | 2.65 | 0.24 |
| 653 | 3.40 | 0.79 | 0.71 | 0.01 | 2.72 | 0.23 |
| 654 | 3.45 | 0.83 | 0.70 | 0.02 | 2.79 | 0.21 |
| 655 | 3.50 | 0.87 | 0.68 | 0.02 | 2.85 | 0.20 |
| 656 | 3.55 | 0.91 | 0.66 | 0.03 | 2.92 | 0.18 |
| 657 | 3.60 | 0.95 | 0.65 | 0.04 | 2.99 | 0.17 |
| 658 | 3.65 | 0.99 | 0.63 | 0.04 | 3.05 | 0.15 |
| 659 | 3.69 | 1.03 | 0.61 | 0.05 | 3.12 | 0.14 |
| 660 | 3.74 | 1.07 | 0.60 | 0.06 | 3.19 | 0.13 |
| 661 | 3.79 | 1.10 | 0.58 | 0.07 | 3.25 | 0.12 |
| 662 | 3.83 | 1.14 | 0.57 | 0.09 | 3.32 | 0.11 |
| 663 | 3.87 | 1.18 | 0.55 | 0.10 | 3.39 | 0.10 |
| 664 | 3.92 | 1.22 | 0.54 | 0.11 | 3.46 | 0.09 |
| 665 | 3.96 | 1.25 | 0.53 | 0.12 | 3.53 | 0.08 |
| 666 | 4.01 | 1.29 | 0.51 | 0.14 | 3.60 | 0.07 |
| 667 | 4.05 | 1.33 | 0.50 | 0.15 | 3.67 | 0.06 |
| 668 | 4.10 | 1.37 | 0.49 | 0.17 | 3.74 | 0.06 |
| 669 | 4.15 | 1.40 | 0.48 | 0.18 | 3.82 | 0.05 |
| 670 | 4.19 | 1.44 | 0.47 | 0.20 | 3.89 | 0.05 |
| 671 | 4.24 | 1.48 | 0.46 | 0.22 | 3.97 | 0.04 |
| 672 | 4.29 | 1.52 | 0.46 | 0.23 | 4.05 | 0.04 |
| 673 | 4.34 | 1.56 | 0.45 | 0.25 | 4.13 | 0.03 |
| 674 | 4.40 | 1.60 | 0.45 | 0.27 | 4.22 | 0.03 |
| 675 | 4.45 | 1.64 | 0.44 | 0.29 | 4.30 | 0.02 |
| 676 | 4.51 | 1.69 | 0.44 | 0.31 | 4.39 | 0.02 |
| 677 | 4.56 | 1.73 | 0.44 | 0.32 | 4.48 | 0.02 |
| 678 | 4.62 | 1.78 | 0.44 | 0.34 | 4.57 | 0.01 |
| 679 | 4.68 | 1.83 | 0.44 | 0.36 | 4.66 | 0.01 |
| 680 | 4.75 | 1.88 | 0.45 | 0.38 | 4.75 | 0.01 |
| 681 | 4.81 | 1.93 | 0.45 | 0.41 | 4.84 | 0.01 |
| 682 | 4.87 | 1.98 | 0.45 | 0.43 | 4.94 | 0.00 |
| 683 | 4.94 | 2.03 | 0.46 | 0.45 | 5.04 | 0.00 |
| 684 | 5.01 | 2.09 | 0.47 | 0.48 | 5.13 | 0.00 |
| 685 | 5.07 | 2.15 | 0.48 | 0.50 | 5.23 | 0.00 |
| 686 | 5.14 | 2.21 | 0.49 | 0.53 | 5.33 | 0.00 |
| 687 | 5.21 | 2.27 | 0.50 | 0.55 | 5.43 | 0.00 |
| 688 | 5.28 | 2.33 | 0.52 | 0.58 | 5.53 | 0.01 |
| 689 | 5.35 | 2.39 | 0.53 | 0.61 | 5.62 | 0.01 |
| 690 | 5.42 | 2.46 | 0.55 | 0.64 | 5.72 | 0.01 |
| 691 | 5.48 | 2.52 | 0.56 | 0.68 | 5.82 | 0.01 |
| 692 | 5.55 | 2.59 | 0.58 | 0.71 | 5.91 | 0.02 |
| 693 | 5.62 | 2.65 | 0.61 | 0.75 | 6.01 | 0.02 |
| 694 | 5.68 | 2.72 | 0.63 | 0.79 | 6.10 | 0.03 |
| 695 | 5.74 | 2.79 | 0.65 | 0.83 | 6.19 | 0.04 |
| 696 | 5.80 | 2.86 | 0.68 | 0.87 | 6.28 | 0.04 |
| 697 | 5.87 | 2.92 | 0.70 | 0.91 | 6.37 | 0.05 |
| 698 | 5.92 | 2.99 | 0.73 | 0.95 | 6.45 | 0.06 |
| 699 | 5.98 | 3.06 | 0.76 | 1.00 | 6.54 | 0.07 |
| 700 | 6.03 | 3.12 | 0.79 | 1.05 | 6.62 | 0.08 |

FIG. 6-8

| WAVELENGTH (nm) | EXAMPLE 3 OBJECT SIDE | EXAMPLE 4 OBJECT SIDE | EXAMPLE 5 OBJECT SIDE | EXAMPLE 6 OBJECT SIDE | EXAMPLE 7 OBJECT SIDE | EXAMPLE 8 OBJECT SIDE |
|---|---|---|---|---|---|---|
| 701 | 6.09 | 3.19 | 0.82 | 1.10 | 6.70 | 0.10 |
| 702 | 6.14 | 3.25 | 0.86 | 1.15 | 6.77 | 0.11 |
| 703 | 6.18 | 3.32 | 0.89 | 1.20 | 6.85 | 0.12 |
| 704 | 6.23 | 3.38 | 0.93 | 1.26 | 6.92 | 0.14 |
| 705 | 6.27 | 3.44 | 0.96 | 1.31 | 6.98 | 0.15 |
| 706 | 6.31 | 3.50 | 1.00 | 1.37 | 7.05 | 0.17 |
| 707 | 6.35 | 3.56 | 1.04 | 1.43 | 7.11 | 0.18 |
| 708 | 6.39 | 3.62 | 1.08 | 1.49 | 7.17 | 0.20 |
| 709 | 6.42 | 3.67 | 1.12 | 1.55 | 7.23 | 0.22 |
| 710 | 6.45 | 3.73 | 1.16 | 1.61 | 7.29 | 0.23 |
| 711 | 6.48 | 3.78 | 1.20 | 1.67 | 7.34 | 0.25 |
| 712 | 6.51 | 3.83 | 1.24 | 1.73 | 7.39 | 0.27 |
| 713 | 6.54 | 3.88 | 1.29 | 1.79 | 7.44 | 0.29 |
| 714 | 6.57 | 3.93 | 1.33 | 1.85 | 7.49 | 0.31 |
| 715 | 6.59 | 3.98 | 1.37 | 1.92 | 7.54 | 0.33 |
| 716 | 6.61 | 4.02 | 1.42 | 1.98 | 7.58 | 0.35 |
| 717 | 6.64 | 4.06 | 1.46 | 2.04 | 7.63 | 0.36 |
| 718 | 6.66 | 4.11 | 1.51 | 2.10 | 7.67 | 0.38 |
| 719 | 6.68 | 4.15 | 1.55 | 2.16 | 7.71 | 0.40 |
| 720 | 6.70 | 4.19 | 1.60 | 2.22 | 7.75 | 0.42 |
| 721 | 6.72 | 4.23 | 1.64 | 2.29 | 7.79 | 0.44 |
| 722 | 6.74 | 4.26 | 1.69 | 2.35 | 7.83 | 0.46 |
| 723 | 6.76 | 4.30 | 1.73 | 2.41 | 7.87 | 0.48 |
| 724 | 6.78 | 4.34 | 1.78 | 2.46 | 7.91 | 0.50 |
| 725 | 6.80 | 4.38 | 1.82 | 2.52 | 7.95 | 0.52 |
| 726 | 6.83 | 4.41 | 1.87 | 2.58 | 7.99 | 0.53 |
| 727 | 6.85 | 4.45 | 1.91 | 2.64 | 8.03 | 0.55 |
| 728 | 6.87 | 4.48 | 1.96 | 2.69 | 8.07 | 0.57 |
| 729 | 6.90 | 4.52 | 2.00 | 2.75 | 8.11 | 0.59 |
| 730 | 6.92 | 4.56 | 2.05 | 2.81 | 8.15 | 0.61 |
| 731 | 6.95 | 4.60 | 2.09 | 2.86 | 8.19 | 0.63 |
| 732 | 6.98 | 4.63 | 2.14 | 2.92 | 8.23 | 0.65 |
| 733 | 7.01 | 4.67 | 2.19 | 2.97 | 8.27 | 0.67 |
| 734 | 7.04 | 4.71 | 2.24 | 3.02 | 8.31 | 0.69 |
| 735 | 7.07 | 4.75 | 2.28 | 3.08 | 8.35 | 0.71 |
| 736 | 7.10 | 4.79 | 2.33 | 3.13 | 8.40 | 0.73 |
| 737 | 7.13 | 4.83 | 2.38 | 3.19 | 8.44 | 0.75 |
| 738 | 7.16 | 4.87 | 2.43 | 3.24 | 8.48 | 0.77 |
| 739 | 7.20 | 4.92 | 2.48 | 3.30 | 8.52 | 0.80 |
| 740 | 7.23 | 4.96 | 2.53 | 3.35 | 8.57 | 0.82 |
| 741 | 7.27 | 5.01 | 2.58 | 3.41 | 8.61 | 0.84 |
| 742 | 7.31 | 5.05 | 2.64 | 3.46 | 8.65 | 0.87 |
| 743 | 7.35 | 5.10 | 2.69 | 3.52 | 8.70 | 0.89 |
| 744 | 7.38 | 5.15 | 2.75 | 3.58 | 8.74 | 0.92 |
| 745 | 7.42 | 5.19 | 2.81 | 3.64 | 8.78 | 0.95 |
| 746 | 7.46 | 5.24 | 2.86 | 3.70 | 8.82 | 0.97 |
| 747 | 7.50 | 5.29 | 2.92 | 3.76 | 8.86 | 1.00 |
| 748 | 7.53 | 5.34 | 2.99 | 3.82 | 8.90 | 1.03 |
| 749 | 7.57 | 5.39 | 3.05 | 3.88 | 8.93 | 1.06 |
| 750 | 7.60 | 5.44 | 3.11 | 3.94 | 8.97 | 1.09 |

FIG. 6-9

| WAVELENGTH (nm) | EXAMPLE 3 OBJECT SIDE | EXAMPLE 4 OBJECT SIDE | EXAMPLE 5 OBJECT SIDE | EXAMPLE 6 OBJECT SIDE | EXAMPLE 7 OBJECT SIDE | EXAMPLE 8 OBJECT SIDE |
|---|---|---|---|---|---|---|
| 751 | 7.64 | 5.48 | 3.18 | 4.01 | 9.00 | 1.12 |
| 752 | 7.67 | 5.53 | 3.24 | 4.07 | 9.03 | 1.16 |
| 753 | 7.70 | 5.58 | 3.31 | 4.14 | 9.06 | 1.19 |
| 754 | 7.73 | 5.63 | 3.38 | 4.21 | 9.09 | 1.22 |
| 755 | 7.76 | 5.67 | 3.44 | 4.28 | 9.12 | 1.25 |
| 756 | 7.79 | 5.72 | 3.51 | 4.35 | 9.14 | 1.29 |
| 757 | 7.82 | 5.76 | 3.59 | 4.42 | 9.16 | 1.32 |
| 758 | 7.84 | 5.80 | 3.66 | 4.49 | 9.18 | 1.36 |
| 759 | 7.86 | 5.85 | 3.73 | 4.56 | 9.20 | 1.39 |
| 760 | 7.88 | 5.89 | 3.80 | 4.63 | 9.21 | 1.43 |
| 761 | 7.90 | 5.93 | 3.87 | 4.70 | 9.22 | 1.46 |
| 762 | 7.92 | 5.96 | 3.95 | 4.77 | 9.23 | 1.50 |
| 763 | 7.94 | 6.00 | 4.02 | 4.85 | 9.24 | 1.53 |
| 764 | 7.96 | 6.04 | 4.10 | 4.92 | 9.25 | 1.56 |
| 765 | 7.97 | 6.07 | 4.17 | 4.99 | 9.25 | 1.60 |
| 766 | 7.98 | 6.10 | 4.24 | 5.07 | 9.26 | 1.63 |
| 767 | 7.99 | 6.14 | 4.32 | 5.14 | 9.25 | 1.67 |
| 768 | 8.00 | 6.16 | 4.39 | 5.21 | 9.25 | 1.70 |
| 769 | 8.01 | 6.19 | 4.47 | 5.29 | 9.25 | 1.74 |
| 770 | 8.02 | 6.22 | 4.54 | 5.36 | 9.24 | 1.77 |
| 771 | 8.02 | 6.24 | 4.62 | 5.43 | 9.23 | 1.80 |
| 772 | 8.02 | 6.26 | 4.69 | 5.50 | 9.21 | 1.83 |
| 773 | 8.02 | 6.28 | 4.77 | 5.57 | 9.20 | 1.86 |
| 774 | 8.02 | 6.30 | 4.84 | 5.64 | 9.18 | 1.89 |
| 775 | 8.02 | 6.32 | 4.91 | 5.71 | 9.16 | 1.92 |
| 776 | 8.02 | 6.34 | 4.98 | 5.78 | 9.14 | 1.95 |
| 777 | 8.02 | 6.35 | 5.05 | 5.85 | 9.12 | 1.98 |
| 778 | 8.01 | 6.36 | 5.12 | 5.91 | 9.10 | 2.01 |
| 779 | 8.01 | 6.37 | 5.19 | 5.98 | 9.07 | 2.03 |
| 780 | 8.00 | 6.38 | 5.25 | 6.04 | 9.04 | 2.06 |

FIG. 7-1

| WAVELENGTH (nm) | EXAMPLE 12 OBJECT SIDE | EXAMPLE 11 OBJECT SIDE | EXAMPLE 10 OBJECT SIDE | EXAMPLE 9 OBJECT SIDE |
|---|---|---|---|---|
| 380 | 0.77 | 3.31 | 38.23 | 36.11 |
| 381 | 1.01 | 3.59 | 37.52 | 35.37 |
| 382 | 1.27 | 3.88 | 36.76 | 34.58 |
| 383 | 1.55 | 4.20 | 35.97 | 33.75 |
| 384 | 1.83 | 4.54 | 35.16 | 32.91 |
| 385 | 2.12 | 4.91 | 34.36 | 32.08 |
| 386 | 2.41 | 5.30 | 33.58 | 31.27 |
| 387 | 2.69 | 5.71 | 32.82 | 30.50 |
| 388 | 2.97 | 6.12 | 32.10 | 29.77 |
| 389 | 3.25 | 6.54 | 31.41 | 29.08 |
| 390 | 3.54 | 6.93 | 30.73 | 28.41 |
| 391 | 3.83 | 7.31 | 30.06 | 27.76 |
| 392 | 4.14 | 7.66 | 29.37 | 27.11 |
| 393 | 4.46 | 7.98 | 28.66 | 26.44 |
| 394 | 4.80 | 8.27 | 27.92 | 25.76 |
| 395 | 5.17 | 8.53 | 27.15 | 25.04 |
| 396 | 5.56 | 8.77 | 26.33 | 24.29 |
| 397 | 5.96 | 9.00 | 25.49 | 23.53 |
| 398 | 6.37 | 9.24 | 24.64 | 22.75 |
| 399 | 6.78 | 9.47 | 23.78 | 21.97 |
| 400 | 7.19 | 9.73 | 22.94 | 21.22 |
| 401 | 7.58 | 9.99 | 22.15 | 20.51 |
| 402 | 7.96 | 10.28 | 21.40 | 19.85 |
| 403 | 8.31 | 10.59 | 20.72 | 19.26 |
| 404 | 8.64 | 10.91 | 20.10 | 18.73 |
| 405 | 8.94 | 11.23 | 19.54 | 18.27 |
| 406 | 9.21 | 11.55 | 19.04 | 17.87 |
| 407 | 9.47 | 11.85 | 18.59 | 17.52 |
| 408 | 9.71 | 12.13 | 18.18 | 17.21 |
| 409 | 9.94 | 12.39 | 17.78 | 16.92 |
| 410 | 10.16 | 12.61 | 17.40 | 16.65 |
| 411 | 10.39 | 12.80 | 17.03 | 16.38 |
| 412 | 10.63 | 12.96 | 16.65 | 16.11 |
| 413 | 10.88 | 13.08 | 16.27 | 15.83 |
| 414 | 11.14 | 13.19 | 15.89 | 15.55 |
| 415 | 11.42 | 13.27 | 15.52 | 15.28 |
| 416 | 11.70 | 13.35 | 15.18 | 15.02 |
| 417 | 12.00 | 13.43 | 14.86 | 14.79 |
| 418 | 12.29 | 13.52 | 14.57 | 14.58 |
| 419 | 12.58 | 13.62 | 14.34 | 14.42 |
| 420 | 12.85 | 13.73 | 14.16 | 14.30 |

FIG. 7-2

| WAVELENGTH (nm) | EXAMPLE 12 OBJECT SIDE | EXAMPLE 11 OBJECT SIDE | EXAMPLE 10 OBJECT SIDE | EXAMPLE 9 OBJECT SIDE |
|---|---|---|---|---|
| 421 | 13.11 | 13.86 | 14.03 | 14.24 |
| 422 | 13.35 | 14.01 | 13.96 | 14.22 |
| 423 | 13.57 | 14.16 | 13.93 | 14.24 |
| 424 | 13.75 | 14.32 | 13.95 | 14.30 |
| 425 | 13.91 | 14.49 | 13.99 | 14.38 |
| 426 | 14.04 | 14.64 | 14.06 | 14.48 |
| 427 | 14.14 | 14.78 | 14.13 | 14.59 |
| 428 | 14.23 | 14.91 | 14.20 | 14.69 |
| 429 | 14.29 | 15.00 | 14.26 | 14.77 |
| 430 | 14.35 | 15.07 | 14.30 | 14.84 |
| 431 | 14.40 | 15.11 | 14.33 | 14.89 |
| 432 | 14.45 | 15.13 | 14.35 | 14.91 |
| 433 | 14.51 | 15.12 | 14.35 | 14.92 |
| 434 | 14.57 | 15.09 | 14.34 | 14.91 |
| 435 | 14.64 | 15.04 | 14.32 | 14.89 |
| 436 | 14.72 | 14.98 | 14.31 | 14.87 |
| 437 | 14.81 | 14.93 | 14.31 | 14.85 |
| 438 | 14.92 | 14.87 | 14.32 | 14.84 |
| 439 | 15.02 | 14.82 | 14.35 | 14.85 |
| 440 | 15.13 | 14.79 | 14.39 | 14.87 |
| 441 | 15.24 | 14.77 | 14.46 | 14.90 |
| 442 | 15.34 | 14.76 | 14.54 | 14.96 |
| 443 | 15.43 | 14.77 | 14.64 | 15.02 |
| 444 | 15.50 | 14.79 | 14.75 | 15.09 |
| 445 | 15.56 | 14.82 | 14.85 | 15.17 |
| 446 | 15.60 | 14.85 | 14.96 | 15.24 |
| 447 | 15.61 | 14.88 | 15.05 | 15.30 |
| 448 | 15.61 | 14.91 | 15.12 | 15.34 |
| 449 | 15.58 | 14.92 | 15.17 | 15.36 |
| 450 | 15.53 | 14.92 | 15.19 | 15.36 |
| 451 | 15.46 | 14.90 | 15.19 | 15.33 |
| 452 | 15.38 | 14.86 | 15.16 | 15.27 |
| 453 | 15.29 | 14.80 | 15.10 | 15.18 |
| 454 | 15.20 | 14.72 | 15.01 | 15.06 |
| 455 | 15.10 | 14.62 | 14.91 | 14.93 |
| 456 | 15.00 | 14.50 | 14.79 | 14.77 |
| 457 | 14.91 | 14.37 | 14.66 | 14.61 |
| 458 | 14.82 | 14.23 | 14.52 | 14.43 |
| 459 | 14.74 | 14.09 | 14.38 | 14.25 |
| 460 | 14.67 | 13.95 | 14.24 | 14.07 |

FIG. 7-3

| WAVELENGTH (nm) | EXAMPLE 12 OBJECT SIDE | EXAMPLE 11 OBJECT SIDE | EXAMPLE 10 OBJECT SIDE | EXAMPLE 9 OBJECT SIDE |
|---|---|---|---|---|
| 461 | 14.62 | 13.81 | 14.11 | 13.90 |
| 462 | 14.57 | 13.69 | 13.98 | 13.73 |
| 463 | 14.53 | 13.57 | 13.86 | 13.57 |
| 464 | 14.49 | 13.46 | 13.75 | 13.42 |
| 465 | 14.46 | 13.37 | 13.64 | 13.27 |
| 466 | 14.43 | 13.29 | 13.54 | 13.13 |
| 467 | 14.39 | 13.22 | 13.44 | 12.99 |
| 468 | 14.35 | 13.16 | 13.33 | 12.86 |
| 469 | 14.30 | 13.11 | 13.22 | 12.72 |
| 470 | 14.24 | 13.06 | 13.09 | 12.57 |
| 471 | 14.17 | 13.01 | 12.96 | 12.41 |
| 472 | 14.08 | 12.96 | 12.81 | 12.24 |
| 473 | 13.98 | 12.90 | 12.64 | 12.05 |
| 474 | 13.86 | 12.83 | 12.45 | 11.84 |
| 475 | 13.73 | 12.75 | 12.24 | 11.62 |
| 476 | 13.59 | 12.66 | 12.02 | 11.38 |
| 477 | 13.43 | 12.55 | 11.77 | 11.12 |
| 478 | 13.27 | 12.43 | 11.52 | 10.85 |
| 479 | 13.09 | 12.29 | 11.24 | 10.57 |
| 480 | 12.92 | 12.14 | 10.96 | 10.28 |
| 481 | 12.74 | 11.99 | 10.68 | 9.98 |
| 482 | 12.57 | 11.82 | 10.39 | 9.68 |
| 483 | 12.39 | 11.66 | 10.10 | 9.38 |
| 484 | 12.23 | 11.48 | 9.82 | 9.09 |
| 485 | 12.07 | 11.31 | 9.54 | 8.80 |
| 486 | 11.91 | 11.14 | 9.27 | 8.52 |
| 487 | 11.77 | 10.98 | 9.01 | 8.24 |
| 488 | 11.64 | 10.83 | 8.75 | 7.98 |
| 489 | 11.51 | 10.68 | 8.51 | 7.73 |
| 490 | 11.39 | 10.55 | 8.28 | 7.49 |
| 491 | 11.28 | 10.42 | 8.05 | 7.26 |
| 492 | 11.18 | 10.31 | 7.84 | 7.04 |
| 493 | 11.07 | 10.20 | 7.63 | 6.83 |
| 494 | 10.97 | 10.10 | 7.42 | 6.62 |
| 495 | 10.87 | 10.01 | 7.21 | 6.41 |
| 496 | 10.77 | 9.93 | 7.01 | 6.21 |
| 497 | 10.67 | 9.84 | 6.80 | 6.01 |
| 498 | 10.56 | 9.76 | 6.59 | 5.80 |
| 499 | 10.44 | 9.68 | 6.38 | 5.60 |
| 500 | 10.32 | 9.59 | 6.16 | 5.39 |

FIG. 7-4

| WAVELENGTH (nm) | EXAMPLE 12 OBJECT SIDE | EXAMPLE 11 OBJECT SIDE | EXAMPLE 10 OBJECT SIDE | EXAMPLE 9 OBJECT SIDE |
|---|---|---|---|---|
| 501 | 10.18 | 9.50 | 5.94 | 5.18 |
| 502 | 10.04 | 9.40 | 5.71 | 4.97 |
| 503 | 9.90 | 9.29 | 5.48 | 4.75 |
| 504 | 9.74 | 9.18 | 5.25 | 4.54 |
| 505 | 9.58 | 9.05 | 5.02 | 4.32 |
| 506 | 9.41 | 8.92 | 4.78 | 4.10 |
| 507 | 9.23 | 8.78 | 4.55 | 3.89 |
| 508 | 9.06 | 8.64 | 4.32 | 3.67 |
| 509 | 8.88 | 8.48 | 4.10 | 3.46 |
| 510 | 8.70 | 8.33 | 3.88 | 3.26 |
| 511 | 8.52 | 8.17 | 3.66 | 3.06 |
| 512 | 8.34 | 8.01 | 3.46 | 2.87 |
| 513 | 8.17 | 7.85 | 3.26 | 2.69 |
| 514 | 8.00 | 7.69 | 3.07 | 2.52 |
| 515 | 7.84 | 7.54 | 2.90 | 2.36 |
| 516 | 7.68 | 7.39 | 2.73 | 2.21 |
| 517 | 7.53 | 7.25 | 2.57 | 2.07 |
| 518 | 7.39 | 7.12 | 2.43 | 1.93 |
| 519 | 7.26 | 6.99 | 2.29 | 1.81 |
| 520 | 7.13 | 6.88 | 2.16 | 1.70 |
| 521 | 7.01 | 6.77 | 2.04 | 1.59 |
| 522 | 6.90 | 6.66 | 1.93 | 1.49 |
| 523 | 6.79 | 6.57 | 1.82 | 1.40 |
| 524 | 6.68 | 6.48 | 1.72 | 1.31 |
| 525 | 6.58 | 6.39 | 1.63 | 1.23 |
| 526 | 6.48 | 6.31 | 1.53 | 1.15 |
| 527 | 6.39 | 6.23 | 1.44 | 1.08 |
| 528 | 6.29 | 6.15 | 1.36 | 1.00 |
| 529 | 6.19 | 6.08 | 1.27 | 0.93 |
| 530 | 6.09 | 6.00 | 1.19 | 0.87 |
| 531 | 5.99 | 5.92 | 1.11 | 0.80 |
| 532 | 5.88 | 5.83 | 1.03 | 0.74 |
| 533 | 5.78 | 5.75 | 0.95 | 0.67 |
| 534 | 5.66 | 5.66 | 0.88 | 0.61 |
| 535 | 5.55 | 5.56 | 0.81 | 0.56 |
| 536 | 5.43 | 5.46 | 0.74 | 0.50 |
| 537 | 5.31 | 5.36 | 0.67 | 0.45 |
| 538 | 5.18 | 5.25 | 0.61 | 0.40 |
| 539 | 5.06 | 5.14 | 0.55 | 0.35 |
| 540 | 4.93 | 5.03 | 0.49 | 0.31 |
| 541 | 4.80 | 4.91 | 0.44 | 0.27 |
| 542 | 4.67 | 4.80 | 0.39 | 0.23 |
| 543 | 4.54 | 4.68 | 0.34 | 0.20 |
| 544 | 4.41 | 4.56 | 0.30 | 0.17 |
| 545 | 4.29 | 4.45 | 0.26 | 0.14 |
| 546 | 4.16 | 4.33 | 0.23 | 0.12 |
| 547 | 4.04 | 4.22 | 0.20 | 0.10 |
| 548 | 3.93 | 4.12 | 0.17 | 0.08 |
| 549 | 3.82 | 4.01 | 0.15 | 0.06 |
| 550 | 3.71 | 3.92 | 0.13 | 0.05 |

FIG. 7-5

| WAVELENGTH (nm) | EXAMPLE 12 OBJECT SIDE | EXAMPLE 11 OBJECT SIDE | EXAMPLE 10 OBJECT SIDE | EXAMPLE 9 OBJECT SIDE |
|---|---|---|---|---|
| 551 | 3.61 | 3.82 | 0.11 | 0.04 |
| 552 | 3.51 | 3.73 | 0.10 | 0.03 |
| 553 | 3.42 | 3.65 | 0.08 | 0.02 |
| 554 | 3.33 | 3.57 | 0.07 | 0.02 |
| 555 | 3.24 | 3.50 | 0.06 | 0.01 |
| 556 | 3.17 | 3.43 | 0.05 | 0.01 |
| 557 | 3.09 | 3.37 | 0.05 | 0.01 |
| 558 | 3.02 | 3.31 | 0.04 | 0.01 |
| 559 | 2.95 | 3.25 | 0.04 | 0.01 |
| 560 | 2.89 | 3.20 | 0.03 | 0.01 |
| 561 | 2.83 | 3.14 | 0.03 | 0.01 |
| 562 | 2.77 | 3.09 | 0.03 | 0.01 |
| 563 | 2.71 | 3.05 | 0.03 | 0.01 |
| 564 | 2.65 | 3.00 | 0.03 | 0.01 |
| 565 | 2.60 | 2.95 | 0.03 | 0.01 |
| 566 | 2.54 | 2.90 | 0.03 | 0.01 |
| 567 | 2.48 | 2.85 | 0.03 | 0.01 |
| 568 | 2.43 | 2.80 | 0.03 | 0.02 |
| 569 | 2.37 | 2.74 | 0.03 | 0.02 |
| 570 | 2.31 | 2.69 | 0.04 | 0.03 |
| 571 | 2.25 | 2.63 | 0.04 | 0.03 |
| 572 | 2.19 | 2.58 | 0.04 | 0.03 |
| 573 | 2.13 | 2.52 | 0.05 | 0.04 |
| 574 | 2.07 | 2.46 | 0.05 | 0.04 |
| 575 | 2.00 | 2.40 | 0.05 | 0.05 |
| 576 | 1.94 | 2.33 | 0.06 | 0.05 |
| 577 | 1.88 | 2.27 | 0.06 | 0.06 |
| 578 | 1.81 | 2.21 | 0.07 | 0.07 |
| 579 | 1.75 | 2.14 | 0.07 | 0.07 |
| 580 | 1.68 | 2.08 | 0.07 | 0.08 |
| 581 | 1.62 | 2.02 | 0.08 | 0.08 |
| 582 | 1.56 | 1.96 | 0.08 | 0.08 |
| 583 | 1.50 | 1.90 | 0.08 | 0.09 |
| 584 | 1.44 | 1.84 | 0.08 | 0.09 |
| 585 | 1.38 | 1.79 | 0.08 | 0.09 |
| 586 | 1.33 | 1.74 | 0.08 | 0.09 |
| 587 | 1.27 | 1.69 | 0.08 | 0.10 |
| 588 | 1.22 | 1.64 | 0.08 | 0.10 |
| 589 | 1.17 | 1.59 | 0.08 | 0.10 |
| 590 | 1.13 | 1.55 | 0.08 | 0.10 |
| 591 | 1.08 | 1.51 | 0.08 | 0.09 |
| 592 | 1.04 | 1.47 | 0.08 | 0.09 |
| 593 | 1.00 | 1.44 | 0.07 | 0.09 |
| 594 | 0.97 | 1.41 | 0.07 | 0.09 |
| 595 | 0.93 | 1.38 | 0.07 | 0.08 |
| 596 | 0.90 | 1.35 | 0.06 | 0.08 |
| 597 | 0.87 | 1.33 | 0.06 | 0.08 |
| 598 | 0.84 | 1.31 | 0.06 | 0.07 |
| 599 | 0.81 | 1.29 | 0.05 | 0.07 |
| 600 | 0.79 | 1.27 | 0.05 | 0.07 |

FIG. 7-6

| WAVELENGTH (nm) | EXAMPLE 12 OBJECT SIDE | EXAMPLE 11 OBJECT SIDE | EXAMPLE 10 OBJECT SIDE | EXAMPLE 9 OBJECT SIDE |
|---|---|---|---|---|
| 601 | 0.77 | 1.25 | 0.05 | 0.06 |
| 602 | 0.74 | 1.23 | 0.04 | 0.06 |
| 603 | 0.72 | 1.22 | 0.04 | 0.06 |
| 604 | 0.70 | 1.20 | 0.04 | 0.05 |
| 605 | 0.68 | 1.19 | 0.04 | 0.05 |
| 606 | 0.67 | 1.17 | 0.03 | 0.05 |
| 607 | 0.65 | 1.16 | 0.03 | 0.05 |
| 608 | 0.63 | 1.15 | 0.03 | 0.04 |
| 609 | 0.61 | 1.13 | 0.03 | 0.04 |
| 610 | 0.60 | 1.12 | 0.03 | 0.04 |
| 611 | 0.58 | 1.10 | 0.03 | 0.04 |
| 612 | 0.56 | 1.09 | 0.02 | 0.04 |
| 613 | 0.55 | 1.07 | 0.02 | 0.04 |
| 614 | 0.53 | 1.06 | 0.02 | 0.04 |
| 615 | 0.51 | 1.04 | 0.02 | 0.04 |
| 616 | 0.50 | 1.03 | 0.02 | 0.04 |
| 617 | 0.48 | 1.01 | 0.02 | 0.04 |
| 618 | 0.46 | 1.00 | 0.02 | 0.04 |
| 619 | 0.44 | 0.98 | 0.02 | 0.04 |
| 620 | 0.43 | 0.96 | 0.02 | 0.04 |
| 621 | 0.41 | 0.95 | 0.02 | 0.05 |
| 622 | 0.39 | 0.93 | 0.03 | 0.05 |
| 623 | 0.38 | 0.91 | 0.03 | 0.05 |
| 624 | 0.36 | 0.90 | 0.03 | 0.05 |
| 625 | 0.35 | 0.88 | 0.03 | 0.06 |
| 626 | 0.33 | 0.87 | 0.04 | 0.06 |
| 627 | 0.32 | 0.85 | 0.04 | 0.07 |
| 628 | 0.30 | 0.84 | 0.04 | 0.08 |
| 629 | 0.29 | 0.82 | 0.05 | 0.08 |
| 630 | 0.27 | 0.81 | 0.05 | 0.09 |
| 631 | 0.26 | 0.80 | 0.06 | 0.10 |
| 632 | 0.25 | 0.79 | 0.07 | 0.11 |
| 633 | 0.24 | 0.78 | 0.08 | 0.12 |
| 634 | 0.22 | 0.77 | 0.08 | 0.13 |
| 635 | 0.21 | 0.76 | 0.09 | 0.14 |
| 636 | 0.20 | 0.75 | 0.10 | 0.15 |
| 637 | 0.19 | 0.75 | 0.11 | 0.16 |
| 638 | 0.19 | 0.74 | 0.13 | 0.18 |
| 639 | 0.18 | 0.74 | 0.14 | 0.19 |
| 640 | 0.17 | 0.74 | 0.15 | 0.21 |
| 641 | 0.16 | 0.74 | 0.16 | 0.22 |
| 642 | 0.16 | 0.74 | 0.18 | 0.24 |
| 643 | 0.15 | 0.74 | 0.19 | 0.25 |
| 644 | 0.15 | 0.74 | 0.21 | 0.27 |
| 645 | 0.14 | 0.75 | 0.22 | 0.29 |
| 646 | 0.14 | 0.75 | 0.24 | 0.30 |
| 647 | 0.14 | 0.76 | 0.26 | 0.32 |
| 648 | 0.14 | 0.77 | 0.27 | 0.34 |
| 649 | 0.13 | 0.77 | 0.29 | 0.36 |
| 650 | 0.13 | 0.78 | 0.31 | 0.37 |

FIG. 7-7

| WAVELENGTH (nm) | EXAMPLE 12 OBJECT SIDE | EXAMPLE 11 OBJECT SIDE | EXAMPLE 10 OBJECT SIDE | EXAMPLE 9 OBJECT SIDE |
|---|---|---|---|---|
| 651 | 0.13 | 0.79 | 0.32 | 0.39 |
| 652 | 0.13 | 0.80 | 0.34 | 0.41 |
| 653 | 0.13 | 0.81 | 0.36 | 0.43 |
| 654 | 0.13 | 0.82 | 0.38 | 0.45 |
| 655 | 0.13 | 0.84 | 0.39 | 0.47 |
| 656 | 0.14 | 0.85 | 0.41 | 0.49 |
| 657 | 0.14 | 0.86 | 0.43 | 0.51 |
| 658 | 0.14 | 0.87 | 0.45 | 0.52 |
| 659 | 0.14 | 0.89 | 0.47 | 0.55 |
| 660 | 0.14 | 0.90 | 0.49 | 0.57 |
| 661 | 0.15 | 0.91 | 0.51 | 0.59 |
| 662 | 0.15 | 0.92 | 0.53 | 0.61 |
| 663 | 0.15 | 0.94 | 0.55 | 0.63 |
| 664 | 0.16 | 0.95 | 0.58 | 0.65 |
| 665 | 0.16 | 0.96 | 0.60 | 0.68 |
| 666 | 0.17 | 0.97 | 0.63 | 0.70 |
| 667 | 0.17 | 0.98 | 0.65 | 0.73 |
| 668 | 0.18 | 0.99 | 0.68 | 0.75 |
| 669 | 0.18 | 1.00 | 0.71 | 0.78 |
| 670 | 0.19 | 1.01 | 0.74 | 0.81 |
| 671 | 0.19 | 1.02 | 0.77 | 0.84 |
| 672 | 0.20 | 1.03 | 0.80 | 0.87 |
| 673 | 0.20 | 1.03 | 0.83 | 0.91 |
| 674 | 0.21 | 1.04 | 0.87 | 0.94 |
| 675 | 0.21 | 1.05 | 0.90 | 0.98 |
| 676 | 0.22 | 1.05 | 0.94 | 1.01 |
| 677 | 0.22 | 1.06 | 0.98 | 1.05 |
| 678 | 0.23 | 1.07 | 1.02 | 1.09 |
| 679 | 0.23 | 1.07 | 1.06 | 1.13 |
| 680 | 0.24 | 1.08 | 1.11 | 1.18 |
| 681 | 0.24 | 1.08 | 1.15 | 1.22 |
| 682 | 0.25 | 1.09 | 1.20 | 1.26 |
| 683 | 0.25 | 1.09 | 1.24 | 1.31 |
| 684 | 0.26 | 1.10 | 1.29 | 1.36 |
| 685 | 0.26 | 1.11 | 1.34 | 1.40 |
| 686 | 0.27 | 1.11 | 1.39 | 1.45 |
| 687 | 0.27 | 1.12 | 1.44 | 1.50 |
| 688 | 0.27 | 1.13 | 1.49 | 1.55 |
| 689 | 0.28 | 1.13 | 1.54 | 1.60 |
| 690 | 0.28 | 1.14 | 1.59 | 1.65 |
| 691 | 0.29 | 1.15 | 1.64 | 1.70 |
| 692 | 0.29 | 1.16 | 1.69 | 1.75 |
| 693 | 0.29 | 1.17 | 1.74 | 1.80 |
| 694 | 0.30 | 1.18 | 1.79 | 1.85 |
| 695 | 0.30 | 1.19 | 1.84 | 1.90 |
| 696 | 0.30 | 1.21 | 1.89 | 1.94 |
| 697 | 0.30 | 1.22 | 1.94 | 1.99 |
| 698 | 0.31 | 1.24 | 1.99 | 2.04 |
| 699 | 0.31 | 1.25 | 2.03 | 2.08 |
| 700 | 0.32 | 1.27 | 2.08 | 2.13 |

FIG. 7-8

| WAVELENGTH (nm) | EXAMPLE 12 OBJECT SIDE | EXAMPLE 11 OBJECT SIDE | EXAMPLE 10 OBJECT SIDE | EXAMPLE 9 OBJECT SIDE |
|---|---|---|---|---|
| 701 | 0.32 | 1.29 | 2.13 | 2.17 |
| 702 | 0.32 | 1.31 | 2.17 | 2.22 |
| 703 | 0.33 | 1.33 | 2.21 | 2.26 |
| 704 | 0.33 | 1.35 | 2.26 | 2.30 |
| 705 | 0.34 | 1.37 | 2.30 | 2.34 |
| 706 | 0.34 | 1.39 | 2.34 | 2.38 |
| 707 | 0.35 | 1.41 | 2.38 | 2.42 |
| 708 | 0.35 | 1.43 | 2.42 | 2.45 |
| 709 | 0.36 | 1.46 | 2.46 | 2.49 |
| 710 | 0.37 | 1.48 | 2.50 | 2.52 |
| 711 | 0.37 | 1.51 | 2.53 | 2.56 |
| 712 | 0.38 | 1.53 | 2.57 | 2.59 |
| 713 | 0.39 | 1.55 | 2.61 | 2.63 |
| 714 | 0.40 | 1.58 | 2.64 | 2.66 |
| 715 | 0.41 | 1.60 | 2.68 | 2.69 |
| 716 | 0.41 | 1.63 | 2.71 | 2.73 |
| 717 | 0.42 | 1.65 | 2.75 | 2.76 |
| 718 | 0.43 | 1.68 | 2.78 | 2.79 |
| 719 | 0.45 | 1.70 | 2.82 | 2.82 |
| 720 | 0.46 | 1.72 | 2.86 | 2.86 |
| 721 | 0.47 | 1.74 | 2.89 | 2.89 |
| 722 | 0.48 | 1.77 | 2.93 | 2.92 |
| 723 | 0.49 | 1.79 | 2.97 | 2.96 |
| 724 | 0.51 | 1.81 | 3.01 | 2.99 |
| 725 | 0.52 | 1.83 | 3.04 | 3.03 |
| 726 | 0.53 | 1.85 | 3.08 | 3.06 |
| 727 | 0.55 | 1.87 | 3.12 | 3.10 |
| 728 | 0.56 | 1.88 | 3.17 | 3.14 |
| 729 | 0.57 | 1.90 | 3.21 | 3.18 |
| 730 | 0.59 | 1.92 | 3.25 | 3.21 |
| 731 | 0.60 | 1.93 | 3.29 | 3.25 |
| 732 | 0.62 | 1.95 | 3.34 | 3.30 |
| 733 | 0.63 | 1.96 | 3.38 | 3.34 |
| 734 | 0.65 | 1.97 | 3.43 | 3.38 |
| 735 | 0.66 | 1.99 | 3.48 | 3.42 |
| 736 | 0.67 | 2.00 | 3.53 | 3.47 |
| 737 | 0.69 | 2.01 | 3.57 | 3.51 |
| 738 | 0.70 | 2.02 | 3.62 | 3.56 |
| 739 | 0.71 | 2.03 | 3.67 | 3.60 |
| 740 | 0.73 | 2.04 | 3.72 | 3.65 |
| 741 | 0.74 | 2.06 | 3.77 | 3.69 |
| 742 | 0.75 | 2.07 | 3.82 | 3.74 |
| 743 | 0.76 | 2.08 | 3.87 | 3.79 |
| 744 | 0.78 | 2.09 | 3.92 | 3.83 |
| 745 | 0.79 | 2.10 | 3.97 | 3.88 |
| 746 | 0.80 | 2.11 | 4.02 | 3.93 |
| 747 | 0.81 | 2.12 | 4.07 | 3.97 |
| 748 | 0.82 | 2.13 | 4.12 | 4.02 |
| 749 | 0.83 | 2.15 | 4.17 | 4.06 |
| 750 | 0.84 | 2.16 | 4.21 | 4.10 |

FIG. 7-9

| WAVELENGTH (nm) | EXAMPLE 12 OBJECT SIDE | EXAMPLE 11 OBJECT SIDE | EXAMPLE 10 OBJECT SIDE | EXAMPLE 9 OBJECT SIDE |
|---|---|---|---|---|
| 751 | 0.85 | 2.17 | 4.26 | 4.14 |
| 752 | 0.86 | 2.19 | 4.30 | 4.19 |
| 753 | 0.86 | 2.20 | 4.34 | 4.23 |
| 754 | 0.87 | 2.22 | 4.38 | 4.26 |
| 755 | 0.88 | 2.23 | 4.43 | 4.30 |
| 756 | 0.89 | 2.25 | 4.46 | 4.34 |
| 757 | 0.90 | 2.27 | 4.50 | 4.37 |
| 758 | 0.90 | 2.29 | 4.54 | 4.41 |
| 759 | 0.91 | 2.31 | 4.57 | 4.44 |
| 760 | 0.92 | 2.33 | 4.61 | 4.47 |
| 761 | 0.93 | 2.35 | 4.64 | 4.50 |
| 762 | 0.94 | 2.37 | 4.67 | 4.53 |
| 763 | 0.94 | 2.39 | 4.70 | 4.56 |
| 764 | 0.95 | 2.41 | 4.73 | 4.58 |
| 765 | 0.96 | 2.44 | 4.76 | 4.61 |
| 766 | 0.97 | 2.46 | 4.78 | 4.63 |
| 767 | 0.98 | 2.49 | 4.81 | 4.65 |
| 768 | 0.98 | 2.51 | 4.83 | 4.67 |
| 769 | 0.99 | 2.54 | 4.85 | 4.69 |
| 770 | 1.00 | 2.56 | 4.87 | 4.71 |
| 771 | 1.01 | 2.59 | 4.89 | 4.72 |
| 772 | 1.02 | 2.62 | 4.91 | 4.74 |
| 773 | 1.03 | 2.65 | 4.92 | 4.75 |
| 774 | 1.04 | 2.68 | 4.94 | 4.77 |
| 775 | 1.05 | 2.71 | 4.95 | 4.78 |
| 776 | 1.06 | 2.74 | 4.97 | 4.79 |
| 777 | 1.07 | 2.77 | 4.98 | 4.80 |
| 778 | 1.08 | 2.79 | 4.99 | 4.81 |
| 779 | 1.10 | 2.82 | 5.00 | 4.82 |
| 780 | 1.11 | 2.85 | 5.01 | 4.82 |

SPECTACLE LENS AND SPECTACLES

CROSS-REFERENCE TO RELATED APPLICATIONS

This application is a Continuation of PCT International Application No. PCT/JP2018/043217 filed on Nov. 22, 2018, which was published under PCT Article 21(2) in Japanese and claims priority under 35 U.S.C § 119(a) to Japanese Patent Application No. 2017-225708 filed on Nov. 24, 2017. The above applications are hereby expressly incorporated by reference, in their entirety, into the present application.

TECHNICAL FIELD

The present disclosure relates to a spectacle lens and spectacles having the spectacle lenses.

BACKGROUND ART

A spectacle lens is normally manufactured by forming a functional film, to provide a desired function to the spectacle lens, on the surface of the lens substrate. For this functional film, in recent years a multilayer film is formed on both surfaces of the lens substrate (e.g. see WO 2014/069250).

SUMMARY

In a spectacle lens, the comfort of wearing spectacle lens tends to be diminished if the multilayer film is formed on both surfaces of the lens substrate. This is because the user of the glasses is more likely to visually recognize a double image, called a ghost because of the light that entered the spectacle lens is multi-reflected between the two multilayer films. To solve this problem, WO 2014/069250 proposes that the reflection characteristics of the multilayer film formed on one surface and the multilayer film formed on the other surface of the lens substrate are adjusted to satisfy a predetermined relationship in order to suppress the multi-reflection in the spectacle lens (see Claim 1 in WO 2014/069250).

Lately, the monitor screens of digital equipment have changed from cathode-ray to liquid crystals, and LED liquid crystal screens are also becoming popular, but liquid crystal monitors, particularly LED liquid crystal monitors, strongly emit short wavelength light called blue light. In order to effectively reduce the fatigue and pain of the eyes when digital equipment is used for a long time, countermeasures should be taken to decrease the stress on the eyes caused by the blue light. Concerning this aspect, paragraph [0054] in WO 2014/069250 mentions reduction of the undesirable influence of the blue light.

However, the present inventors discovered through studies that the performance of the spectacle lens according to WO 2014/069250 is insufficient in terms of improving the comfort of wearing the spectacles (specifically, suppressing ghost) in addition to effectively reducing the stress on the eyes caused by the blue light.

It is an object of one aspect of the present disclosure to provide a spectacle lens which reduces the stress on the eyes caused by the blue light and which is comfortable to wear.

An aspect of the present disclosure relates to a spectacle lens including: a lens substrate; a multilayer film disposed on one surface of the lens substrate; and a multilayer film disposed on the other surface of the lens substrate, wherein an average reflectance within the wavelength range from 380 to 500 nm measured at least on one surface of the spectacle lens is 10.00% or more, and the reflectance within the entire wavelength range from 400 to 780 nm measured at least on one surface of the spectacle lens is 5.00% or less.

In the spectacle lens, the average reflectance within the wavelength range from 380 to 500 nm measured on one surface is 10.00% or more. The blue light can be reflected well on the surface having this average reflectance, hence if this spectacle lens is used, the quantity of the blue light that enters the eyes of the user wearing the spectacles having the spectacle lenses can be reduced, whereby the stress on the eyes of the user of the spectacles caused by the blue light can be reduced. In the present disclosure and in this description, "blue light" refers to light within the wavelength range from 380 to 500 nm unless otherwise specified.

Further, this spectacle lens has multilayer films on each of both surfaces, and the reflectance within the entire wavelength range from 400 to 780 nm measured at least on one surface of the spectacle lens is 5.00% or less. In the case of a spectacle lens having multilayer films on each of both surfaces, a ghost that is generated by multi-reflection of the light that entered the spectacle lens, as mentioned above, tends to diminish the comfort of wearing the spectacles. However, in the case of the above-mentioned spectacle lens, the reflectance within the entire wavelength range from 400 to 780 nm, which is a wavelength range suitable for visual recognition by the user, measured at least on one surface is 5.00% or less. In other words, within the wavelength range from 400 to 780 nm, the reflectance does never exceed 5.00% at least on one surface. Thereby the multi-reflection in the spectacle lens can be suppressed, and diminishing the comfort of wearing the spectacles due to a ghost can be suppressed.

Another aspect of the present disclosure is spectacles having the spectacle lenses.

Advantageous Effects of Disclosure

According to an aspect of the present disclosure, a spectacle lens and spectacles having the spectacle lenses, which can reduce the stress on the eyes caused by the blue light and which is comfortable to wear, can be provided.

BRIEF DESCRIPTION OF DRAWINGS

FIG. 5-1 indicates reflectance values measured for the spectacle lenses of examples and comparative examples.

FIG. 5-2 indicates reflectance values measured for the spectacle lenses of Examples 1 and 2 and Comparative Examples 1 and 2.

FIG. 5-3 indicates reflectance values measured for the spectacle lenses of Examples 1 and 2 and Comparative Examples 1 and 2.

FIG. 5-4 indicates reflectance values measured for the spectacle lenses of Examples 1 and 2 and Comparative Examples 1 and 2.

FIG. 5-5 indicates reflectance values measured for the spectacle lenses of Examples 1 and 2 and Comparative Examples 1 and 2.

FIG. 5-6 indicates reflectance values measured for the spectacle lenses of Examples 1 and 2 and Comparative Examples 1 and 2.

FIG. 5-7 indicates reflectance values measured for the spectacle lenses of Examples 1 and 2 and Comparative Examples 1 and 2.

FIG. 5-8 indicates reflectance values measured for the spectacle lenses of Examples 1 and 2 and Comparative Examples 1 and 2.

FIG. 5-9 indicates reflectance values measured for the spectacle lenses of Examples 1 and 2 and Comparative Examples 1 and 2.

FIG. 6-1 indicates reflectance values measured for the spectacle lenses (object side) of Examples 3 to 8.

FIG. 6-2 indicates reflectance values measured for the spectacle lenses (object side) of Examples 3 to 8.

FIG. 6-3 indicates reflectance values measured for the spectacle lenses (object side) of Examples 3 to 8.

FIG. 6-4 indicates reflectance values measured for the spectacle lenses (object side) of Examples 3 to 8.

FIG. 6-5 indicates reflectance values measured for the spectacle lenses (object side) of Examples 3 to 8.

FIG. 6-6 indicates reflectance values measured for the spectacle lenses (object side) of Examples 3 to 8.

FIG. 6-7 indicates reflectance values measured for the spectacle lenses (object side) of Examples 3 to 8.

FIG. 6-8 indicates reflectance values measured for the spectacle lenses (object side) of Examples 3 to 8.

FIG. 6-9 indicates reflectance values measured for the spectacle lenses (object side) of Examples 3 to 8.

FIG. 7-1 indicates reflectance values measured for the spectacle lenses (object side) of Examples 9 to 12.

FIG. 7-2 indicates reflectance values measured for the spectacle lenses (object side) of Examples 9 to 12.

FIG. 7-3 indicates reflectance values measured for the spectacle lenses (object side) of Examples 9 to 12.

FIG. 7-4 indicates reflectance values measured for the spectacle lenses (object side) of Examples 9 to 12.

FIG. 7-5 indicates reflectance values measured for the spectacle lenses (object side) of Examples 9 to 12.

FIG. 7-6 indicates reflectance values measured for the spectacle lenses (object side) of Examples 9 to 12.

FIG. 7-7 indicates reflectance values measured for the spectacle lenses (object side) of Examples 9 to 12.

FIG. 7-8 indicates reflectance values measured for the spectacle lenses (object side) of Examples 9 to 12.

FIG. 7-9 indicates reflectance values measured for the spectacle lenses (object side) of Examples 9 to 12.

DESCRIPTION OF EMBODIMENTS

[Spectacle Lens]

Figure 1:
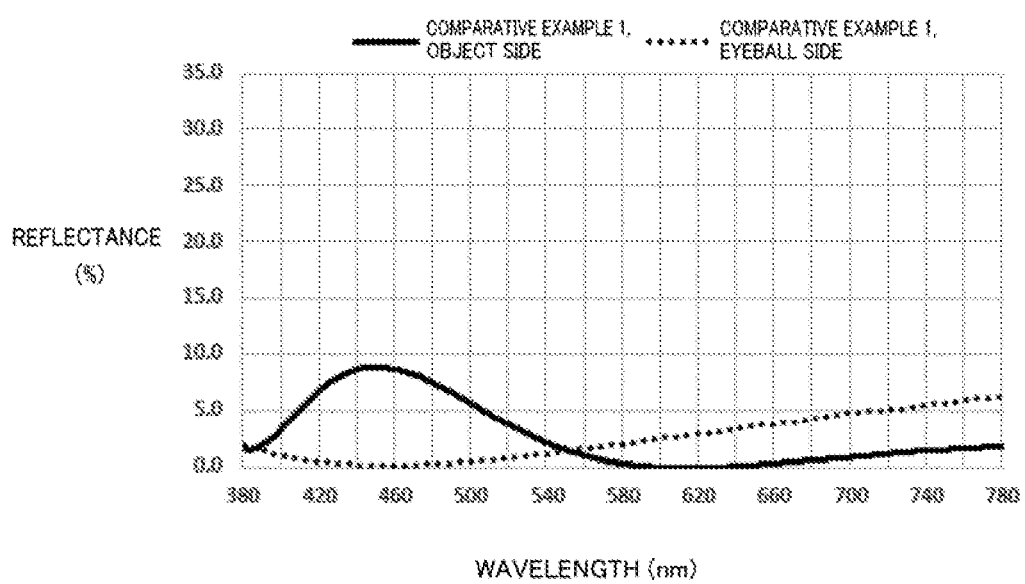
FIG. 1 indicates a reflection spectrum acquired from a spectacle lens of Comparative Example 1.

A spectacle lens according to an aspect of the present disclosure is a spectacle lens including: a lens substrate; a multilayer film disposed on one surface of the lens substrate; and a multilayer film disposed on the other surface of the lens substrate, wherein the average reflectance within the wavelength range from 380 to 500 nm measured at least on one surface of the spectacle lens is 10.00% or more, and the reflectance within the entire wavelength range from 400 to 780 nm measured at least on one surface of the spectacle lens is 5.00% or less.

In the present disclosure and in this description, the reflectance that is measured for the surface of the spectacle lens is a reflectance of the light that directly enters the surface of the spectacle lens (that is, incident angle is 0°). The reflectance can be measured in a 1 to 5 nm interval. The average reflectance within a certain wavelength range refers to an arithmetic mean of the reflectance values determined within the wavelength range.

The spectacle lens will be described in detail next.

<Reflection Characteristics>

(Average Reflectance within the Wavelength Range from 380 to 500 nm)

In this spectacle lens, the average reflectance within the wavelength range from 380 to 500 nm measured at least on one surface of the spectacle lens is 10.00% or more, thereby the quantity of the blue light that enters the eye of the user of the spectacles can be effectively reduced. In terms of further reducing the quantity of the blue light that enters the eyes of the user of the spectacles, the average reflectance may be 11.00% or more, 12.00% or more, 13.00% or more, 14.00% or more, 15.00% or more, or 16.00% or more. The average reflectance may be 30.00% or less, for example, or 25.00% or less, or 22.00% or less, or even 20.00% or less. However, the quantity of the blue light that enters the eyes of the user of the spectacles can be reduced more as the average reflectance is higher, hence the average reflectance may exceed the above-mentioned examples of the upper limit.

The surface having this average reflectance may be an object side surface or an eyeball side surface of the spectacle lens, or may be both surfaces of the spectacle lens. In terms of providing a more comfort of wearing to the user of the spectacles, only one surface (that is, only the object side surface or only the eyeball side surface) of the spectacle lens may have this average reflectance. When only one surface of the spectacle lens has this average reflectance, an average reflectance within the wavelength range from 380 to 500 nm measured on the other surface is less than 10.00%, may be 7.00% or less, 5.00% or less, or 3.00% or less. Further, when only one surface of the spectacle lens has this average reflectance, an average reflectance within the wavelength range from 380 to 500 nm measured on the other surface may be 0.10% or more or 1.00% or more, for example.

(Reflectance within the Wavelength Range from 400 to 780 nm)

In this spectacle lens, a multilayer film is disposed on both surfaces of the spectacle lens, respectively. In the case of a spectacle lens having a multilayer film on both surfaces thereof respectively, a ghost that is generated by multi-reflection of the light that entered the spectacle lens, as mentioned above, tends to diminish the comfort of wearing the spectacles. However, in the case of the above-mentioned spectacle lens, the reflectance within the entire wavelength range from 400 to 780 nm measured at least on one surface is 5.00% or less. Thereby it can be suppressed that the light, which entered the spectacle lens, multi-reflects between the two multilayer films disposed on both surfaces of the spectacle lens, and as a result, the intensity of a ghost formed by the multi-reflection that is visually recognized by the user of the spectacles can be decreased, or can be decreased to a level where the ghost is hardly recognized. As a consequence, diminishing the comfort of wearing the spectacles due to a ghost can be suppressed.

In the wavelength range from 400 to 780 nm, a wavelength range where only the reflectance that is measured on one surface of the spectacle lens is 5.00% or less may be included in some cases. Further, in the wavelength range from 400 to 780 nm, a wavelength range where each reflectance that is measured on each of both surfaces of the spectacle lens is 5.00% or less may be included in some cases. Further, in the wavelength range from 400 to 780 nm, a wavelength range where only the reflectance that is measured on one surface of the spectacle lens is 5.00% or less and another wavelength range where only the reflectance that is measured on the other surface of the spectacle lens is 5.00% or less, may be included in some cases. In any of these cases, diminishing the comfort of wearing the spectacles due to a ghost can be suppressed, since the reflectance that is measured on at least one surface of the two surfaces on which the multiplayer film is disposed is 5.00% or less within the entire wavelength range from 400 to 780 nm. In terms of further improving the comfort of wearing, the reflectance that is measured on at least one surface may be 4.50% or less within the entire wavelength range from 400 to 780 nm, or 4.00% or less. Each reflectance measured on both surfaces of the spectacle lens can be 0.01% or more, for example, within the entire wavelength range from 400 to 780 nm.

<Lens Substrate>

The lens substrate included in the spectacle lens may be selected from various lens substrates that are normally used as the lens substrates of the spectacle lenses, and is not limited to a specific lens substrate. The lens substrate may be a plastic lens substrate or a glass lens substrate. The glass lens substrate is, for example, a lens substrate made of inorganic glass. In terms of being light and difficult to break, the lens substrate may be a plastic lens substrate. The plastic lens substrate may be, for example, a styrene resin (e.g. a (meth)acrylic resin), a polycarbonate resin, an allyl resin, and an allyl carbonate resin (e.g. a di(ethylene glycol) bis(allyl carbonate) resin (CR-39)), a vinyl resin, a polyester resin, a polyether resin, a urethane resin generated by the reaction of an isocyanate compound and a hydroxy compound (e.g. diethylene glycol), a thiourethane resin generated by the reaction of an isocyanate compound and a polythiol compound, and a cured material (normally called transparent resin) generated by curing a curable composition containing (thio)epoxy resin having at least one disulfide bond in one molecule. The lens substitute may not be colored (colorless lens) or may be colored (colored lens). The refractive index of the lens substrate is about 1.60 to 1.75, for example. The refractive index of the lens substrate, however, is not limited to this range, but may be within this range or above or below this range. In the present disclosure and this description, the refractive index refers to a refractive index with respect to light having a 500 nm wavelength. The lens substrate may be a lens having refractive power (prescription lens) or may be a lens having no refractive power (flat lens).

The lens substrate may include at least one type of additive that may be included in the lens substrates of spectacle lenses in general. For example, in the case of molding the lens substrate by curing a curable composition containing a polymerizable compound, a polymerizable catalyst according to Japanese Patent Application Publication No. H07-063902, Japanese Patent Application Publication No. H07-104101, Japanese Patent Application Publication No. H09-208621, Japanese Patent Application Publication No. H09-255781 and the like, and one or more additives, such as an internal mold release agent, an antioxidant, a fluorescent whitening agent, and a bluing agent according to Japanese Patent Application Publication No. H01-163012, Japanese Patent Application Publication No. H03-281312 and the like, may be added. For the type of the additive, the amount of the additive and a method of molding the lens substrate using a curable composition, a known technique can be applied.

This spectacle lens can be various lenses including a mono-focal lens, a multi-focal lens and a progressive power lens. The type of lens may be determined by the surface shape of both surfaces of the lens substrate. The surface of the lens substrate may be any one of a convex surface, a concave surface and a flat surface. In general lens substrates and spectacle lenses, the surface on the object side is a convex surface, and the surface on the eyeball side is a concave surface. However, the present disclosure is not limited to this.

This spectacle lens has a multilayer film on one surface and the other surface of the lens substrate respectively. This multilayer film may be formed directly on the surface of the lens substrate, or may be disposed on the surface of the lens substrate via at least one other layer. For the layer that can be disposed between the multilayer film and the lens substrate, a known technique on a spectacle lens can be used. This layer is, for example, a polarizing layer, a dimming layer and a hard coat layer. If the hard coat layer is formed between the multilayer film and the lens substrate, for example, durability (strength) of the spectacle lens can be improved. The hard coat layer may be a cured layer generated by curing the curable composition, for example. For details on the hard coat layer, refer to paragraphs 0025 to 0028 and 0030 of Japanese Patent Application Publication No. 2012-128135. A primer layer may be formed between the lens substrate and the multilayer film to improve the adhesive property. For details on the primer layer, refer to paragraphs 0029 and 0030 of Japanese Patent Application Publication No. 2012-128135.

<Multilayer Film>

The spectacle lens has a multilayer film on one surface and on the other surface of the lens substrate, respectively. Because of these multilayer films, the average reflectance within the entire wavelength range from 380 to 500 nm measured at least on one surface of the spectacle lens is 10.00% or more, and the reflectance within the entire wavelength range from 400 to 780 nm measured at least on one surface of the spectacle lens is 5.00% or less. Further, because of the multilayer film, various characteristics mentioned later are implemented in the spectral lens. The layer configuration of the multilayer film can be determined by designing a film using a known method (e.g. optical simulation) so as to implement desired characteristics (e.g. reflection characteristics). The film forming conditions (type of film material, combination of layers and thickness of each layer constituting the multilayer film) are determined so that the multilayer film having the determined layer configuration can be formed, and the film is formed based on the determined film forming conditions, whereby the multilayer film can be formed on the lens substrate surface.

For the method of forming the multilayer film, a known film forming method can be used. In terms of ease of film formation, the film may be formed by deposition. In other words, each layer constituting the multilayer film may be a deposited film. The deposited film refers to a film formed by deposition. In the present disclosure and this description, "deposition" includes a dry method (e.g. a vacuum deposition method), an ion plating method and a sputtering method. In the case of the vacuum deposition method, an ion bean assist method, which irradiates an ion beam while deposition is being performed, may be used.

The multilayer film to provide a desired reflection characteristic may be a multilayer film in which a high refractive index layer and a low refractive index layer are alternately layered. In the present disclosure and this description, the terms "high" and "low" of the phrases of high refractive index and low refractive index indicate relative magnitude. In other words, the high refractive index layer refer to a layer of which refractive index is higher than the low refractive index layer included in the same multilayer film. In the same manner, the low refractive index layer refers to a layer of which refractive index is lower than the high refractive index layer included in the same multilayer film. The refractive index of the high refractive index material constituting the high refractive index layer is 1.60 or more (e.g. 1.60 to 2.40 range), for example, and the refractive index of the low refractive index material constituting the low refractive index layer is 1.59 or less (e.g. 1.37 to 1.59 range), for example. However, as mentioned above the terms "high" and "low" of the phrases of high refractive index and low refractive index indicate relative magnitude, hence the refractive index of the high refractive index material and that of the low refractive index material are not limited to the above-mentioned ranges.

For the high refractive index material and the low refractive index material, an inorganic material, an organic material or an inorganic/organic composite material can be used. The multilayer film may be an inorganic multilayer film. In concrete terms, examples of the high refractive index material to form the high refractive index layer include a mixture of one or at least two types of oxides selected from zirconium oxide (e.g. $ZrO_2$), tantalum oxide (e.g. $Ta_2O_5$) titanium oxide (e.g. $TiO_2$), aluminum oxide (e.g. $Al_2O_3$), yttrium oxide (e.g. $Y_2O_3$), hafnium oxide (e.g. $HfO_2$) and niobium oxide (e.g. $Nb_2O_5$). Meanwhile, examples of the low refractive index material to form the low refractive index layer include a mixture of at least one or two types of oxides or fluorides selected from a silicon oxide (e.g. $SiO_2$), magnesium fluoride (e.g. $MgF_2$) and barium fluoride (e.g. $BaF_2$). In these examples, the oxides and fluorides are indicated by stoichiometric composition, but the oxides and fluorides including oxygen or fluoride in an amount less than or more than the stoichiometric amount may also be used for the high refractive index material or the low refractive index material.

The high refractive index layer may be a film of which main component is the high refractive index material, and the low refractive index layer is a film of which main component is the low refractive index material. The "main component" here refers to a component of which ratio in the film is highest, and is normally a component of which mass, with respect to the mass of the film, is about 50% to 100% by mass, may be about 90% to 100% by mass. By forming a film using a film material (e.g. deposition source) of which main component is the above-mentioned high refractive index material or low refractive index material, such films (e.g. deposition film) can be formed. The above definition of the main component is also applied to the film materials. In some cases, the film or the film material contains impurities which unavoidably enters may be contained. Further, other components, such as inorganic substances and known additives to assist in film forming, may be present within a range of not diminishing the function of the main component. In the multilayer film formed on each surface of the lens substrate of the spectacle lens, a total number of layers of the high refractive index layers and the low refractive index layers may be ten layers or less, nine layers or less, eight layers or less, or seven layers or less, and may also be four layers or more or five layers or more. An example of the layer configuration is, in order from the lens substrate to the outermost surface of the spectacle lens, a first layer (low refractive index layer)/a second layer (high refractive index layer)/a third layer (low refractive index layer)/a fourth layer (high refractive index layer)/a fifth layer (low refractive index layer)/a sixth layer (high refractive index layer)/a seventh layer (low refractive index layer), or a first layer (high refractive index layer)/a second layer (low refractive index layer)/a third layer (high refractive index layer)/a fourth layer (low refractive index layer). In these examples of layer configuration, "/" includes both the case of the layer to the left of "/" and the layer to the right of "/" that are adjacent to each other, and the case of the later mentioned conductive oxide layer that exists between the layer to the left of "/" and the layer to the right of "/".

In addition to the above-mentioned high refractive index layer and the low refractive index layer, the multilayer film may, in an arbitrary position of the multilayer film, include at least one layer of which main component is a conductive oxide (conductive oxide layer), may be a deposited film of conducive oxide, which is formed by deposition using a deposition source of which main component is conductive oxide. The definition of "main component" of the conductive oxide layer is the same as the definition of the main component described above.

In terms of transparency of the spectacle lens, the conductive oxide layer may be a tin-doped indium oxide (ITO) layer of which film thickness is 10.0 nm or less, a tin oxide layer of which film thickness is 10.0 nm or less, or a titanium oxide layer of which film thickness is 10.0 nm or less. The tin-doped indium oxide (ITO) layer is a layer of which main component is ITO. In the same manner, the tin oxide layer is a layer of which main component is tin oxide, and the titanium oxide layer is a layer of which main component is titanium oxide. The multilayer film containing a conductive oxide layer prevents the electrification of the spectacle lens, which can prevent dust and dirt from adhering to the spectacle lens. In the present disclosure and this description, a tin-doped indium oxide (ITO) layer of which film thickness is 10.0 nm or less, a tin oxide layer of which film thickness is 10.0 nm or less, and a titanium oxide layer of which film thickness is 10.0 nm or less, are not considered as the "high refractive index layer" and the "low refractive index layer" included in the multilayer film. In other words, even if one or more of these layers are included in the multilayer film, these layers are not regarded as the "high refractive index layer" or "low refractive index layer". The film thickness of the conductive oxide layer of which film thickness is 10.0 nm or less is, for example, 0.1 nm or more. The film thickness of the conductive oxide layer refers to a physical film thickness.

Another functional film may be formed on the multilayer film. Such a functional film may be various functional films as a volatile or hydrophilic anti-fouling film and anti-fogging film. A known technique can be applied for these functional films.

<Characteristics of Spectacle Lens>
(Reflection Characteristic with Respect to Blue Light)

As mentioned above, the average reflectance within the wavelength range from 380 to 500 nm measured at least on one surface of the spectacle lens is 10.00% or more. Also as mentioned above, the average reflectance determined only for one surface of the spectacle lens may be 10.00% or more, or the average reflectance determined for each of both surfaces may be 10.00% or more. The average reflectance that is determined only for one surface may be 10.00% or more.

On the surface of which average reflectance within the wavelength range from 380 to 500 nm is 10.00% or more, the average reflectance within the wavelength range from 430 to 450 nm (referred to as "average reflectance 1") may be high. This is because an LED which is a major generation source of the blue light emits light within the wavelength range from 430 to 450 nm especially strongly among the wavelength ranges of blue light. In terms of this aspect, on the surface of which average reflectance within the wavelength range from 380 to 500 nm is 10.00% or more, the average reflectance within the wavelength range from 430 to 450 nm (average reflectance 1) may be more than 10.00%, 12.00% or more, 13.00% or more, 14.00% or more, or 15.00% or more. This average reflectance 1 can be, for example, 35.00% or less, 32.00% or less, 30.00% or less, or 25.00% or less, but in terms of further reducing the quantity of light within the wavelength range from 430 to 450 nm, which enters the eye of the user, the above-mentioned upper limits may be exceeded.

Meanwhile, a spectacle lens which has high reflectance with respect to the blue light normally tends to generate glare. If the reflectance with respect to the wavelength that is longer than the wavelength in the range to determine the average reflectance 1 (430 to 450 nm), among the wavelength ranges of the blue light, is relatively lower than the reflectance with respect to the wavelength range to determine the average reflectance 1, generation of glare on the spectacle lens can be suppressed. In terms of this aspect, on the surface of which average reflectance with respect to the wavelength range from 380 to 500 nm is 10.00% or more, the reflectance with respect to the wavelength range from 460 to 480 nm (referred to as "average reflectance 2") may be lower than the average reflectance 1. The difference between the average reflectance 1 and the average reflectance 2 (average reflectance 1−average reflectance 2) may be 5.00% or more, 6.00% or more, 7.00% or more, 8.00% or more, 9.00% or more, or 10.00% or more. The difference (average reflectance 1−average reflectance 2) can be 17.00% or less, or less than 12.00%, but may exceed this value in terms of further suppressing glare. The average reflectance 2 can be in the range of 1.00 to 15.00% or 1.00 to 10.00%, for example, but may be in the range of 2.00 to 10.00% or 3.00 to 10.00%.

(Luminous Reflectance)

In terms of improving the appearance quality of the spectacle lens, the luminous reflectance that is measured on the object side surface of the spectacle lens may be low. In terms of further improving the comfort of wearing the spectacle lens, the luminous reflectance that is measured on the eyeball side surface of the spectacle lens may be low. In terms of improving the appearance quality, the luminous reflectance of the spectacle lens that is measured on the object side surface may be 1.80% or less or 1.50% or less. In terms of further improving the comfort of wearing the spectacle lens, the luminous reflectance of the spectacle lens that is measured on the eyeball side surface may be 1.80% or less, 1.50% or less, 1.30% or less, or 1.00% or less.

The luminous reflectance that is measured on the object side surface of the spectacle lens and the luminous reflectance that is measured on the eyeball side surface of the spectacle lens can be 0.10% or more, 0.20% or more, 0.30% or more, 0.40% or more, or 0.50% or more respectively, but these lower limits are examples, and are not limited to these values. The above-mentioned luminous reflectance can be implemented by the film design of the multilayer films which are formed on the object side surface and the eyeball side surface of the lens substrate. The film design can be performed by optical simulation based on a known method.

In the present disclosure and this description, "luminous reflectance" is a value that is measured from the measurement target surface side of the spectacle lens according to JIS T 7333:2005.

(Reflectance within Wavelength Range of More than 500 nm and 780 nm or Less)

As mentioned above, the reflectance within the entire wavelength range from 400 to 780 nm measured at least on one surface of the spectacle lens is 5.00% or less. Each reflectance within the entire wavelength range of more than 500 nm and 780 nm measured on both surfaces may be 5.00% or less. In other words, each reflectance within the entire wavelength range of more than 500 nm and 780 nm or less measured on each of both surfaces may not exceed 5.00%. This contributes to making the hue of both surfaces of the spectacle lens similar. Hue may be similar on both surfaces of the spectacle lens in terms of the appearance quality of the spectacle lens.

(Dominant Wavelength)

The above-mentioned spectacle lens, in which the average reflectance within the wavelength range from 380 to 500 nm measured at least on one surface is 10.00% or more, has a characteristic to strongly reflect the blue light. The dominant wavelength that is measured on the surface having the above average reflectance of the spectacle lens may be within the range from 400.0 to 500.0 nm, which is in the wavelength range of the blue light.

In terms of improving the appearance quality of the spectacle lens, on the other hand, the dominant wavelength that is measured on each surface of the spectacle lens may be similar. In terms of this viewpoint, the dominant wavelength that is measured on the other surface of the spectacle lens may be within the range from 400.0 to 600.0 nm, or within the range from 400.0 to 500.0 nm.

The "dominant wavelength" is a numerical index of the wavelength of the color of light that can be sensed by human eyes, and in the present disclosure and this description, "dominant wavelength" is a value that is measured from the measurement target surface side of the spectacle lens, according to Annex JA of JIS Z 8781-3:2016. This dominant wavelength can be implemented by the film design of each multilayer film which is formed on each surface of the lens substrate, respectively. An example of a means of controlling the dominant wavelength that is measured on both surfaces of the spectacle lens is controlling the reflectance with respect to the wavelength range of more than 500 nm and 780 nm or less, as mentioned above.

(DEI Value (Digital Eyestrain Value))

After careful study on stress reduction on the eyes of the user of the spectacles caused by blue light, the present inventors reached a conclusion that the influence of the blue light, emitted from an LED which is a major generation source of the blue light, on the eyes can be effectively reduced by using a spectacle lens of which DEI value, calculated by the following Expression 1, is 10.0% or more. The DEI value determined by the following Expression 1 is a value based on the new information discovered by the present inventors, that is, that the blue light emitted from an LED and the blue light hazard function both have distribution with respect to the wavelength, and the degree of influence of the blue light emitted from an LED on the eyes can be digitized if an index considering these distributions is factored in. In terms of further reducing the stress on the eyes of the user of the spectacles caused by the blue light emitted from an LED, the DEI value of the spectacle lens may be 10.0% or more, 13.0% or more, or 16.0% or more. The DEI value of the spectacle lens can be less than 10.00, for example, but stress on the eyes of the user of the spectacles caused by the blue light emitted from an LED can be reduced more as the DEI value is higher, hence the DEI value of the spectacle lens may be lower than the above-mentioned examples of the upper limits.

$$DEI \text{ Value } (\%) = 100 - \frac{\int_{380nm}^{500nm} \tau(\lambda) \cdot E_{s\lambda}(\lambda) \cdot B(\lambda) \cdot d\lambda}{\int_{380nm}^{500nm} E_{s\lambda}(\lambda) \cdot B(\lambda) \cdot d\lambda} \quad \text{(Expression 1)}$$

In Expression 1, $\tau(\lambda)$ denotes transmittance (%) with respect to the wavelength $\lambda$ nm. The transmittance is measured by allowing light to enter the spectacle lens through the object side surface of the spectacle lens.

In Expression 1, $E_{s\lambda}(\lambda)$ denotes an LED emission intensity coefficient with respect to the wavelength $\lambda$ nm, and $B(\lambda)$ denotes the blue light hazard function with respect to the wavelength $\lambda$ nm. The LED emission intensity coefficient with respect to each wavelength is a value determined by the present inventors by calculating the intensity coefficient based on the optical spectrum of the light emission from a general-purpose LED liquid crystal display, and the blue light hazard function with respect to each wavelength is a value according to Annex A of JIS T 7330:2000.

TABLE 1

| Nm | LED emission intensity coefficient | Blue light hazard function |
|---|---|---|
| 380 | 0.000 | 0.006 |
| 385 | 0.000 | 0.012 |
| 390 | 0.001 | 0.025 |
| 395 | 0.001 | 0.050 |
| 400 | 0.001 | 0.100 |
| 405 | 0.003 | 0.200 |
| 410 | 0.004 | 0.400 |
| 415 | 0.008 | 0.800 |
| 420 | 0.020 | 0.900 |
| 425 | 0.052 | 0.950 |
| 430 | 0.128 | 0.980 |
| 435 | 0.277 | 1.000 |
| 440 | 0.554 | 1.000 |
| 445 | 1.000 | 0.970 |
| 450 | 1.164 | 0.940 |
| 455 | 1.012 | 0.900 |
| 460 | 0.574 | 0.800 |
| 465 | 0.430 | 0.700 |
| 470 | 0.300 | 0.620 |
| 475 | 0.198 | 0.550 |
| 480 | 0.177 | 0.450 |
| 485 | 0.190 | 0.400 |
| 490 | 0.222 | 0.220 |
| 495 | 0.284 | 0.160 |
| 500 | 0.360 | 0.100 |

[Spectacles]

Another aspect of the present disclosure relates to spectacles having the spectacle lenses according to the above-mentioned aspect of the disclosure. Details of the spectacle lenses of the spectacles are as described above. By using these spectacle lenses for the spectacles, the stress on the eyes of the user caused by the blue light can be reduced. The spectacle lens used for the spectacles can decrease the intensity of a ghost (double image) formed by multi-reflection inside the spectacle lens, that is visually recognized by the user of the spectacles, or can decrease the intensity to a level where the ghost is hardly recognized. The configuration of the spectacles (e.g. a frame) is not especially limited, and a known technique may be applied.

EXAMPLES

The present disclosure will be further described with reference to examples. The present disclosure, however, is not limited to the following examples.

Examples 1, 2 and Comparative Examples 1, 2

Using a plastic lens substrate (colorless lens, refractive index: 1.67) of which surfaces are optically finished and hard coated (the object side surface is convex, the eyeball side surface is concave), a multilayer deposition film having the layer configuration in Table 2, was formed on the hard-coated surface on the convex surface side (object side) by ion assisted deposition. For the assist gas, oxygen gas and nitrogen gas were used.

A multilayer deposition film having the layer configuration in Table 2 was also formed on the hard-coated surface on the concave surface side (eyeball side) by ion assisted deposition under the same conditions.

In the examples and comparative examples, for both the convex surface side and the concave surface side, the multilayer deposition film was formed by layering, as in first layer, second layer, . . . , in order from the lens substrate side (hard coat side) to the spectacle lens surface side using the deposition sources listed from top to bottom in Table 2 or Table 4 sequentially, so that the outermost layer on the spectacle lens surface side becomes a layer formed by the deposition source at the very bottom in Table 2. In the examples and comparative examples, the deposition sources constituted by the oxides indicated in Table 2 or Table 4 (excluding impurities that may unavoidably enter) were used, and each layer having the layer thickness (optical film thickness) indicated in Table 2 or Table 4 was sequentially formed. The refractive indexes of the oxides indicated in Table 2 or Table 4 are: $SiO_2$:1.47, $ZrO_2$:2.08 and $Nb_2O_5$: 2.11. The optical film thickness is $\lambda=500$ nm. For example, in Table 2, 0.110 indicates the optical film thickness $0.110\lambda$. This is the same for the other optical film thicknesses in Table 2 or Table 4. The spectacle lens in Comparative Example 1 is a spectacle lens having the multilayer film of which layer configuration is the same as the layer configuration of Example 1 indicated in Table 1 of WO 2014/069250.

TABLE 2

| | Film material | Comparative Example 1 | | Example 1 | | Example 2 | | Comparative Example 2 | |
|---|---|---|---|---|---|---|---|---|---|
| | | Object side | Eyeball side | Object side | Eyeball side | Object side | Eyeball side | Object side | Eyeball side |
| 1 | $ZrO_2$ | 0.110 | 0.050 | — | — | — | — | — | — |
| 2 | $SiO_2$ | 0.130 | 0.080 | 0.164 | 0.102 | 0.164 | 0.068 | 0.164 | 0.062 |
| 3 | $ZrO_2$ | 0.160 | 0.150 | 0.017 | 0.028 | 0.017 | 0.016 | 0.017 | 0.065 |
| 4 | $SiO_2$ | 0.060 | 0.040 | 0.894 | 0.605 | 0.894 | 0.417 | 0.894 | 0.676 |
| 5 | $ZrO_2$ | 0.190 | 0.110 | 0.094 | 0.115 | 0.094 | 0.086 | 0.094 | 0.130 |
| 6 | $SiO_2$ | 0.340 | 0.220 | 0.132 | 0.067 | 0.132 | 0.057 | 0.132 | 0.058 |
| 7 | $ZrO_2$ | — | — | 0.282 | 0.251 | 0.282 | 0.264 | 0.282 | 0.195 |
| 8 | $SiO_2$ | — | — | 0.332 | 0.279 | 0.332 | 0.216 | 0.332 | 0.296 |

[Measurement Methods for Various Characteristics]
<1. Reflectance>

The direct incident reflection spectral characteristic at an optical center of the object side surface (convex surface side) was measured from the object side of each spectacle lens of examples and comparative examples.

The direct incident reflection spectral characteristic at an optical center of the eyeball side surface (concave surface side) was also measured from the eyeball side of each spectacle lens of the examples and the comparative examples.

Figure 2:
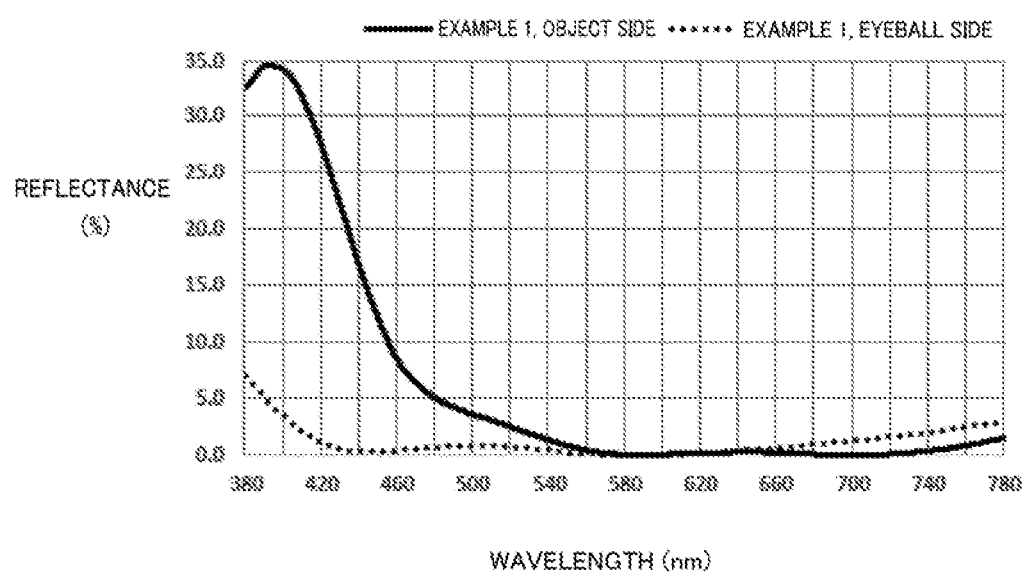
FIG. 2 indicates a reflection spectrum acquired from a spectacle lens of Example 1.
Figure 3:
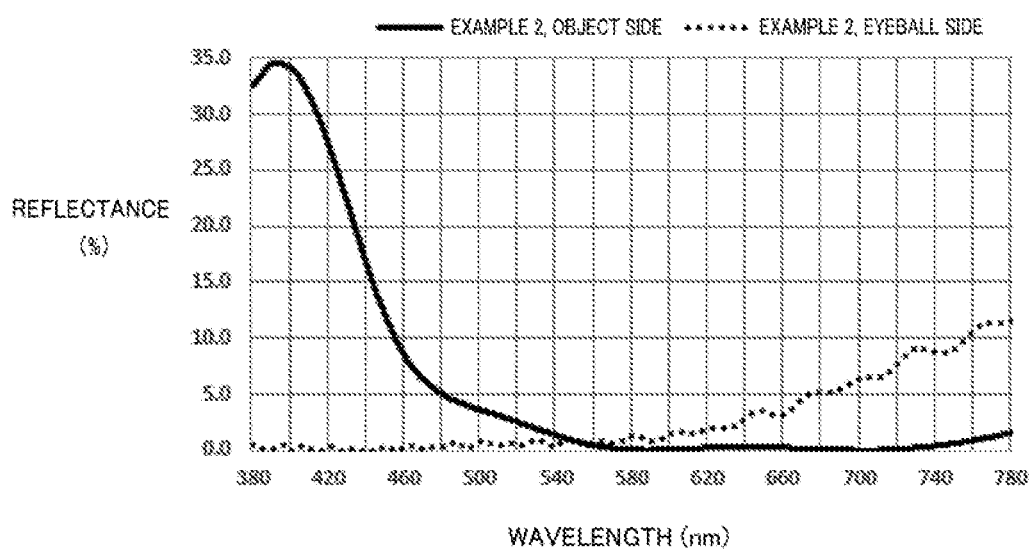
FIG. 3 indicates a reflection spectrum acquired from a spectacle lens of Example 2.
Figure 4:
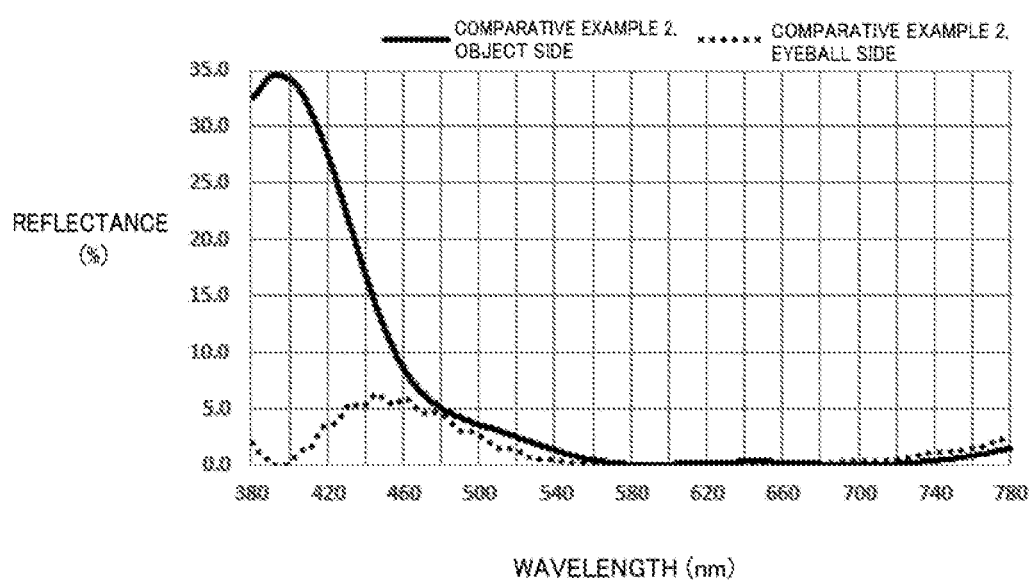
FIG. 4 indicates a reflection spectrum acquired from a spectacle lens of Comparative Example 2.

This measurement was performed using the USPM-RU lens reflectance measuring instrument manufactured by Olympus Corporation (measurement pitch: 1 nm). FIG. 1 to FIG. 4 indicate the reflection spectrum acquired for each spectacle lens of the examples and the comparative examples, and FIG. 5 (FIG. 5-1 to FIG. 5-9) indicates the measured reflectance (unit: %).

Based on the reflectances measured in this way, various later mentioned average reflectances indicated in Table 3 were determined.

<2. Luminous Reflectance>

Using the measurement results of the direct incident reflection spectral characteristic acquired in <1. Reflectance>, the luminous reflectance was determined for both surfaces of each spectacle lens of the examples and the comparative examples.

<3. Dominant Wavelength>

Using the measurement results of the direct incident reflection spectral characteristic acquired in <1. Reflectance>, the dominant wavelength was determined for both surfaces of each spectacle lens of the examples and the comparative examples.

[Evaluation Method]

<Ghost Evaluation>

Observing each spectacle lens of the examples and the comparative examples from the eyeball side in a dark room at a position of 30 cm under a fluorescent light, whether a ghost (double image) is generated and the degree of the ghost were sensory-evaluated based on the following evaluation standard.

A: Ghost is not observed, or light ghost that is lighter than B is observed.
B: Clear ghost is not observed, or light ghost is observed.
C: Clear ghost is observed.

<Evaluation on Reducing Stress on Eyes by Blue Light>

The direct incident reflection spectral characteristic of each spectacle lens of the examples and the comparative examples was measured using the U4100 spectro-photometer manufactured by Hitachi, Ltd., in which light is allowed to enter the optical center on the object side surface (convex surface) of the spectacle lens from the object side, and the direct incident reflection spectral characteristic is measured with respect to the wavelength range from 380 nm to 500 nm at a 5 nm pitch.

Based on the transmission spectrum acquired as a result of this measurement, transmittance $\tau(\lambda)$ with respect to each wavelength within the wavelength range from 380 to 500 nm was determined. Using $\tau(\lambda)$ determined like this, the DEI value was determined based on Expression 1.

Using the determined DEI value, the effect of the spectral lens to reduce stress on the eyes caused by the blue light was evaluated based on the following evaluation standard.

A: DEI value is 13.0% or more.
B: DEI value is 10.0% or more, less than 13.0%.
C: DEI value is less than 10.0%.

<Glare Evaluation>

2. Glare Evaluation

Each spectacle lens of Examples 1 and 2 were observed from the eyeball side in a normal bright room, and the intensity of light reflected inside the object side surface (glare) was sensory-evaluated by the eyes of the observer based on the following standard.

A: Glare is not observed, or light glare that is lighter than B is observed.
B: Glare is observed.
C: Glare is noticeably observed.

<Appearance Color>

The observer visually observed each spectacle lens of the examples and comparative examples from each surface side, and confirmed the appearance color of the spectacle lens.

Table 3 indicates the above measurement result and evaluation result. The glare evaluation result of each spectacle lens of Examples 1 and 2 was both "A".

TABLE 3

|  |  | Comparative Example 1 | | Example 1 | | Example 2 | | Comparative Example 2 | |
| --- | --- | --- | --- | --- | --- | --- | --- | --- | --- |
|  |  | Object side | Eye ball side | Object side | Eye ball side | Object side | Eye ball side | Object side | Eye ball side |
| Average reflectance (%) | (1) 430 to 450 nm | 8.62 | 0.27 | 17.04 | 0.37 | 17.04 | 0.10 | 17.04 | 5.65 |
|  | (2) 460 to 480 nm | 8.19 | 0.27 | 6.54 | 0.57 | 6.54 | 0.28 | 6.54 | 5.04 |
|  | 380 to 500 nm | 6.48 | 0.61 | 18.48 | 1.62 | 18.48 | 0.23 | 18.48 | 3.54 |
| Difference (1) − (2) | | 0.43 | 0.00 | 10.50 | −0.20 | 10.50 | −0.18 | 10.50 | 0.61 |
| Average reflectance at 380 to 500 nm region is 10.00% or more at least on one surface | | No | | Yes | | Yes | | Yes | |
| Reflectance at entire 400 to 780 nm region is 5.00% or less at least on one surface | | Yes | | Yes | | Yes | | No | |
| Luminous reflectance (%) | | 2.00 | 1.66 | 1.34 | 0.34 | 1.34 | 0.94 | 1.34 | 0.69 |
| Dominant wavelength (nm) | | 477.4 | 585.5 | 465.9 | 486.3 | 465.9 | 584.2 | 465.9 | 468.9 |
| Appearance color | | Blue | Yellow | Blue | Blue | Blue | Yellow | Blue | Blue |
| Evaluation on ghost | | A | | A | | A | | C | |

TABLE 3-continued

|  | Comparative Example 1 | | Example 1 | | Example 2 | | Comparative Example 2 | |
| --- | --- | --- | --- | --- | --- | --- | --- | --- |
|  | Object side | Eye ball side | Object side | Eye ball side | Object side | Eye ball side | Object side | Eye ball side |
| Evaluation on reducing stress on eyes caused by blue light (DEI value in parenthesis) | C (9.1%) | | A (18.3%) | | A (17.9%) | | A (19.5%) | |

As the result in Table 3 indicates, the spectacle lenses in Examples 1 and 2 can reduce the stress on the eyes of the user of the spectacles having the spectacle lenses caused by the blue light, and provide the comfort of wearing spectacles (suppress diminishing comfort of wearing the spectacles due to a ghost).

Example 3 to 12

The spectacle lenses of Examples 3 to 12 were created by forming a multilayer deposition film, the same as Example 1, on the eyeball side surfaces, and changing the layer configuration of a multilayer deposition film that is formed on the object side surface, as indicated in Table 4 (Table 4-1 to Table 4-3).

For each spectacle lens of the Examples 3 to 12, various evaluations were performed using the above-mentioned methods. Table 5 (Table 5-1, Table 5-2) indicates the evaluation results. FIG. 6 (FIG. 6-1 to FIG. 6-9) and FIG. 7 (FIG. 7-1 to FIG. 7-9) indicate the reflectance (unit: %) of the object side surface of each spectacle lens in Examples 3 to 12.

TABLE 4

|  | Film material | Example 3 Object side | Example 4 Object side | Example 5 Object side |
| --- | --- | --- | --- | --- |
| 1 | $SiO_2$ | 0.501 | 0.357 | 0.696 |
| 2 | $Nb_2O_5$ | 0.122 | 0.126 | 0.145 |
| 3 | $SiO_2$ | 4.311 | 4.386 | 5.045 |
| 4 | $Nb_2O_5$ | 0.276 | 0.100 | 0.643 |
| 5 | $SiO_2$ | 0.450 | 0.955 | 0.257 |
| 6 | $Nb_2O_5$ | 0.917 | 0.527 | 1.137 |
| 7 | $SiO_2$ | 1.214 | 1.439 | 1.184 |

|  | Film material | Example 6 Object side | Example 7 Object side | Example 8 Object side |
| --- | --- | --- | --- | --- |
| 1 | $ZrO_2$ | 0.147 | 0.306 | 0.137 |
| 2 | $SiO_2$ | 0.817 | 0.590 | 0.812 |
| 3 | $ZrO_2$ | 0.272 | 0.155 | 0.181 |
| 4 | $SiO_2$ | 4.532 | 3.460 | 3.910 |
| 5 | $ZrO_2$ | 0.197 | 0.094 | 0.461 |
| 6 | $SiO_2$ | 0.618 | 0.872 | 0.510 |
| 7 | $ZrO_2$ | 0.829 | 0.795 | 1.068 |
| 8 | $SiO_2$ | 1.353 | 1.340 | 1.367 |

|  | Film material | Example 9 Object side | Example 10 Object side | Example 11 Object side | Example 12 Object side |
| --- | --- | --- | --- | --- | --- |
| 1 | $SiO_2$ | 0.399 | | | |
| 2 | $ZrO_2$ | 0.153 | 0.153 | | |
| 3 | $SiO_2$ | 4.217 | 4.217 | 2.285 | |
| 4 | $ZrO_2$ | 0.239 | 0.239 | 0.248 | 0.368 |
| 5 | $SiO_2$ | 0.695 | 0.695 | 0.758 | 0.587 |
| 6 | $ZrO_2$ | 0.990 | 0.990 | 1.606 | 1.727 |
| 7 | $SiO_2$ | 1.322 | 1.322 | 1.238 | 1.294 |

TABLE 5

|  |  | Example 3 Object side | Example 4 Object side | Example 5 Object side | Example 6 Object side | Example 7 Object side | Example 8 Object side |
| --- | --- | --- | --- | --- | --- | --- | --- |
| Average reflectance (%) | 380 to 500 nm | 10.82 | 18.15 | 17.55 | 11.60 | 15.03 | 18.00 |
|  | (1) 430 to 450 nm | 10.16 | 14.99 | 20.01 | 10.17 | 15.01 | 20.38 |
|  | (2) 460 to 480 nm | 7.45 | 13.42 | 3.58 | 9.05 | 12.22 | 9.37 |
| Difference (1) − (2) | | 2.72 | 1.58 | 16.43 | 1.12 | 2.79 | 11.01 |
| Luminous reflectance (%) | | 0.98 | 1.66 | 0.65 | 0.96 | 1.28 | 0.98 |
| Dominant wavelength (nm) | | 451 | 467 | 434 | 466 | 461 | 455 |
| Appearance color | | Blue | Blue | Blue | Blue | Blue | Blue |

|  |  | Example 12 Object side | Example 11 Object side | Example 10 Object side | Example 9 Object side |
| --- | --- | --- | --- | --- | --- |
| Average reflectance (%) | 380 to 500 nm | 11.44 | 11.97 | 16.51 | 15.90 |
|  | (1) 430 to 450 nm | 15.07 | 14.92 | 14.59 | 15.02 |
|  | (2) 460 to 480 nm | 14.06 | 13.06 | 12.90 | 12.41 |
| Difference (1) − (2) | | 1.02 | 1.86 | 1.69 | 2.61 |
| Luminous reflectance (%) | | 4.19 | 4.32 | 1.47 | 1.51 |
| Dominant wavelength (nm) | | 474 | 473 | 467 | 467 |
| Appearance color | | Bright blue | Bright blue | Blue | Blue |

On the eyeball side surface of each spectacle lens of Examples 3 to 12, the multilayer deposition film, the same as Example 1, is formed, hence the reflection characteristic of each spectacle lens of Example 3 to 12 is the same as the reflectance characteristic of the eyeball side surface of the spectacle lens of Example 1. In each spectacle lens of Examples 3 to 12, the reflectance within the entire wavelength range from 400 to 780 nm measured at least on the eyeball side surface is 5.00% or less. Further, in each spectacle lens of Examples 3 to 12, the average reflectance within the wavelength range from 380 to 500 nm measured on the object side surface is 10.00% or more (see Table 5-1 and Table 5-2). Therefore stress on the eyes of the user of spectacles having the spectacle lenses caused by the blue light can be reduced.

The evaluation result of the ghost evaluation of each spectacle lens of Example 3 to 12 was all "A".

The evaluation result of the glare evaluation was "A" in the case of the spectacle lenses of Examples 5 and 8, and was "B" in the case of the spectacles lenses of Examples 3, 4, 6, 7 and 9 to 12.

Each of the above aspects will now be summarized.

According to an aspect, a spectacle lens including: a lens substrate; a multilayer film disposed on one surface of the lens substrate; and a multilayer film disposed on the other surface of the lens substrate is provided, and in this spectacle lens, an average reflectance within the wavelength range from 380 to 500 nm measured at least on one surface of the spectral lens is 10.00% or more, and the average reflectance within the entire wavelength range from 400 to 780 nm measured at least on one surface of the spectacle lens is 5.00% or less.

This spectacle lens can reduce stress on the eyes of the user of the spectacles having the spectacle lenses caused by the blue light, and provide comfort of wearing the spectacles to the user.

According to one embodiment, the average reflectance within the wavelength range from 380 to 500 nm measured on one surface is 10.00% or more, and the average reflectance within the wavelength range from 380 to 500 nm measured on the other surface is less than 10.00%, and on the surface of which average reflectance within the wavelength range from 380 to 500 nm is 10.00% or less, the average reflectance 1 measured within the wavelength range from 430 to 450 nm is 12.00% or more. According to spectacle lens of this embodiment, the quantity of light within the wavelength range from 430 to 450 nm entering the eyes of the user of the spectacles can be effectively reduced. Here, the wavelength range from 430 to 450 nm is a range in which the LED, which is a major emission source of the blue light that may enter the eyes of the user of the spectacles, most strongly emits within the wavelength range of blue light.

According to one embodiment, a difference between the average reflectance 1 within the wavelength range from 430 to 450 nm, which is measured on one surface where the average reflectance within the wavelength range from 380 to 500 nm is 10.00% or less, and the average reflectance 2 within the wavelength range from 460 to 480 nm, that is (average reflectance 1−average reflectance 2), is 5.00% or more. The spectacle lens according to this aspect can effectively suppress the generation of glare.

According to one embodiment, within the entire wavelength range of more than 500 nm and 780 nm or less, the reflectance measured on one surface of the spectacle lens and the reflectance measured on the other surface of the spectacle lens are both 5.00% or less. The spectacle lens according to this aspect can suppress the generation of difference in hues on both surfaces of the spectacle lenses.

According to an aspect, the DEI value of the spectacle lens is 10.0% or more. The spectacle lens according to this aspect can reduce the stress on the eyes of the user of the spectacles caused the blue light emitted from the LED.

According to an aspect, a spectacle lens of which DEI value is 10.0% or more can be provided. This spectacle lens can reduce the stress on the eyes of the user of the spectacles caused by the blue light emitted from the LED. The spectacle lens of which DEI value is 10.0% or more may be a spectacle lens including a lens substrate and a multilayer film disposed at least on one surface of the lens substrate, for example. The spectacle lens of which DEI value is 10.0% or more may also be a spectacle lens including a lens substrate, a multilayer film disposed on one surface of the lens substrate, and a multilayer film disposed on the other surface of the lens substrate, for example. According to a spectacle lens including a lens substrate, a multilayer film disposed on one surface of the lens substrate, and a multilayer film disposed on the other surface of the lens substrate, and the spectacle lens of which the DEI value is 10.0% or more, and the reflectance within the entire wavelength range from 400 to 780 nm measured at least on one surface of the spectacle lens is 5.00% or less, stress on the eyes caused by the blue light emitted from the LED can be reduced, and comfort of wearing can be provided to the user of the spectacles having the spectacle lenses. For details on the spectacle lens of which DEI value is 10.0% or more, the previous description on the spectacle lens according to each aspect can be referred to.

According to an aspect, spectacles having the above-mentioned spectacle lenses can be provided.

Embodiments in this description may be arbitrarily combined.

The embodiments disclosed here are to be understood as examples, and do not restrict the scope of the disclosure. The scope of the disclosure is determined not by the above description but by the Claims, and includes interpretations that are equivalent to the Claims and all modifications within the Claims.

The present disclosure is useful in the manufacturing fields of spectacle lenses and spectacles.

What is claimed is:

1. A spectacle lens, comprising: a lens substrate; a multilayer film disposed on one of an object side surface and an eyeball side surface of the lens substrate; and a multilayer film disposed on an other of the object side surface and the eyeball side surface of the lens substrate, wherein
   an average reflectance within the wavelength range from 380 to 500 nm measured at least on the one surface of the spectacle lens is 10.00% or more, and
   at each wavelength within a range from 400 nm to 780 nm, at least one of the following conditions is met:
   (a) a reflectance on an object side surface of the spectacle lens exceeds 5.00% and a reflectance on an eyeball side surface of the spectacle lens is 5.00% or less at a corresponding wavelength;
   (b) the reflectance on the eyeball side surface of the spectacle lens exceeds 5.00%, and the reflectance on the object side surface of the spectacle lens is 5.00% or less at the corresponding wavelength; and
   (c) the reflectance on the object side surface of the spectacle lens is 5.00% or less and the reflectance on the eyeball side surface of the spectacle lens is 5.00% or less at the corresponding wavelength.

2. The spectacle lens according to claim 1, wherein
the average reflectance within the wavelength range from 380 to 500 nm measured on the one surface is 10.00% or more, and the average reflectance within the wavelength range from 380 to 500 nm measured on the other surface is less than 10.00%, and
a first average reflectance within the wavelength range from 430 to 450 nm measured on the one surface where the average reflectance of the spectacle lens within the wavelength range from 380 to 500 nm is 10.00% or more, is 12.00% or more.

3. The spectacle lens according to claim 2, wherein, on a surface where the average reflectance within the wavelength range from 380 to 500 nm is 10.00% or more, a difference between the first average reflectance within the wavelength range from 430 to 450 nm and a second average reflectance within the wavelength range from 460 to 480 nm of the spectacle lens, that is (first average reflectance-second average reflectance), is 5.00% or more.

4. The spectacle lens according claim 1, wherein, in the entire range of the wavelength range of more than 500 nm and 780 nm or less, the reflectance on the object side surface of the spectacle lens is 5.00% or less and the reflectance on the eyeball side surface of the spectacle lens is 5.00% or less at the corresponding wavelength.

5. Spectacles including the spectacle lenses according to claim 1.

* * * * *